(12) United States Patent
Kocienda et al.

(10) Patent No.: US 7,941,760 B2
(45) Date of Patent: May 10, 2011

(54) SOFT KEYBOARD DISPLAY FOR A PORTABLE MULTIFUNCTION DEVICE

(75) Inventors: Kenneth Kocienda, Sunnyvale, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 898 days.

(21) Appl. No.: 11/850,641

(22) Filed: Sep. 5, 2007

(65) Prior Publication Data

US 2008/0082934 A1 Apr. 3, 2008

Related U.S. Application Data

(60) Provisional application No. 60/937,993, filed on Jun. 29, 2007, provisional application No. 60/879,469, filed on Jan. 8, 2007, provisional application No. 60/833,806, filed on Jan. 7, 2007, provisional application No. 60/879,253, filed on Jan. 7, 2007, provisional application No. 60/824,769, filed on Sep. 6, 2006.

(51) Int. Cl.
*G06F 3/048* (2006.01)
(52) U.S. Cl. ........................... 715/773; 715/863
(58) Field of Classification Search .................. 345/173, 345/780; 715/202, 773, 784, 764, 780, 863, 715/864

See application file for complete search history.

(56) References Cited

U.S. PATENT DOCUMENTS 5,276,794 A * 1/1994 Lamb, Jr. .................. 715/202
5,736,974 A 4/1998 Selker .......................... 345/146
(Continued)

FOREIGN PATENT DOCUMENTS

GB 2 337 349 A 11/1999
(Continued)

OTHER PUBLICATIONS

International Search Report of International Searching Authority, PCT/US2007/077775, Dec.5, 2007.

(Continued)

*Primary Examiner* — Weilun Lo
*Assistant Examiner* — Enrique W Iturralde
(74) *Attorney, Agent, or Firm* — Morgan, Lewis & Bockius LLP

(57) ABSTRACT

A computer-implemented method for displaying soft keyboards at a portable electronic device with a touch screen display is disclosed. An application with a plurality of objects is displayed on the touch screen display. A first gesture by a user on a first object in the plurality of objects is detected. In response to the first gesture, a first soft keyboard is displayed that contains a plurality of keys including primarily letter keys and including a key for selecting a second soft keyboard different from the first soft keyboard. A second gesture by the user on a second object in the plurality of objects is detected, the second object being other than the key for selecting the second soft keyboard. In response to the second gesture, the second soft keyboard is displayed, which contains a plurality of keys including number keys and including a key for selecting the first soft keyboard.

10 Claims, 47 Drawing Sheets

U.S. PATENT DOCUMENTS

| | | | | |
|---|---|---|---|---|
| 5,896,133 | A * | 4/1999 | Lynch et al. | 715/784 |
| 5,953,541 | A * | 9/1999 | King et al. | 710/67 |
| 6,073,036 | A * | 6/2000 | Heikkinen et al. | 455/550.1 |
| 6,714,220 | B2 * | 3/2004 | Sigl | 715/780 |
| 7,411,582 | B2 * | 8/2008 | Toepke et al. | 345/173 |
| 2002/0167545 | A1 * | 11/2002 | Kang et al. | 345/780 |
| 2004/0021681 | A1 * | 2/2004 | Liao | 345/702 |
| 2004/0160419 | A1 | 8/2004 | Padgitt | 345/173 |
| 2004/0198249 | A1 * | 10/2004 | Grifffin | 455/90.3 |
| 2005/0012723 | A1 | 1/2005 | Pallakoff | 345/173 |
| 2005/0046893 | A1 * | 3/2005 | Hirosawa et al. | 358/1.15 |
| 2006/0033724 | A1 * | 2/2006 | Chaudhri et al. | 345/173 |
| 2008/0075517 | A1 * | 3/2008 | Vuong | 400/486 |
| 2009/0153478 | A1 * | 6/2009 | Kerr et al. | 345/158 |
| 2009/0167716 | A1 * | 7/2009 | Wang et al. | 345/173 |

FOREIGN PATENT DOCUMENTS

| | | |
|---|---|---|
| WO | WO 2004/051392 A2 | 6/2004 |

OTHER PUBLICATIONS

Invitation to Pay Additional Fees for International application No. PCT/US2007/060119 (related case) dated Jan. 2, 2008.

Esato, "A Couple of My Mates. Meet JasJar and K-Jam (Many Pics)," 90 pages, Apr. 13, 2006.

\* cited by examiner

US 7,941,760 B2

SOFT KEYBOARD DISPLAY FOR A PORTABLE MULTIFUNCTION DEVICE

RELATED APPLICATIONS

This application claims priority to U.S. Provisional Patent Application Nos. 60/937,993, "Portable Multifunction Device," filed Jun. 29, 2007; 60/879,469, "Portable Multifunction Device," filed Jan. 8, 2007; 60/883,806, "Soft Keyboard Display for a Portable Multifunction Device," filed Jan. 7, 2007; 60/879,253, "Portable Multifunction Device," filed Jan. 7, 2007; and 60/824,769, "Portable Multifunction Device," filed Sep. 6, 2006. All of these applications are incorporated by referenced herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; and (10) U.S. patent application Ser. No. 11/367,749, "Multi-Functional Hand-Held Device," filed Mar. 3, 2006. All of these applications are incorporated by reference herein.

TECHNICAL FIELD

The disclosed embodiments relate generally to portable electronic devices, and more particularly, to soft keyboards on portable devices that are capable of performing multiple functions, such as two or more of: telephoning, video conferencing, e-mailing, instant messaging, blogging, digital photographing, digital videoing, web browsing, digital music playing, and/or digital video playing.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

In particular, the increased number and density of pushbuttons and the overloaded functions of pushbuttons make it difficult to enter data into portable electronic devices. As a result, performing tasks such as composing an email, composing an instant message, or interacting with applications such as web browsers can be frustrating.

Accordingly, there is a need for portable multifunction devices with more transparent and intuitive user interfaces for entering data via soft keyboards that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

In accordance with some embodiments of the present invention, a computer-implemented method for displaying soft keyboards at a portable electronic device with a touch screen display is disclosed. An application with a plurality of objects is displayed on the touch screen display. While the application is displayed, a first gesture by a user on a first object in the plurality of objects is detected. In response to the first gesture, a first soft keyboard is displayed that contains a plurality of keys, including primarily letter keys and including a key for selecting a second soft keyboard different from the first soft keyboard. A second gesture by the user on a second object in the plurality of objects is detected, the second object being other than the key for selecting the second soft keyboard. In response to the second gesture, the second soft keyboard is displayed, which contains a plurality of keys, including number keys and including a key for selecting the first soft keyboard.

In accordance with some embodiments of the present invention, a graphical user interface on a portable electronic device with a touch screen display is disclosed. The interface comprises an application with a plurality of objects, including a first object and a second object. The interface also comprises a first soft keyboard that contains a plurality of keys, including primarily letter keys and including a key for selecting a second soft keyboard different from the first soft keyboard. The second soft keyboard contains a plurality of keys, including number keys and including a key for selecting the first soft keyboard. The first soft keyboard is displayed in response to detecting a first gesture by a user on the first object. The second soft keyboard is displayed in response to detecting a second gesture by the user on the second object, the second object being other than the key for selecting the second soft keyboard.

In accordance with some embodiments of the present invention, a portable electronic device is disclosed, comprising a touch screen display, one or more processors, memory, and one or more programs, wherein the one or more programs are stored in the memory and configured to be executed by the one or more processors. The one or more programs include instructions for displaying an application with a plurality of objects on the touch screen display and instructions for detecting a first gesture by a user on a first object in the plurality of objects. The one or more programs include instructions for responding to the first gesture by displaying a first soft keyboard that contains a plurality of keys, including primarily letter keys and including a key for selecting a second soft keyboard different from the first soft keyboard. The one or more programs include instructions for detecting a second gesture by the user on a second object in the plurality of objects, the second object being other than the key for selecting the second soft keyboard. The one or more programs further include instructions for responding to the second gesture by displaying the second soft keyboard, the second soft keyboard containing a plurality of keys, including number keys and including a key for selecting the first soft keyboard.

In accordance with some embodiments of the present invention, a computer-program product is disclosed, comprising a computer readable storage medium and a computer program mechanism (e.g., one or more computer programs) embedded therein. The computer program mechanism comprises instructions, which when executed by a portable electronic device with a touch screen display, cause the device to display an application with a plurality of objects on the touch screen display and to detect a first gesture by a user on a first object in the plurality of objects. The instructions cause the device to respond to the first gesture by displaying a first soft keyboard that contains a plurality of keys, including primarily letter keys and including a key for selecting a second soft keyboard different from the first soft keyboard. The instructions further cause the device to detect a second gesture by the user on a second object in the plurality of objects, the second object being other than the key for selecting the second soft keyboard, and to respond to the second gesture by displaying the second soft keyboard, the second soft keyboard containing a plurality of keys, including number keys and including a key for selecting the first soft keyboard.

In accordance with some embodiments of the present invention, a portable electronic device with a touch screen display is disclosed. The device comprises means for displaying an application with a plurality of objects on the touch screen display and means for detecting a first gesture by a user on a first object in the plurality of objects. The device also comprises means for responding to the first gesture by displaying a first soft keyboard that contains a plurality of keys, including primarily letter keys and including a key for selecting a second soft keyboard different from the first soft keyboard. The device further comprises means for detecting a second gesture by the user on a second object in the plurality of objects, the second object being other than the key for selecting the second soft keyboard, and means for responding to the second gesture by displaying the second soft keyboard, the second soft keyboard containing a plurality of keys, including number keys and including a key for selecting the first soft keyboard.

The disclosed portable electronic device provides transparent and intuitive user interfaces for entering data via soft keyboards that are easy to use, configure, and/or adapt. The disclosed embodiments thus reduce the problems involved with entering data into portable electronic devices.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
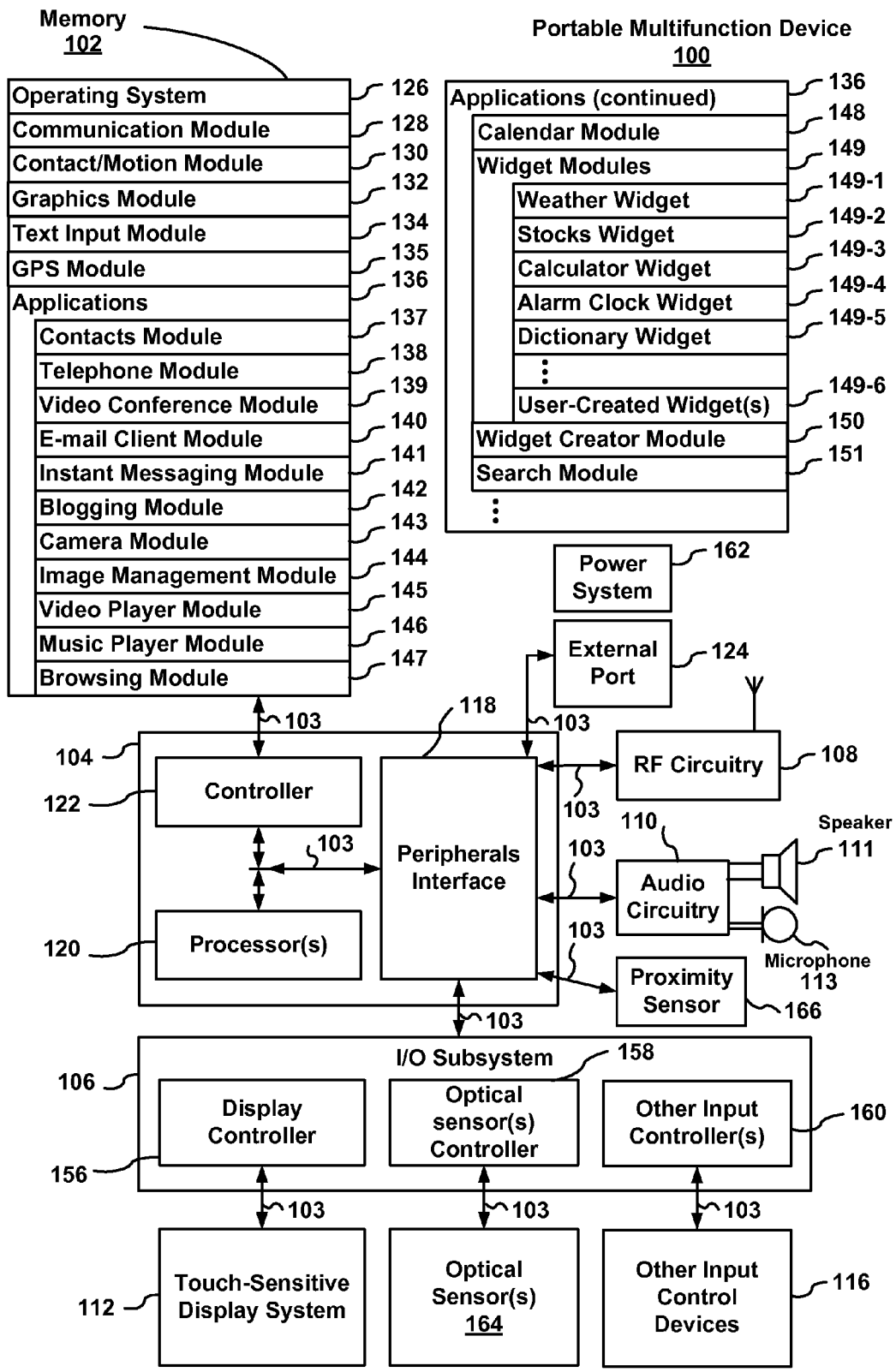
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a mouse and/or a joystick.

The device supports a variety of applications, such as one or more of the following: a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards for Portable Electronic Devices," filed Jul. 24, 2006, and 11/459,615, "Touch Screen Keyboards for Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices.

Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference. However, a touch screen 112 displays visual output from the portable electronic device 100, whereas touch sensitive tablets do not provide visual output. The touch screen 112 may have a resolution in excess of 100 dpi. In an exemplary embodiment, the touch screen in the display system has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable electronic devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector in Handheld Device," filed Sep. 30, 2005, and 11/240,788, "Proximity Detector in Handheld Device," filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel 116.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as moving an email message to a folder). In this context, a respective animation that confirms an action by the user of the device typically takes a predefined, finite amount of time, typically between 0.2 and 1.0 seconds, and generally less than two seconds.

The text input module 134, which may be a component of graphics module 132, provides soft keyboards for entering text in various applications (e.g., contacts 137, email 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;
  a video conferencing module 139;
  an e-mail client module 140;
  an instant messaging (IM) module 141;
  a blogging module 142;
  a camera module 143 for still and/or video images;
  an image management module 144;
  a video player module 145;
  a music player module 146;
  a browser module 147;
  a calendar module 148;
  widget modules 149, which may include weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6; and/or
  search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS). Embodiments of user interfaces and associated processes using instant messaging module 141 are described further below.

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
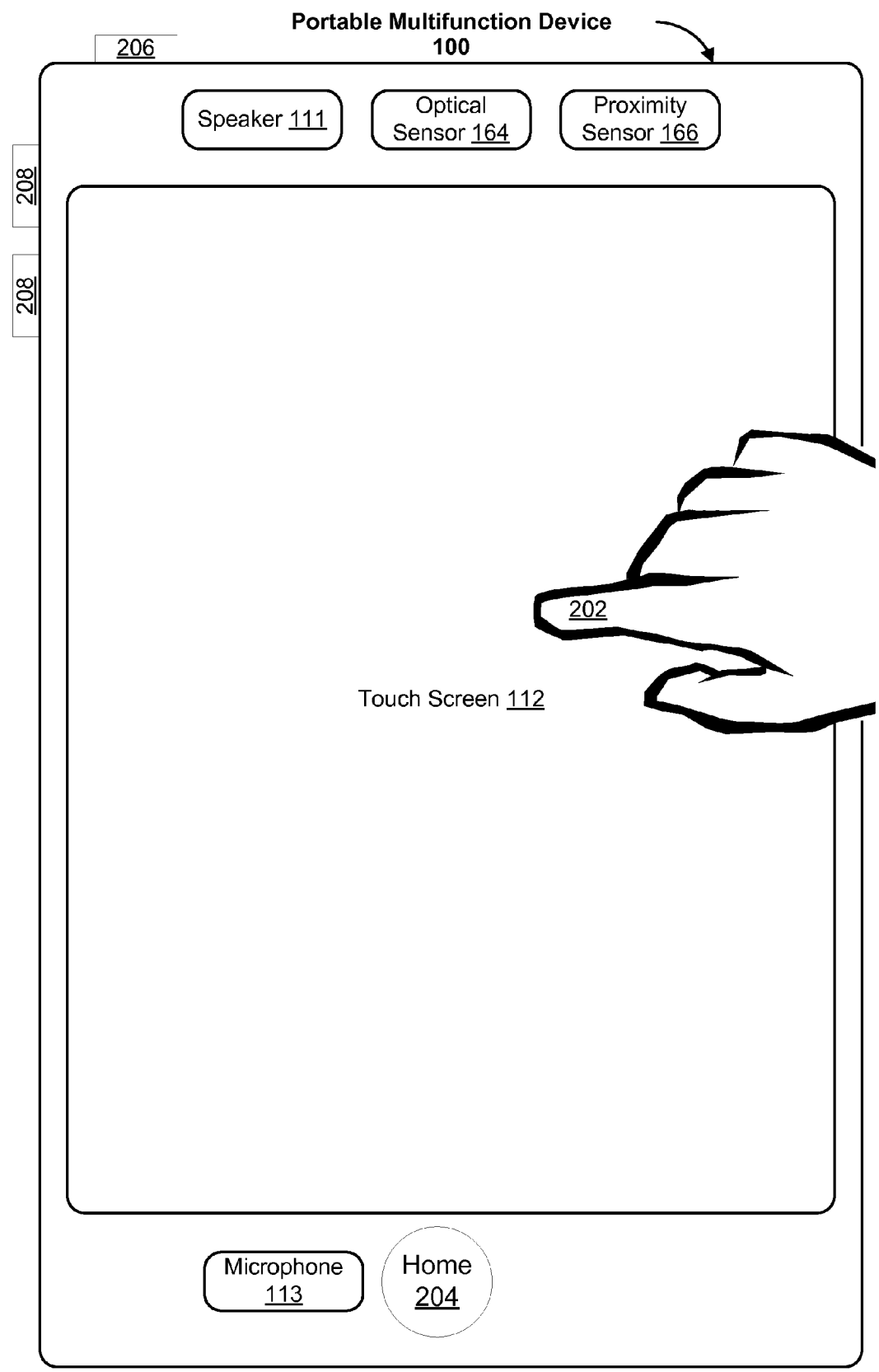
FIG. 2 illustrates a portable multifunction device having a touch screen display in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
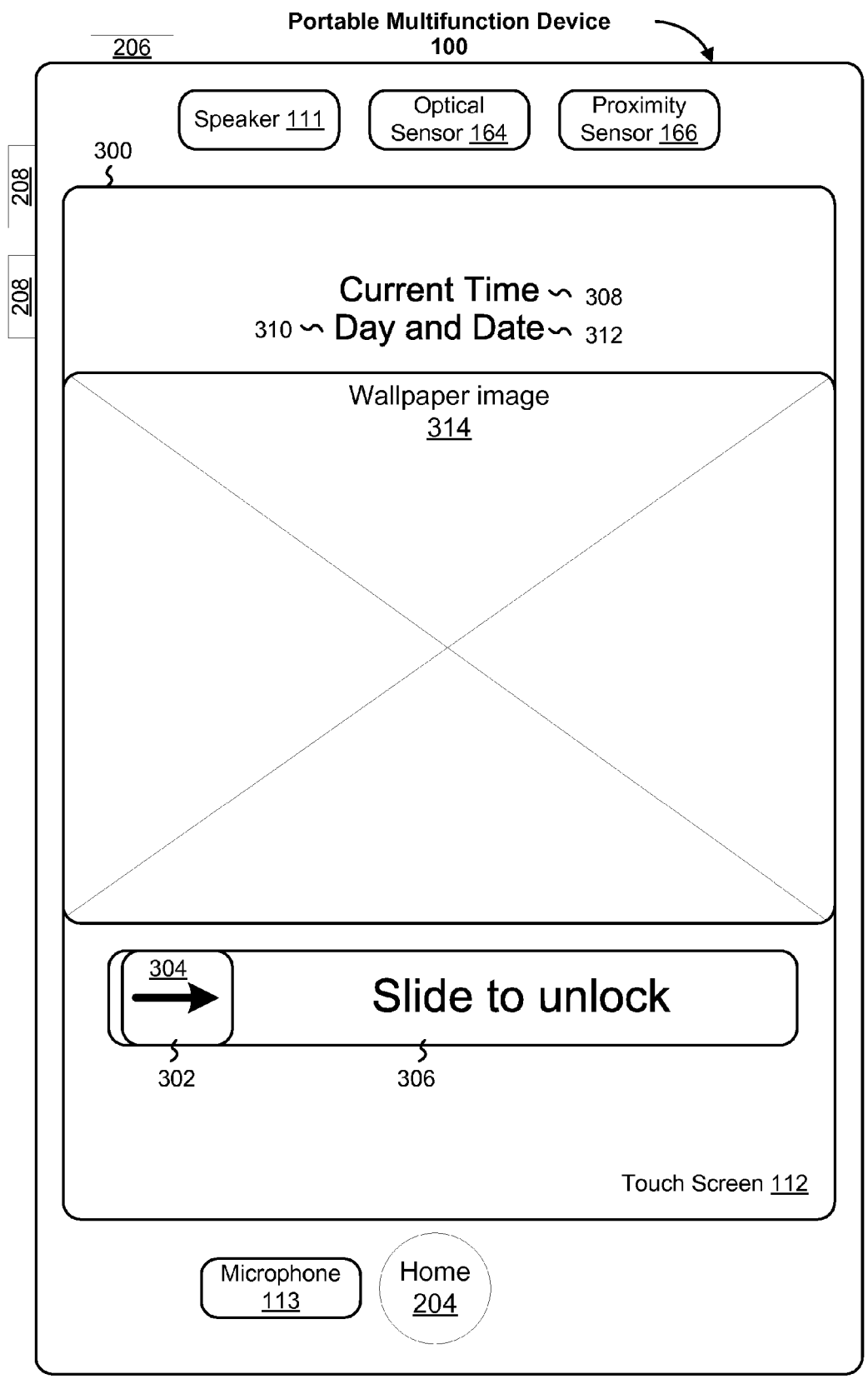
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking a Device by Performing Gestures on an Unlock Image," filed Dec. 23, 2005, which is hereby incorporated by reference.

Figure 4:
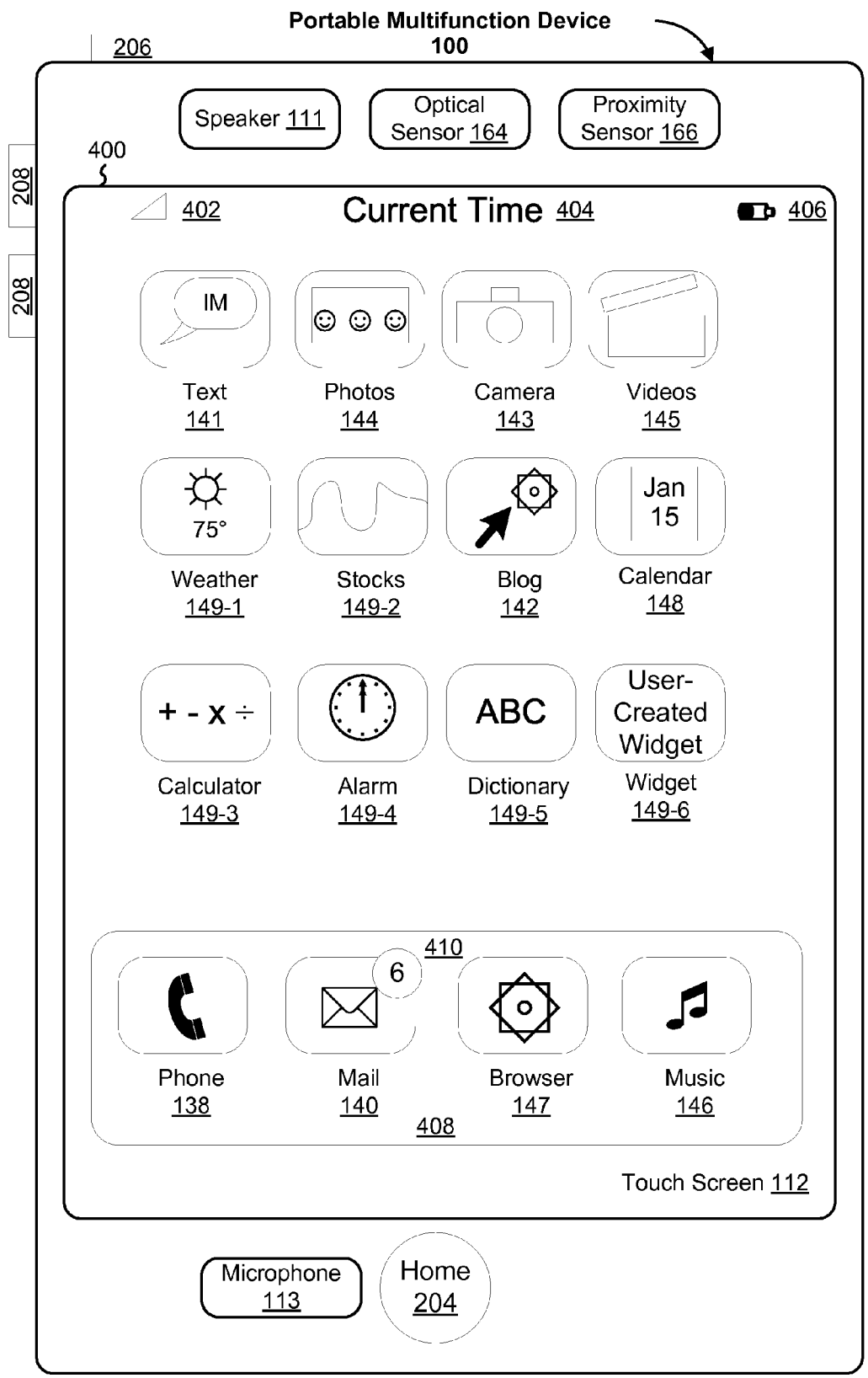
FIG. 4 illustrates an exemplary user interface for a menu of applications on a portable multifunction device in accordance with some embodiments.

FIG. 4 illustrates an exemplary user interface for a menu of applications on a portable multifunction device in accordance with some embodiments. In some embodiments, user interface 400 includes the following elements, or a subset or superset thereof:

Signal strength indicator 402 for wireless communication;
Time 404;
Battery status indicator 406;
Tray 408 with icons for frequently used applications, such as:
  Phone 138;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Blog 142;
  Calendar 148;
  Calculator 149-3;
  Alarm clock 149-4;
  Dictionary 149-5; and
  User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device with Interface Reconfiguration Mode," filed Jul. 24, 2006, which is hereby incorporated by reference. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device, filed Dec. 23, 2005, which is hereby incorporated by reference.

Figure 5:
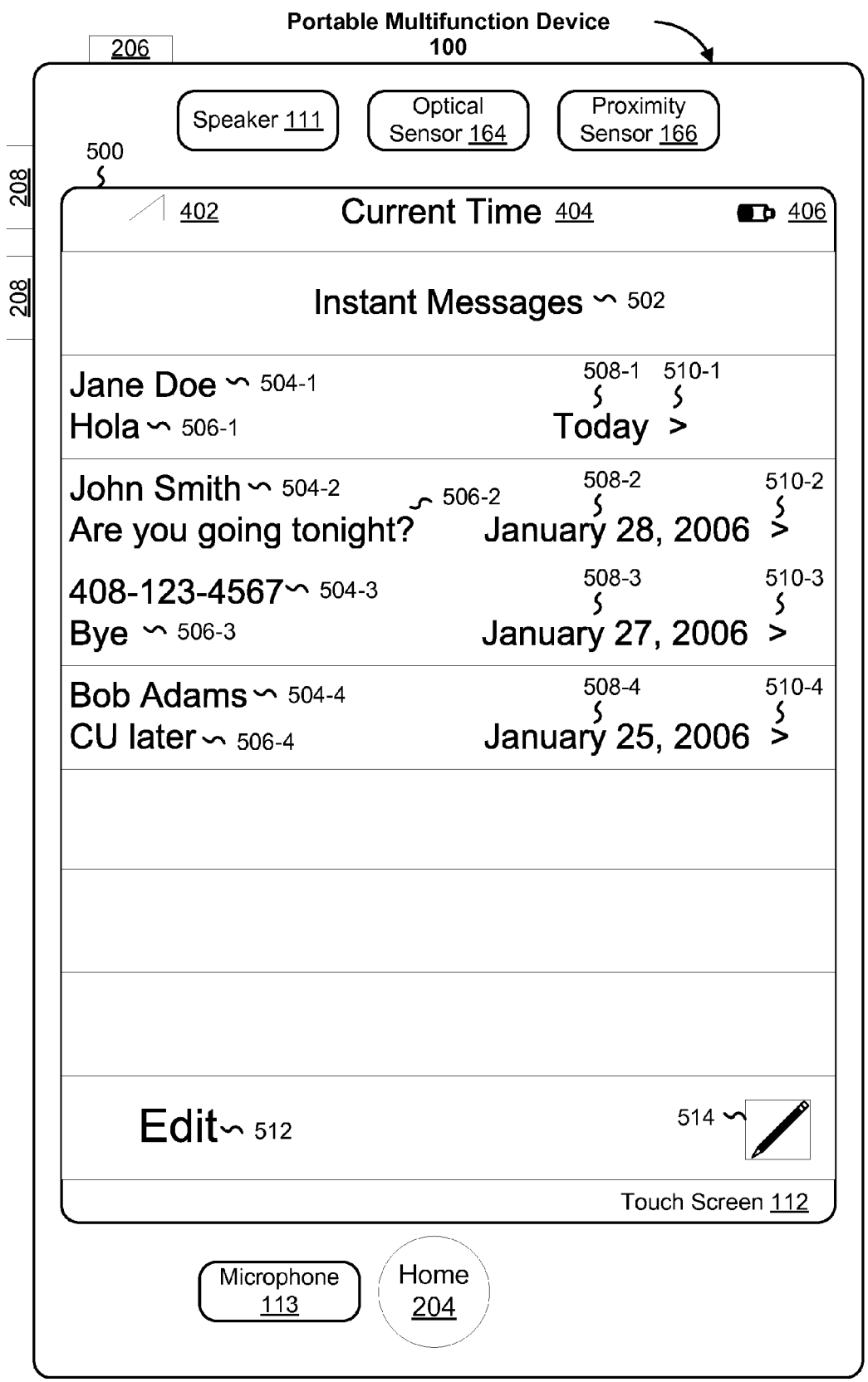
FIG. 5 illustrates an exemplary user interface for listing instant message conversations on a portable multifunction device in accordance with some embodiments.

FIG. 5 illustrates an exemplary user interface for listing instant message conversations on a portable multifunction device in accordance with some embodiments. In some embodiments, user interface 500 includes the following elements, or a subset or superset thereof:

402, 404, and 406, as described above;
"Instant Messages" or other similar label 502:
Names 504 of the people a user is having instant message conversations with (e.g., Jane Doe 504-1) or the phone number if the person's name is not available (e.g., 408-123-4567 504-3);
Text 506 of the last message in the conversation;
Date 508 and/or time of the last message in the conversation;
Selection icon 510 that when activated (e.g., by a finger tap on the icon) initiates transition to a UI for the corresponding conversation (e.g., FIG. 6A for Jane Doe 504-1);
Edit icon 512 that when activated (e.g., by a finger tap on the icon) initiates transition to a UI for deleting conversations (not shown); and
Create message icon 514 that when activated (e.g., by a finger tap on the icon) initiates transition to the users contact list (e.g., FIG. 7A).

In some embodiments, the name 504 used for an instant message conversation is determined by finding an entry in the user's contact list 137 that contains the phone number used for the instant message conversation. If no such entry is found, then just the phone number is displayed (e.g., 504-3).

In some embodiments, if the other party sends messages from two or more different phone numbers, the messages may appear as a single conversation under a single name if all of the phone numbers used are found in the same entry (i.e., the entry for the other party) in the user's contact list 137.

Automatically grouping the instant messages into "conversations" (instant message exchanges with the same user or the same phone number) makes it easier for the user to carry on and keep track of instant message exchanges with multiple parties.

FIGS. 6A-6E illustrate an exemplary user interface for inputting text for an instant message in accordance with some embodiments.

In some embodiments, user interface 600A includes the following elements, or a subset or superset thereof:
- 402, 404, and 406, as described above;
- Name 504 corresponding to the phone number used in the instant message conversation (or the phone number itself if the name is not available);
- Instant messages icon 602 that when activated (e.g., by a finger tap on the icon) initiates transition to a UI listing instant message conversations (e.g., UI 500);
- Instant messages 604 from the other party, typically listed in order along one side of UI 600A;
- Instant messages 606 to the other party, typically listed in order along the opposite side of UI 600A to show the back and forth interplay of messages in the conversation;
- Timestamps 608 for at least some of the instant messages;
- Text entry box 612;
- Send icon 614 that when activated (e.g., by a finger tap on the icon) initiates sending of the message in text box 612 to the other party (e.g., Jane Doe 504-1);
- Letter keyboard 616 for entering text in box 612;
- Alternate keyboard selector icon 618 that when activated (e.g., by a finger tap on the icon) initiates the display of a different keyboard (e.g., 624, FIG. 6C);
- Send icon 620 that when activated (e.g., by a finger tap on the icon) initiates sending of the message in text box 612 to the other party (e.g., Jane Doe 504-1); and
- Shift key 628 that when activated (e.g., by a finger tap on the icon) capitalizes the next letter chosen on letter keyboard 616.

In some embodiments, a user can scroll through the message conversation (comprised of messages 604 and 606) by applying a vertical swipe gesture 610 to the area displaying the conversation. In some embodiments, a vertically downward gesture scrolls the conversation downward, thereby showing older messages in the conversation. In some embodiments, a vertically upward gesture scrolls the conversation upward, thereby showing newer, more recent messages in the conversation. In some embodiments, as noted above, the last message in the conversation (e.g., 606-2) is displayed in the list of instant messages 500 (e.g., 506-1).

In some embodiments, keys in keyboards 616, 624, and/or 638 briefly change shade and/or color when touched/activated by a user to help the user learn to activate the desired keys.

In some embodiments, user interface 600B includes the following elements, or a subset or superset thereof:
- 402, 404, 406, 602, 604, 606, 608, 612, 614, 616, 618, and 620 as described above; and
- word suggestion area 622 that provides a list of possible words to complete the word fragment being typed by the user in box 612.

In some embodiments, the word suggestion area does not appear in UI 600B until after a predefined time delay (e.g., 2-3 seconds) in text being entered by the user. In some embodiments, the word suggestion area is not used or can be turned off by the user.

Figure 6A:
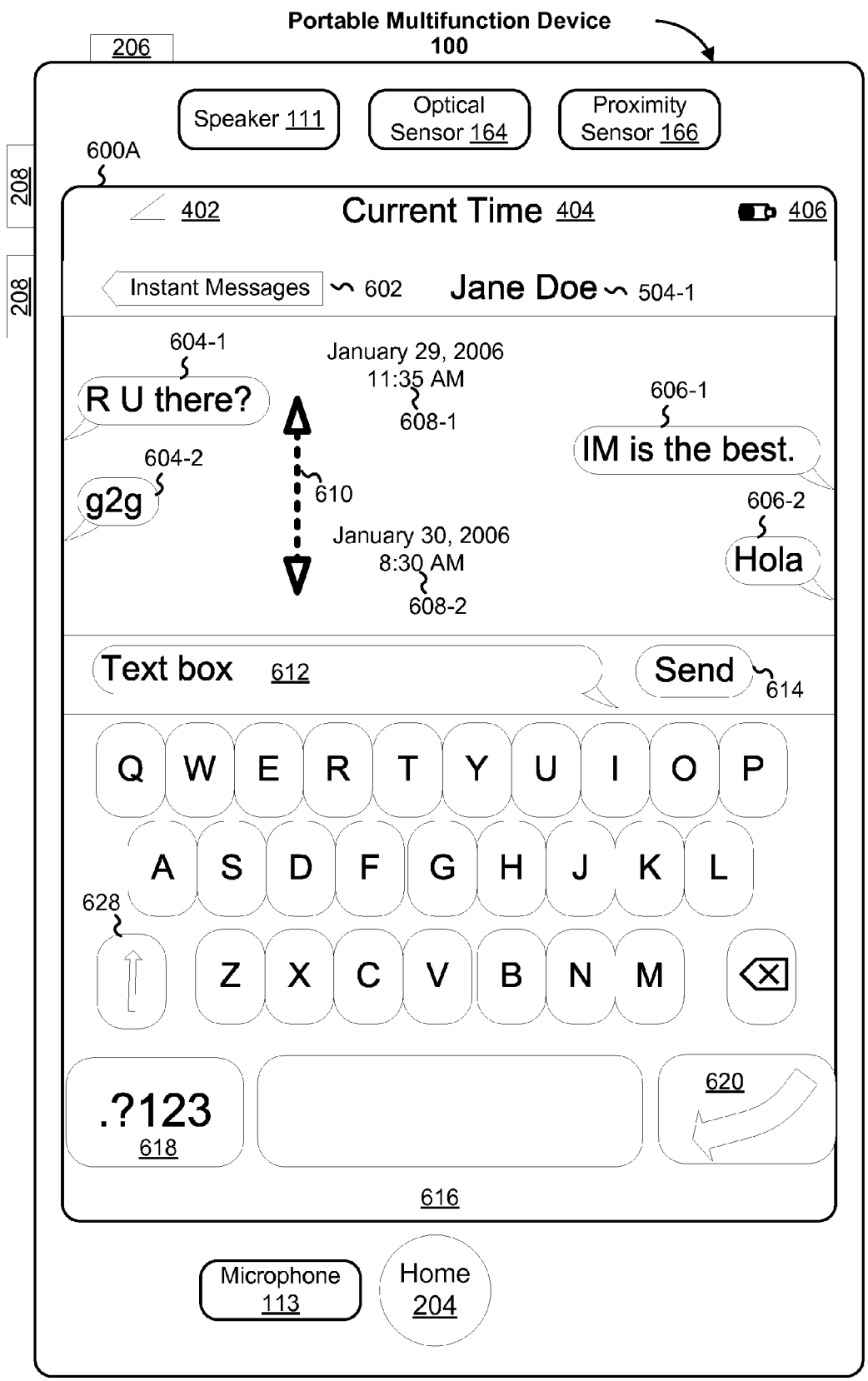
FIGS. 6A-6E illustrate an exemplary user interface for inputting text for an instant message in accordance with some embodiments.
Figure 6B:
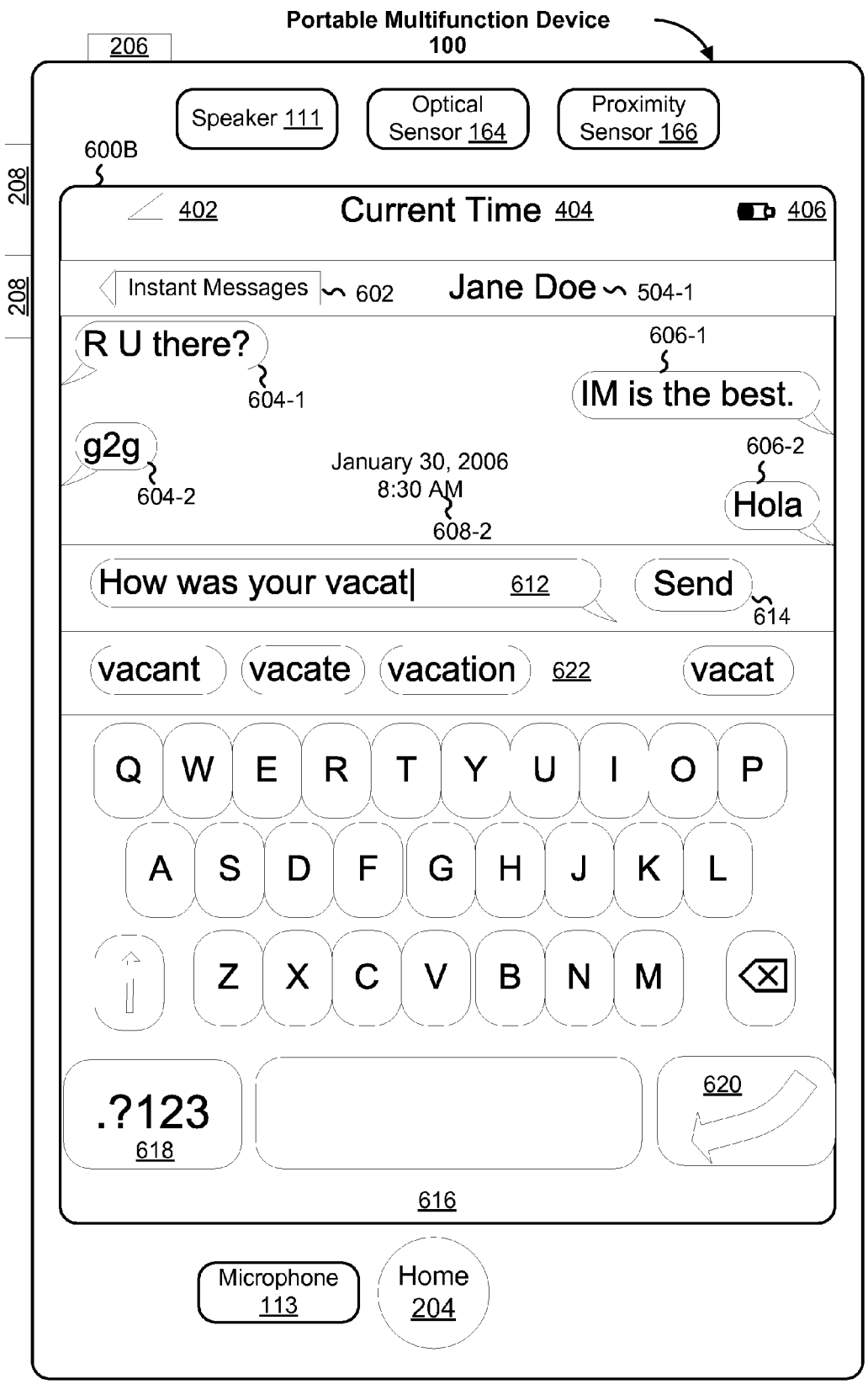
Figure 6C:
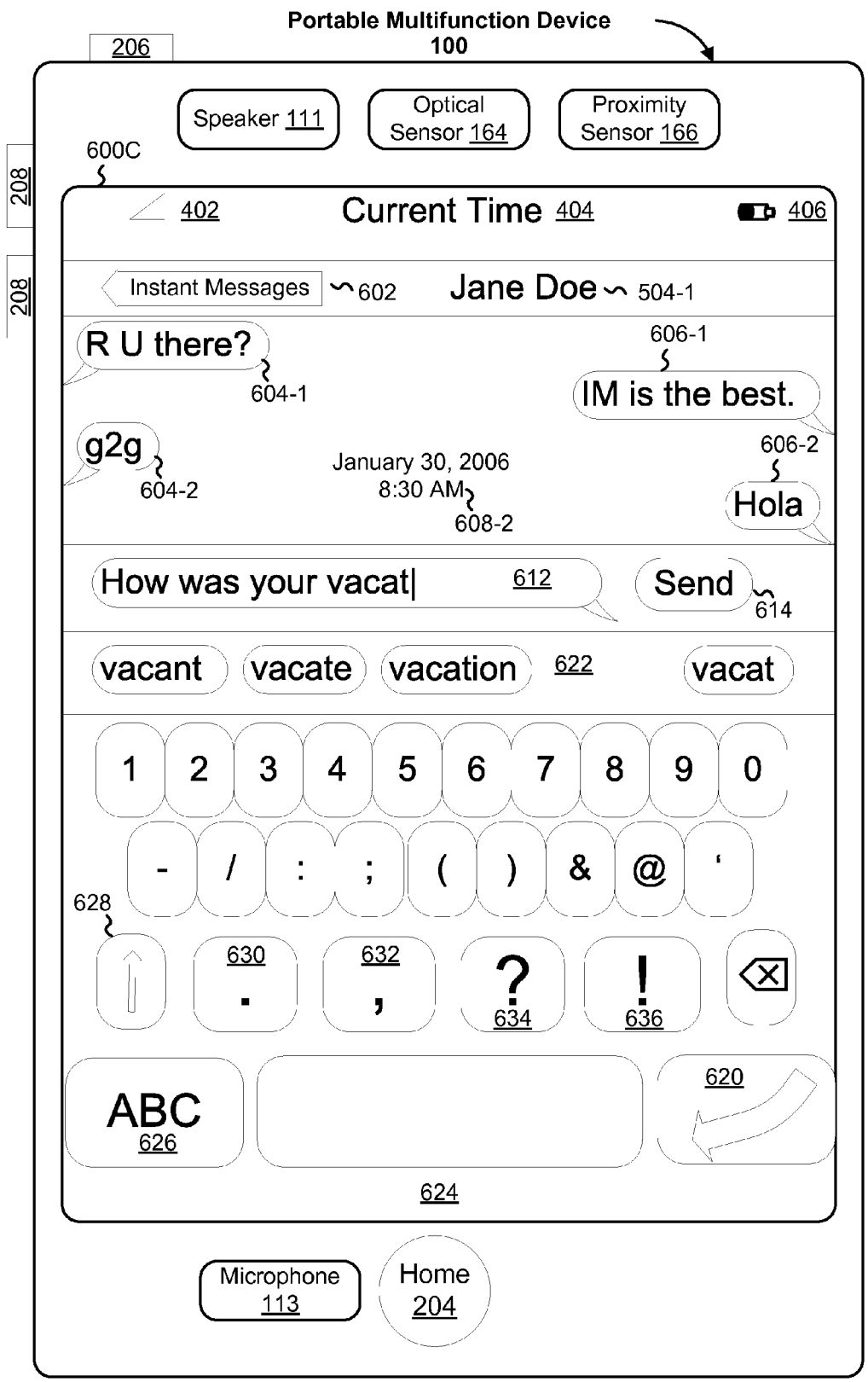
Figure 6D:
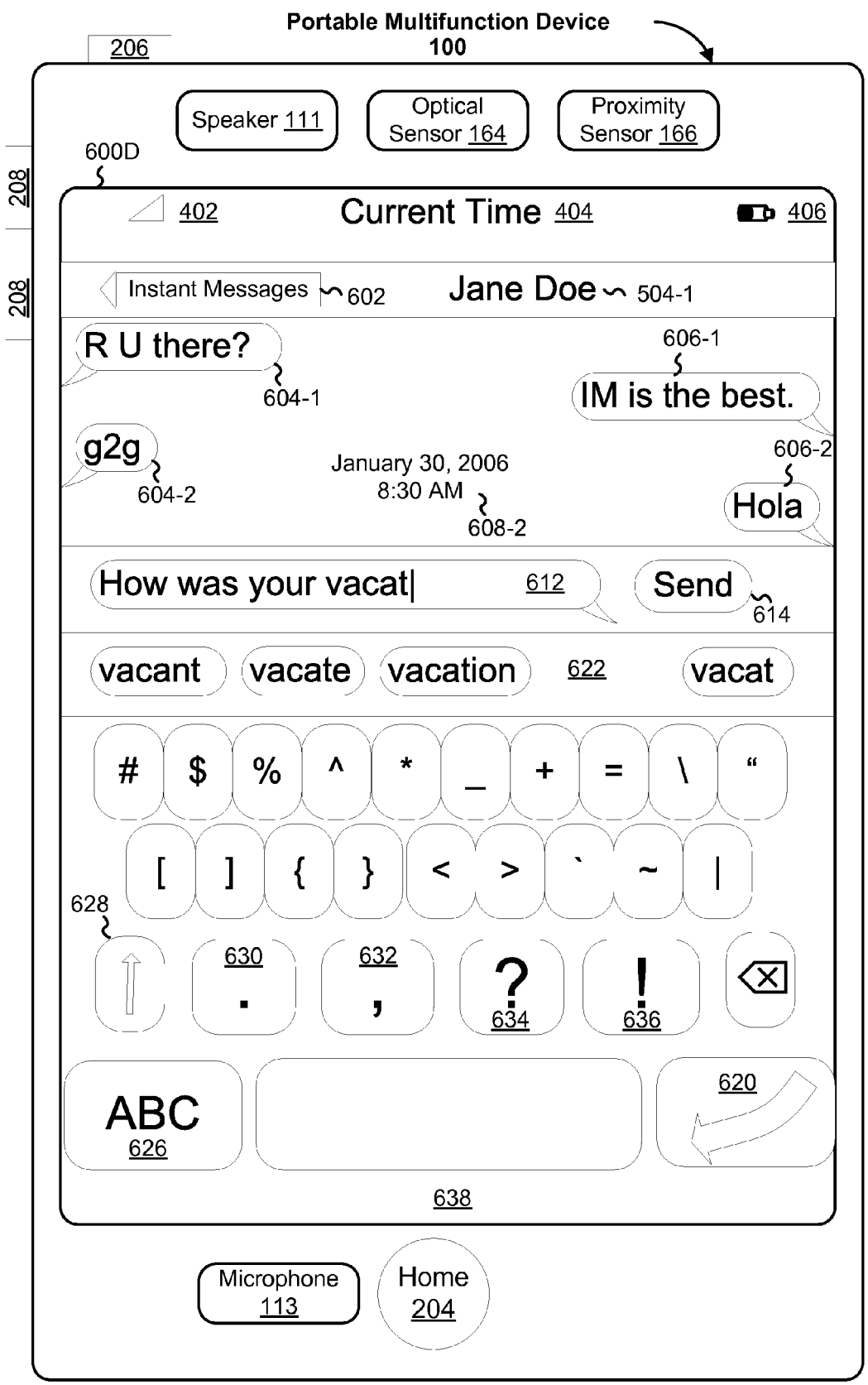

In some embodiments, user interface 600C includes the following elements, or a subset or superset thereof:
- 402, 404, 406, 602, 604, 606, 608, 612, 614, 620, and 622 as described above;
- Alternate keyboard 624, which may be made up primarily of digits and punctuation, with frequently used punctuation keys (e.g., period key 630, comma key 632, question mark key 634, and exclamation point key 636) made larger than the other keys;
- Letter keyboard selector icon 626 that when activated (e.g., by a finger tap on the icon) initiates the display of a letter keyboard (e.g., 616, FIG. 6A); and
- Shift key 628 that when activated (e.g., by a finger tap on the icon) initiates display of yet another keyboard (e.g., 638, FIG. 6D).

In some embodiments, keeping the period key 630 near keyboard selector icon 626 reduces the distance that a user's finger needs to travel to enter the oft-used period.

In some embodiments, user interface 600D includes the following elements, or a subset or superset thereof:
- 402, 404, 406, 602, 604, 606, 608, 612, 614, 620, 622, 626, 628 as described above; and
- Another alternate keyboard 638, which may be made up primarily of symbols and punctuation, with frequently used punctuation keys (e.g., period key 630, comma key 632, question mark key 634, and exclamation point key 636) made larger than the other keys.

In some embodiments, user interface 600E includes the following elements, or a subset or superset thereof:
- 402, 404, 406, 602, 604, 606, 608, 612, 614, 616, 618, and 620, as described above; and
- New instant message 606-3 sent to the other party.

Figure 6E:
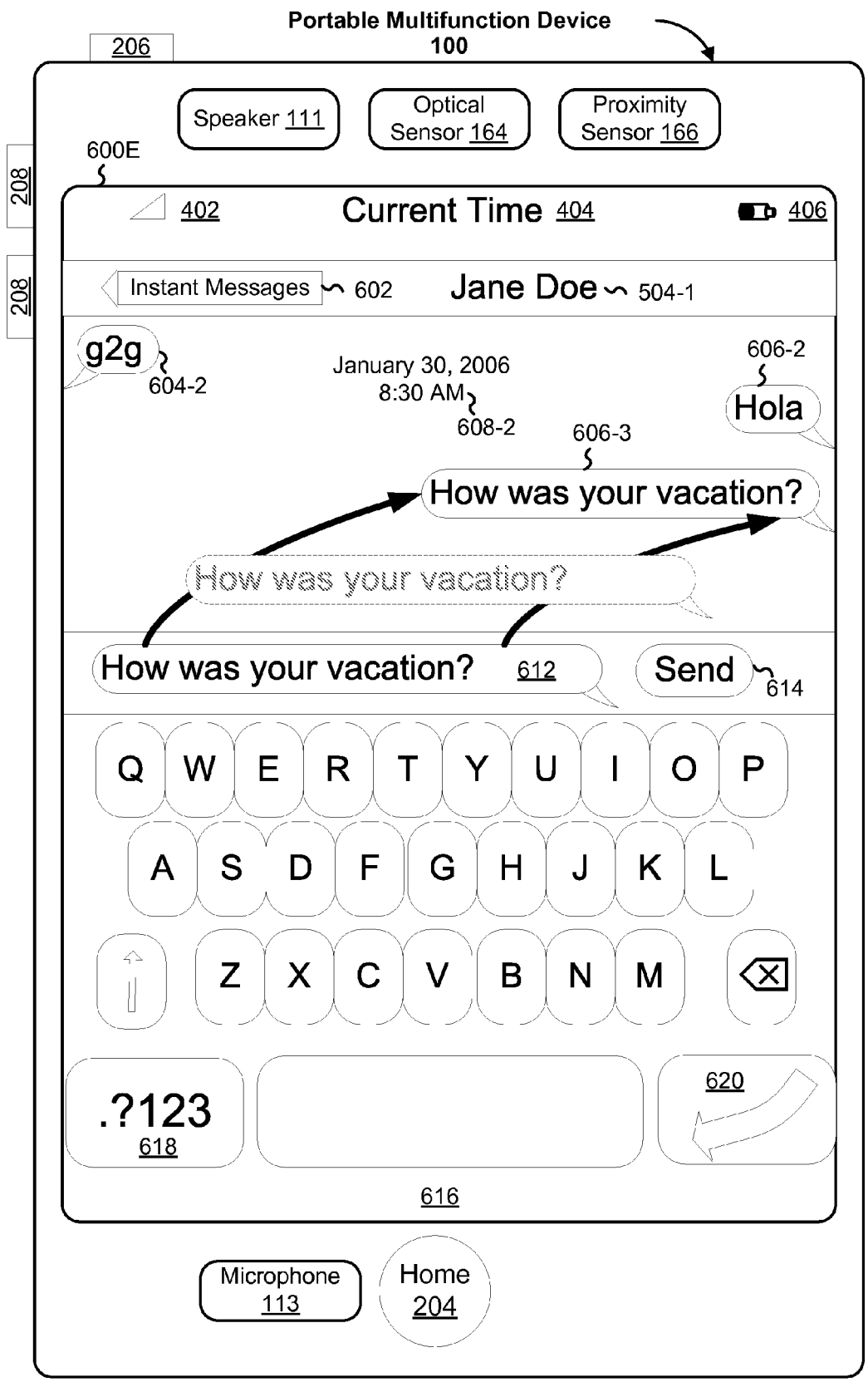

In some embodiments, when the user activates a send key (e.g., either 614 or 620), the text in text box 612 "pops" or otherwise comes out of the box and becomes part of the string of user messages 606 to the other party. The black arrows in FIG. 6E illustrate an animated formation of a quote bubble 606-3. In some embodiments, the size of the quote bubble scales with the size of the message. In some embodiments, a sound is also made when the message is sent, such as a droplet sound, to notify the user.

Figure 7A:
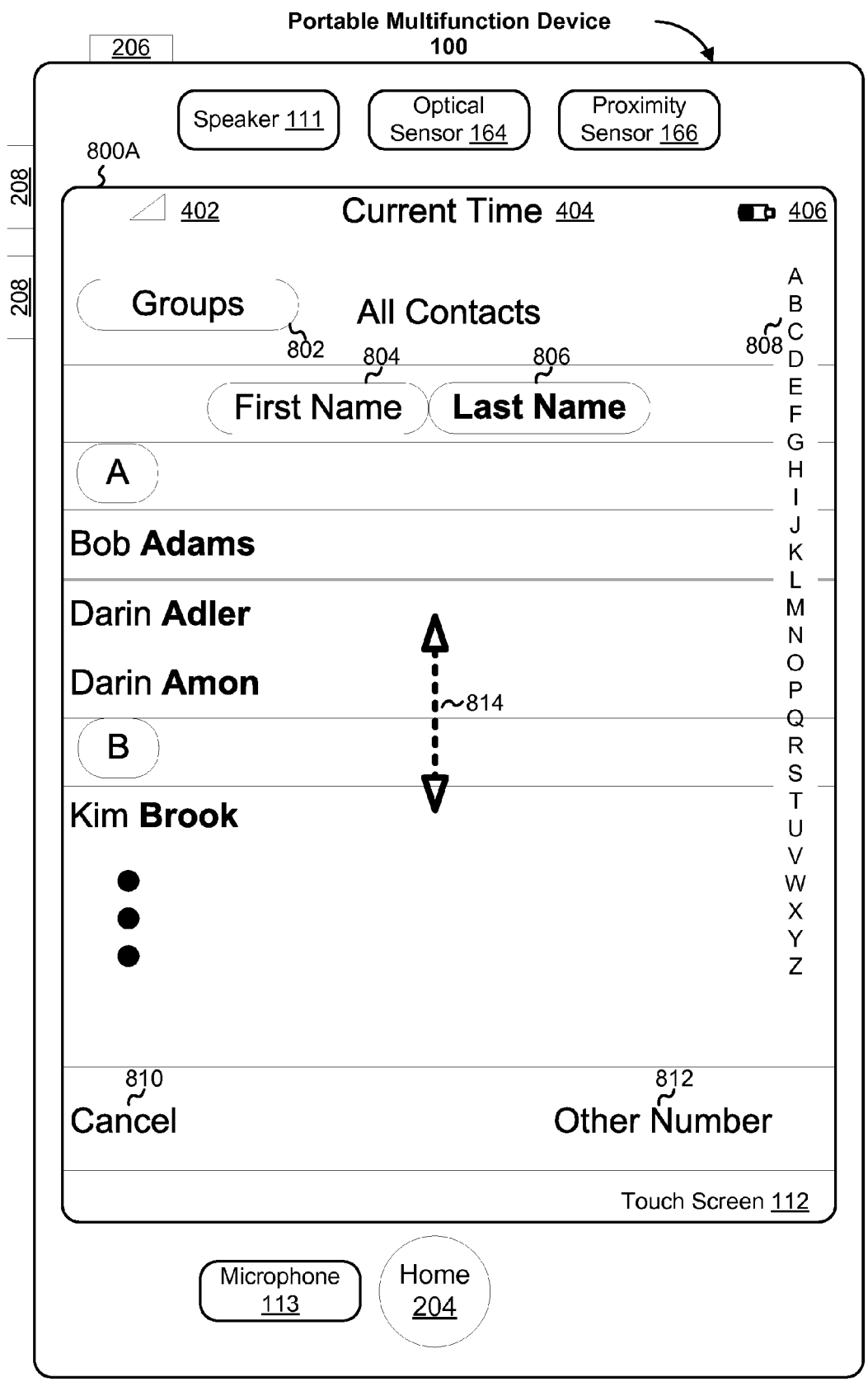
FIGS. 7A and 7B illustrate an exemplary user interface for a contact list in accordance with some embodiments.
Figure 7B:
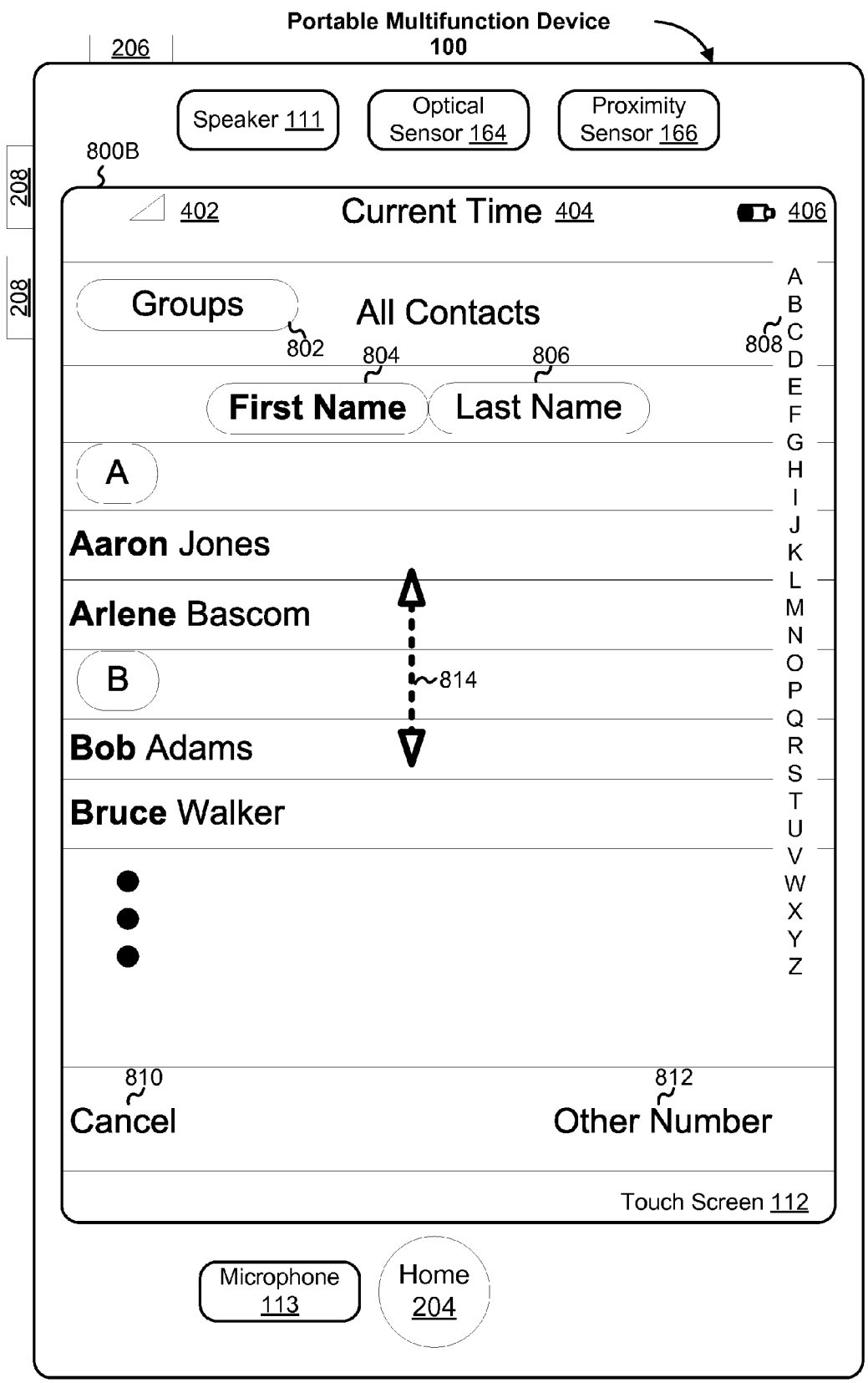

FIGS. 7A and 7B illustrate an exemplary user interface for a contact list in accordance with some embodiments.

Figure 8:
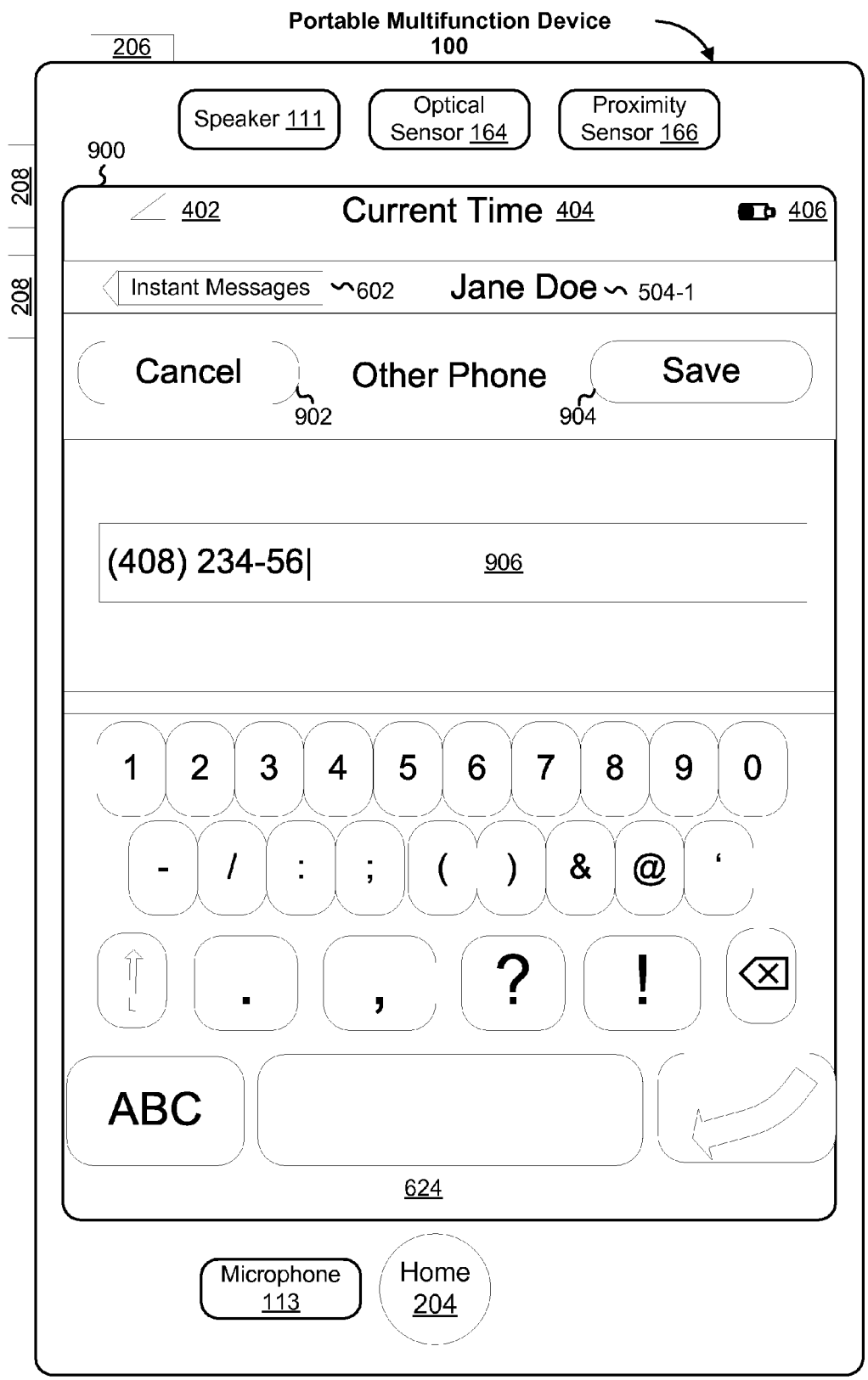
FIG. 8 illustrates an exemplary user interface for entering a phone number for instant messaging in accordance with some embodiments.

In some embodiments, user interfaces 800A and 800B include the following elements, or a subset or superset thereof:
- 402, 404, 406, as described above;
- Groups icon 802 that when activated (e.g., by a finger tap on the icon) initiates display of groups of contacts;
- First name icon 804 that when activated (e.g., by a finger tap on the icon) initiates an alphabetical display of the user's contacts by their first names (FIG. 7B);
- Last name icon 806 that when activated (e.g., by a finger tap on the icon) initiates an alphabetical display of the user's contacts by their last names (FIG. 7A);
- Alphabet list icons 808 that the user can touch to quickly arrive at a particular first letter in the displayed contact list;
- Cancel icon 810 that when activated (e.g., by a finger tap on the icon) initiates transfer back to the previous UI (e.g., UI 500, FIG. 5); and
- Other number icon 812 that when activated (e.g., by a finger tap on the icon) initiates transfer to a UI for entering a phone number for instant messaging, such as a phone number that is not in the user's contact list (e.g., UI 900, FIG. 8).

As described in U.S. patent application Ser. No. 11/322,547, "Scrolling List with Floating Adjacent Index Symbols," filed Dec. 23, 2005, which is hereby incorporated by reference, the user may scroll through the contact list using vertically upward and/or vertically downward gestures 814 on the touch screen.

FIG. 8 illustrates an exemplary user interface for entering a phone number for instant messaging in accordance with some embodiments. In some embodiments, user interface 900 includes the following elements, or a subset or superset thereof:
- 402, 404, 406, 602, and 624, as described above;
- Cancel icon 902 that when activated (e.g., by a finger tap on the icon) initiates transfer back to the previous UI (e.g., UI 800A or UI 800B, FIG. 7A or 7B);
- Save icon 904 that when activated (e.g., by a finger tap on the icon) initiates saving the entered phone number in the instant messages conversation list (e.g., UI 500, FIG. 5) and displaying a UI to compose an instant message to be sent to the entered phone number (e.g., UI 600A, FIG. 6A); and
- Number entry box 906 for entering the phone number using keyboard 624.

Note that the keyboard displayed may depend on the application context. For example, the UI displays a soft keyboard with numbers (e.g., 624) when numeric input is needed or expected. The UI displays a soft keyboard with letters (e.g., 616) when letter input is needed or expected.

Figure 9:
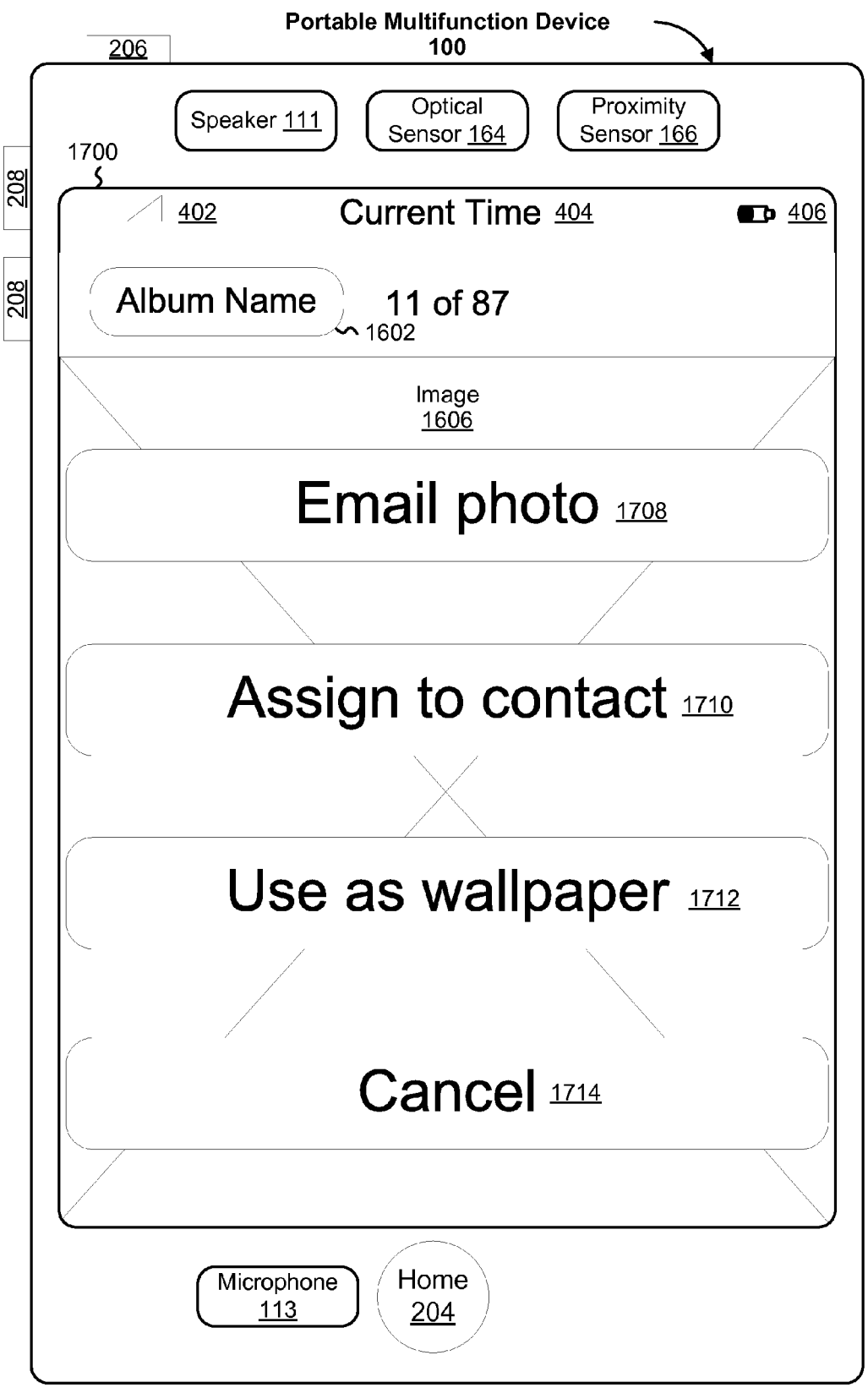
FIG. 9 illustrates an exemplary user interface for selecting a use for an image in accordance with some embodiments.

FIG. 9 illustrates an exemplary user interface for selecting a use for an image in accordance with some embodiments. In some embodiments, image management module 144 has a user interface 1700 that includes the following elements, or a subset or superset thereof:
- 402, 404, and 406, as described above;
- album name icon 1602 and image 1606;
- Email photo icon 1708 that when activated (e.g., by a finger tap on the icon) initiates a process for incorporating the image 1606 in an email (e.g., as illustrated in FIGS. 10A-10G);
- Assign to contact icon 1710 that when activated (e.g., by a finger tap on the icon) initiates a process for associating the image 1606 with a contact in the user's contact list;
- Use as wallpaper icon 1712 that when activated (e.g., by a finger tap on the icon) initiates a process for incorporating the image 1606 in the user's wallpaper; and
- Cancel icon 1714 that when activated (e.g., by a finger tap on the icon) initiates transfer back to the previous UI.

FIGS. 10A-10G illustrate an exemplary user interface for incorporating an image 1606 in an email in accordance with some embodiments.

Figure 10A:
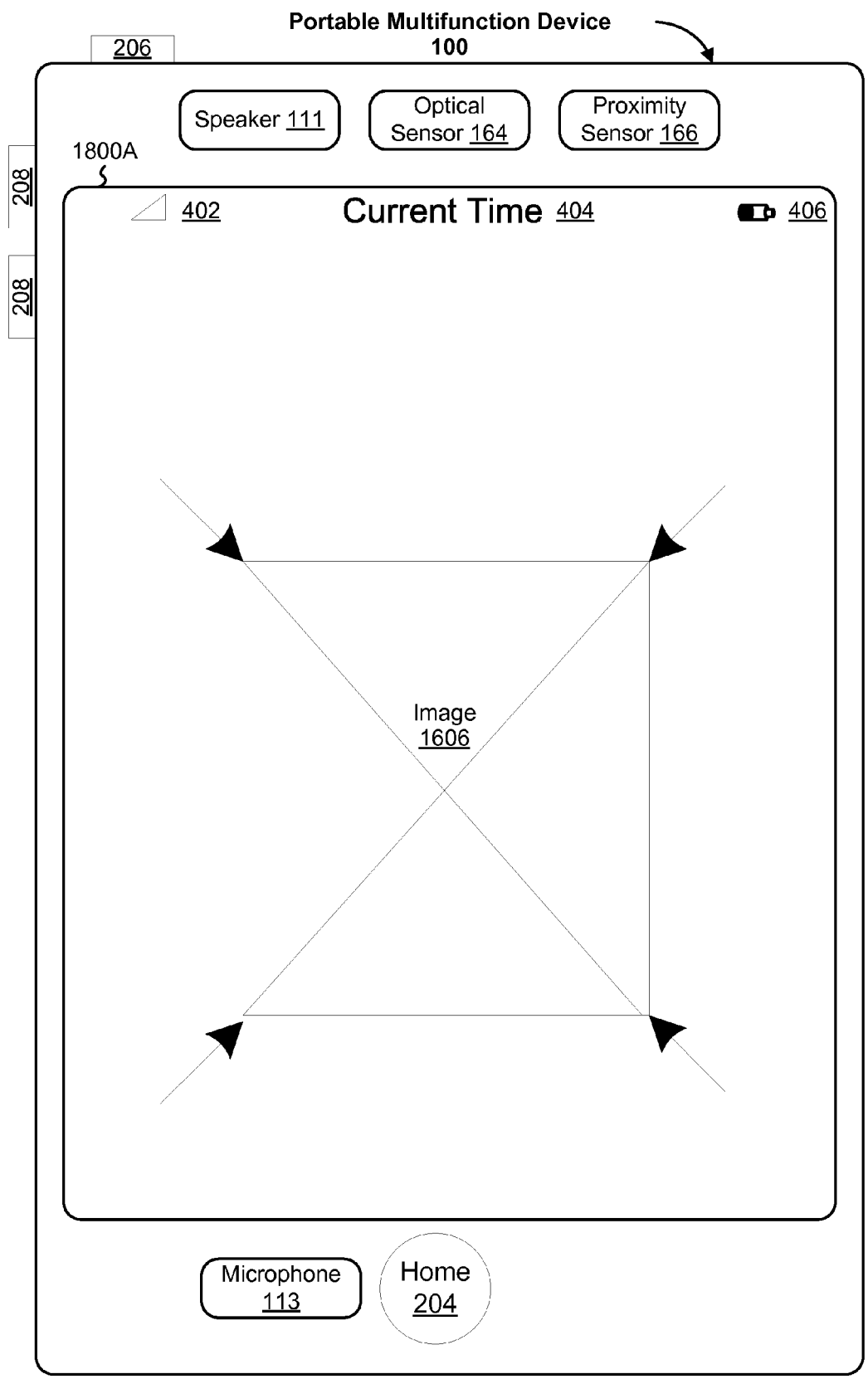
FIGS. 10A-10G illustrate an exemplary user interface for incorporating an image in an email in accordance with some embodiments.
Figure 10B:
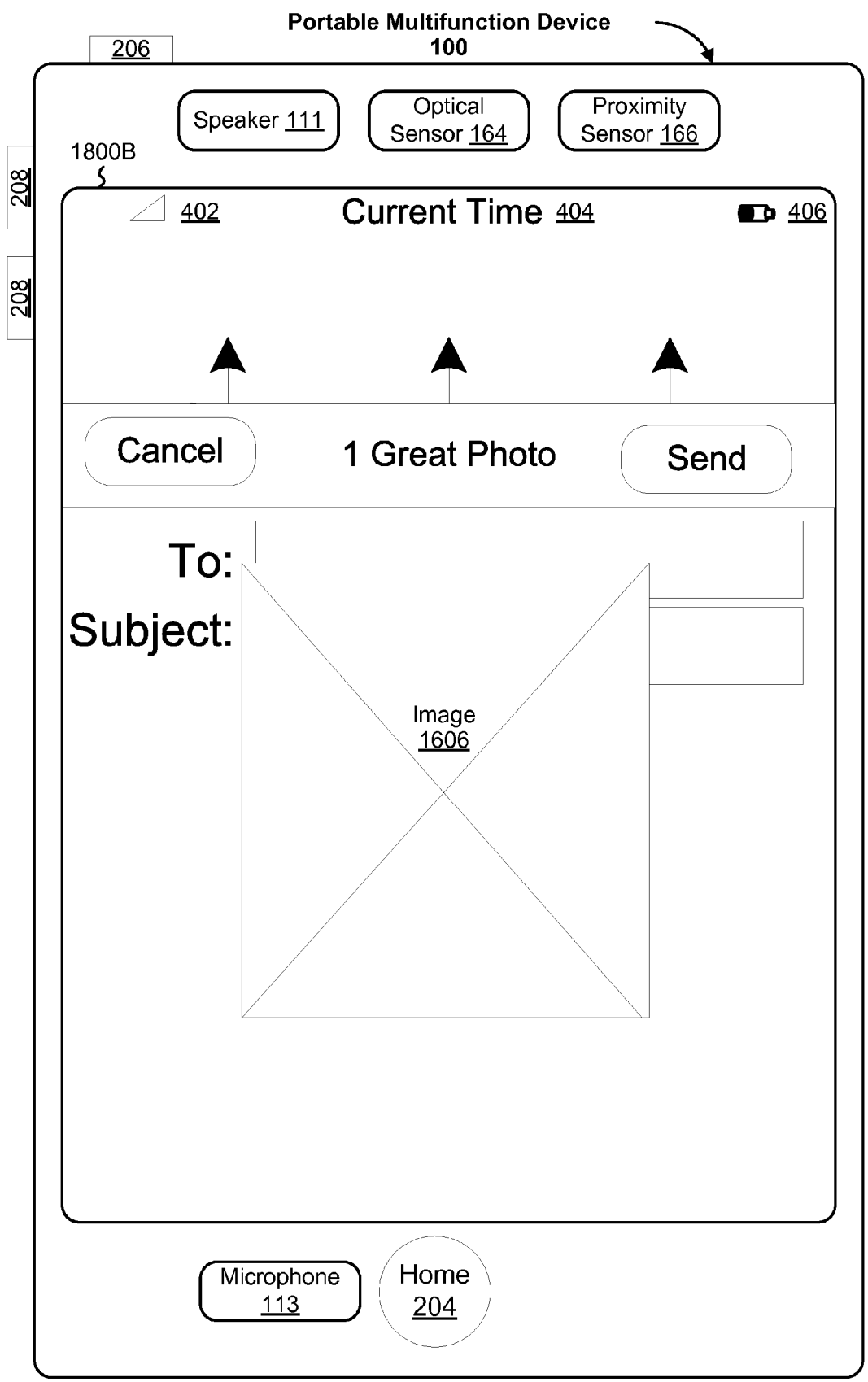
Figure 10C:
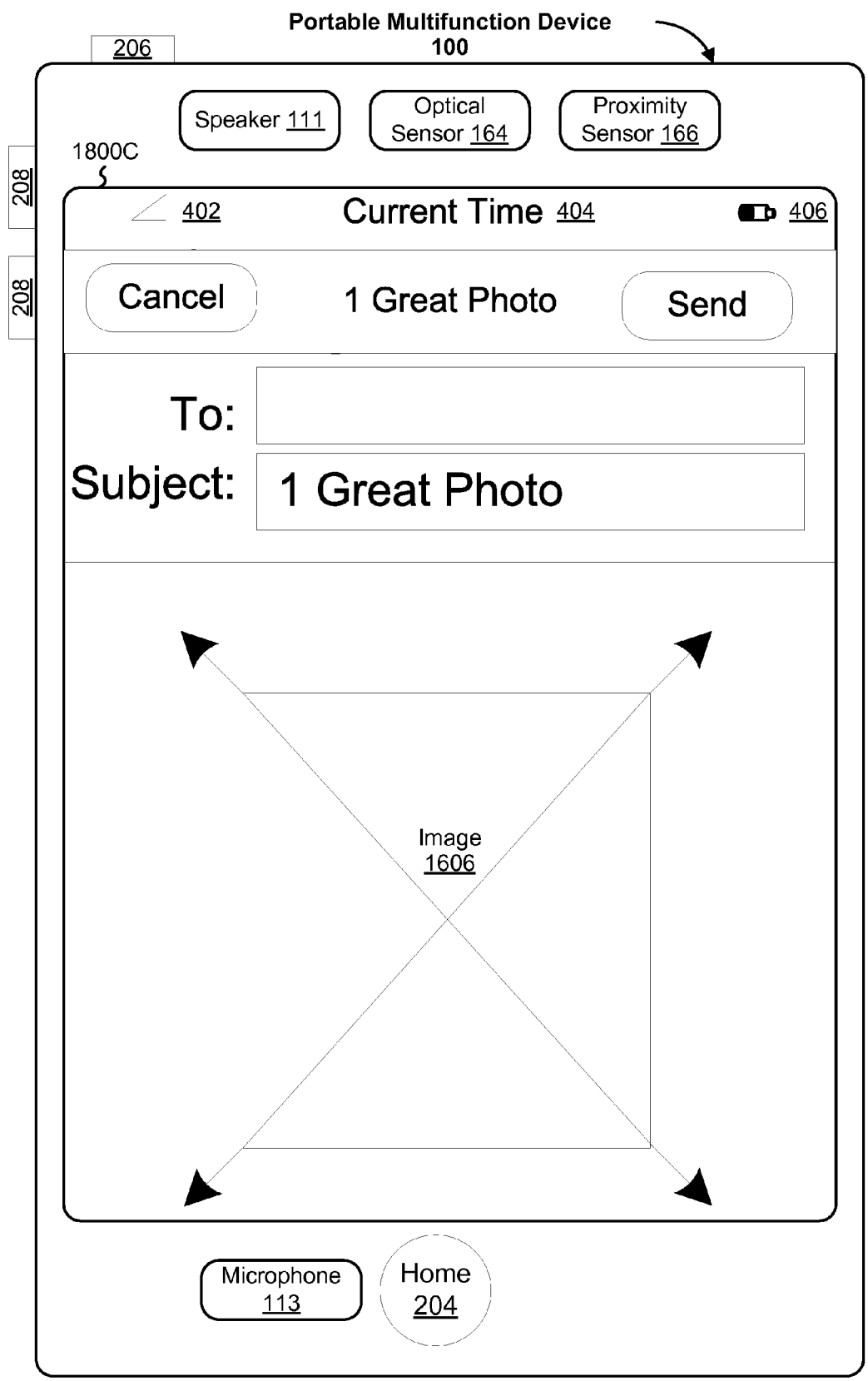

In response to the user activating Email photo icon 1708, the device displays an animation to show that the image has been placed into an email message, ready for text input, addressing, and sending. In some embodiments, the animation includes initially shrinking the image (FIG. 10A); sliding or otherwise forming an email message template behind the image 1606 (FIG. 10B); and expanding the image (FIG. 10C).

Figure 10D:
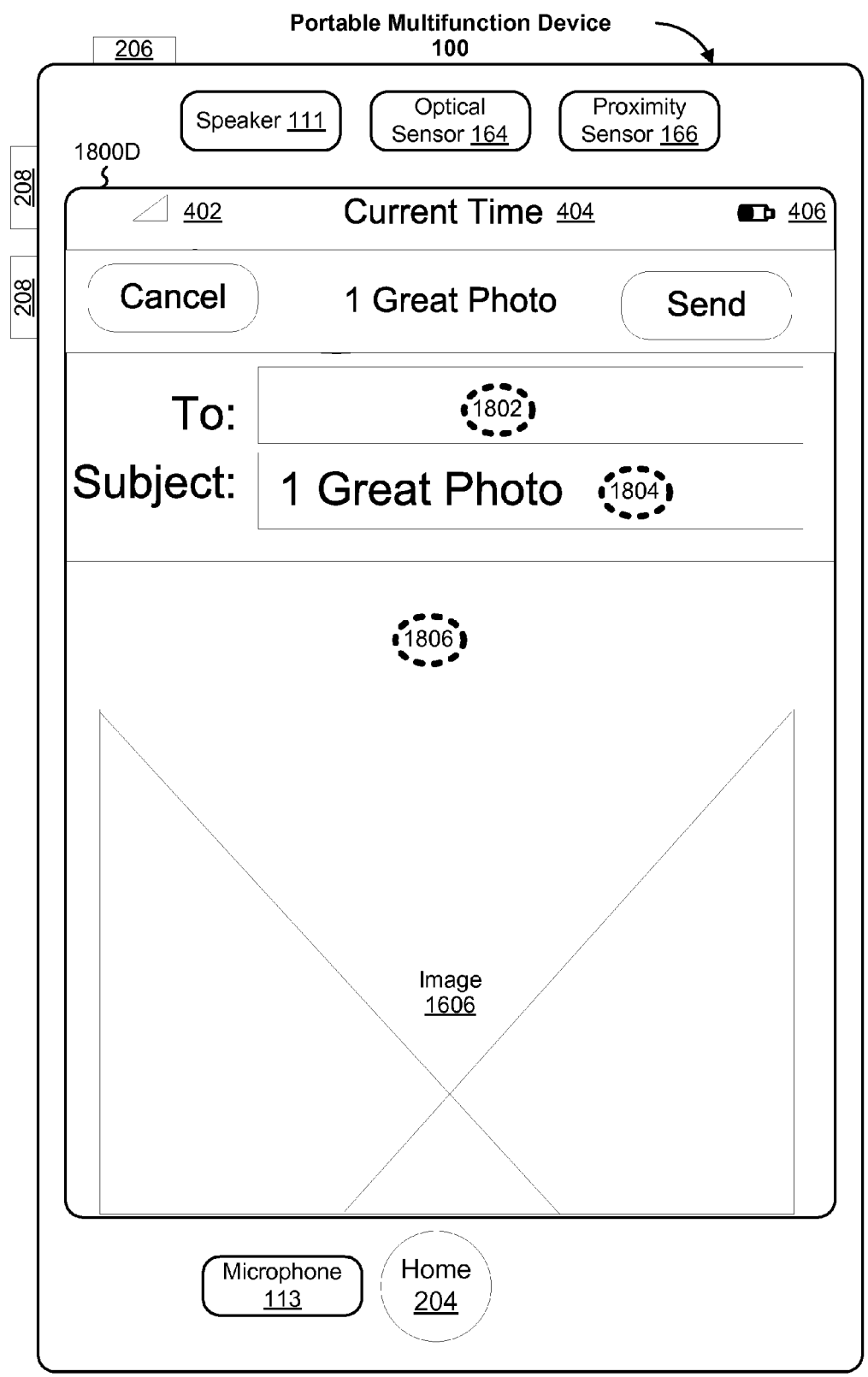
Figure 10E:
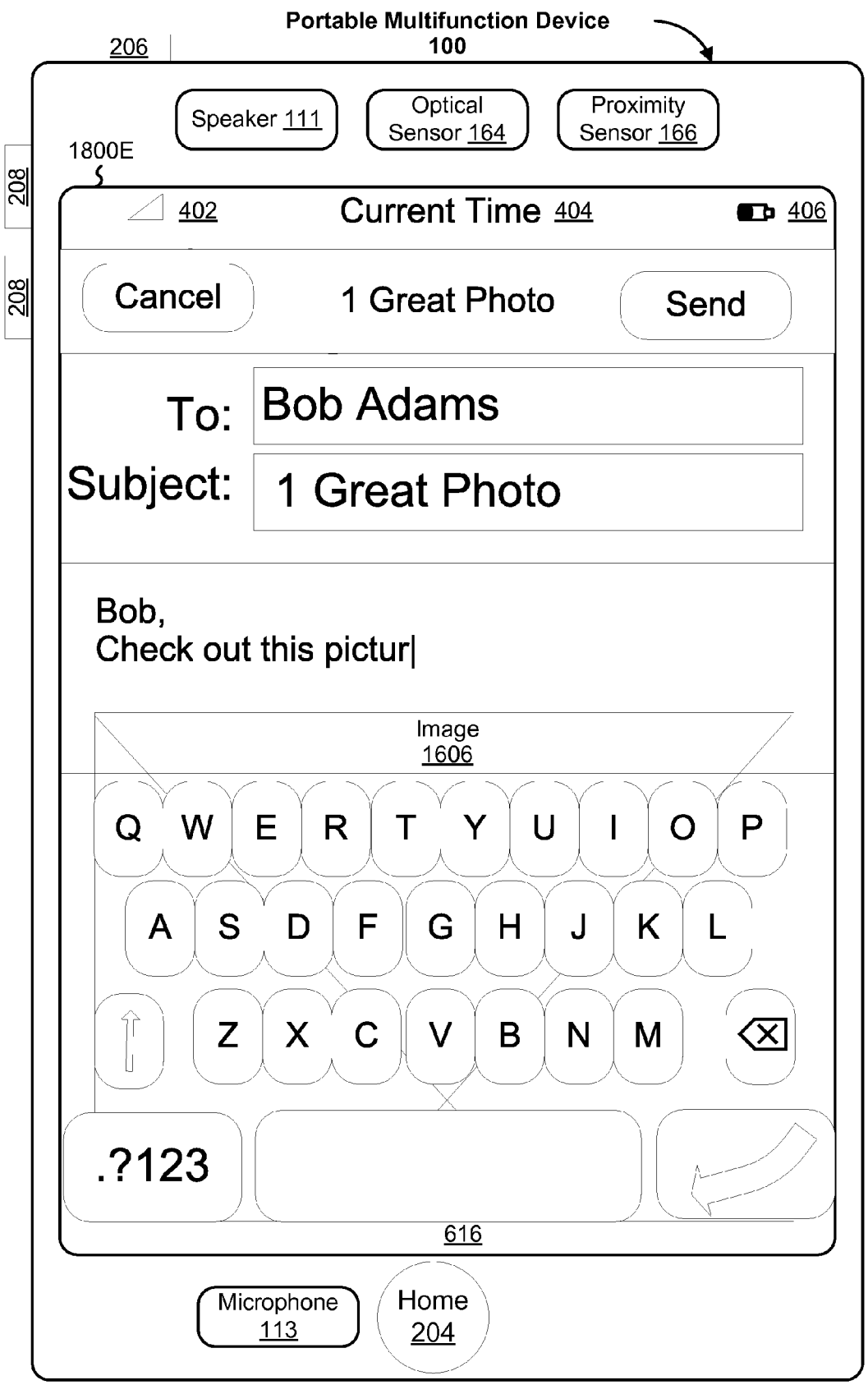
Figure 10F:
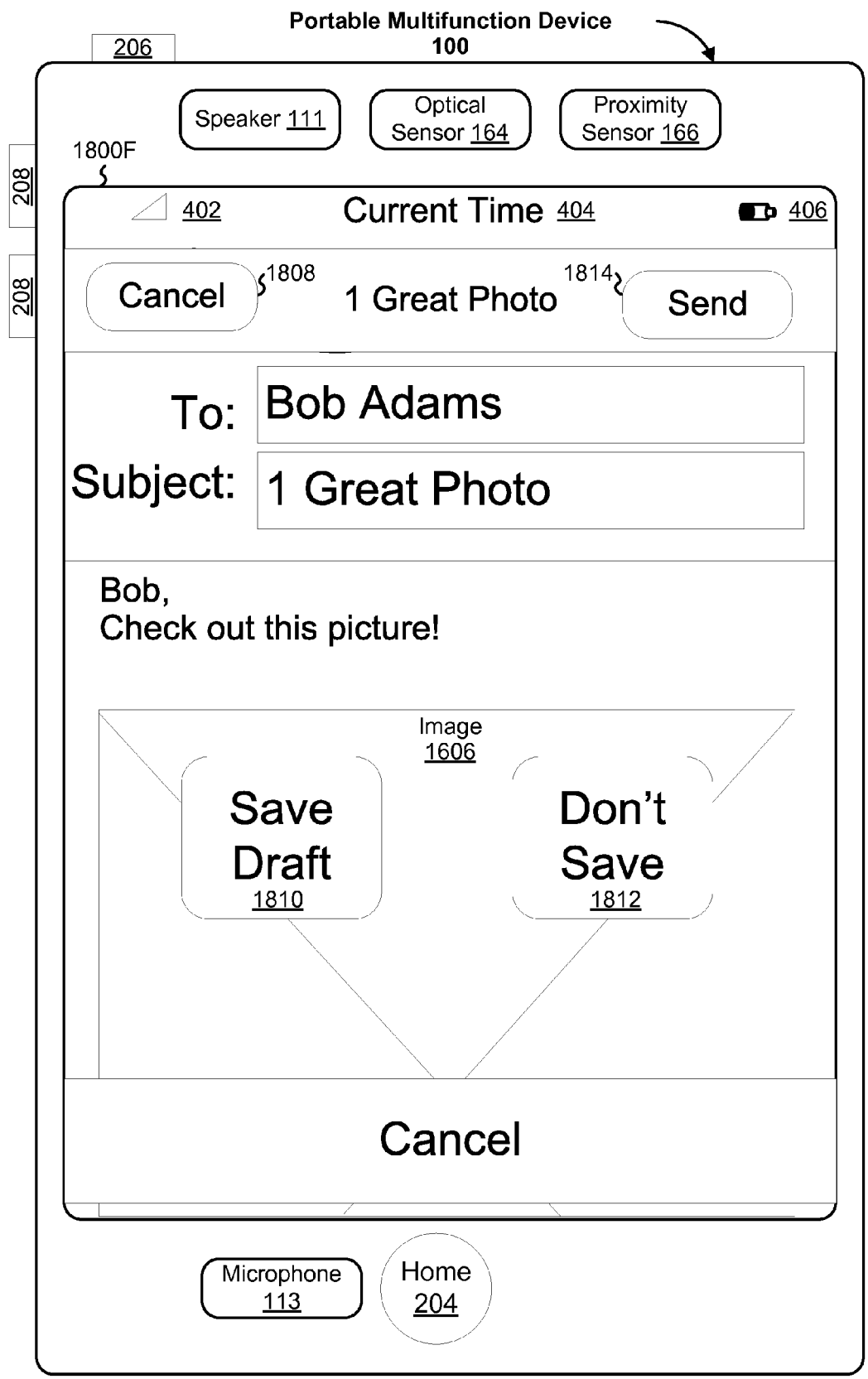
Figure 10G:
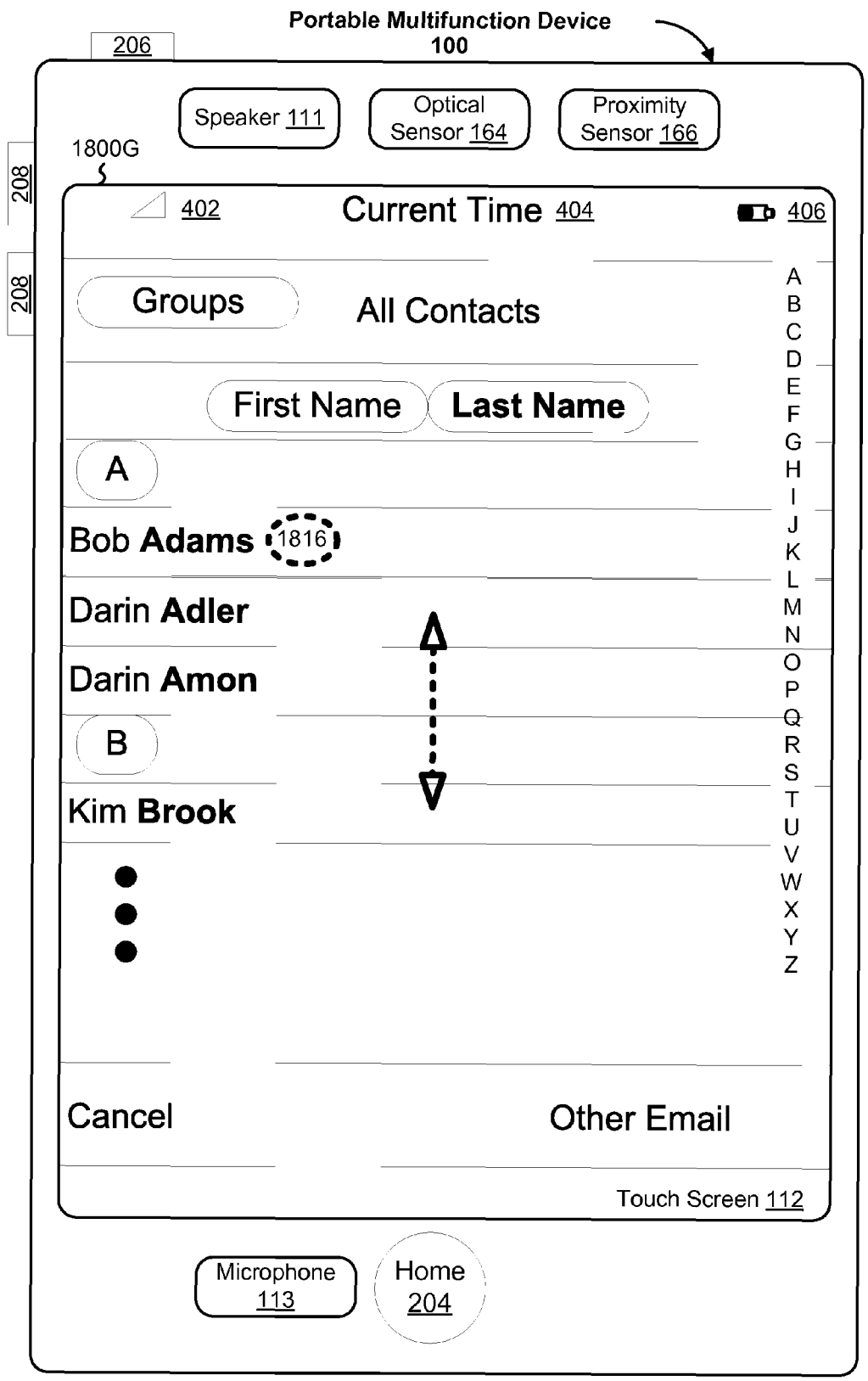

In some embodiments, if the user makes a tap or other predefined gesture on the subject line 1804 or in the body of the email 1806 (FIG. 10D), a letter keyboard 616 appears and the user may input the subject and/or body text (FIG. 10E). In some embodiments, to enter the email address, the user makes a tap or other predefined gesture on the To: line 1802 of the email; the user's contact list appears (FIG. 10G); the user makes a tap or other predefined gesture on the desired recipient/contact (e.g., tapping 1816 on Bob Adams in FIG. 10G); and the device places the corresponding email address in the email message (FIG. 10E). In some embodiments, the user may also enter the email address using one or more keyboards (e.g., 616 and 624, not shown). The device sends the email message in response to the user activating the send icon 1814 (FIG. 10F) (e.g., by a finger tap on the icon). Alternatively, if the user activates the cancel icon 1808, the device may display the save draft icon 1810 and the don't save icon 1812. The device saves the draft if the user activates the save draft icon 1810, e.g., in a drafts folder in email client 140 (not shown). The device deletes the draft if the user activates the don't save icon 1812.

Figure 11A:
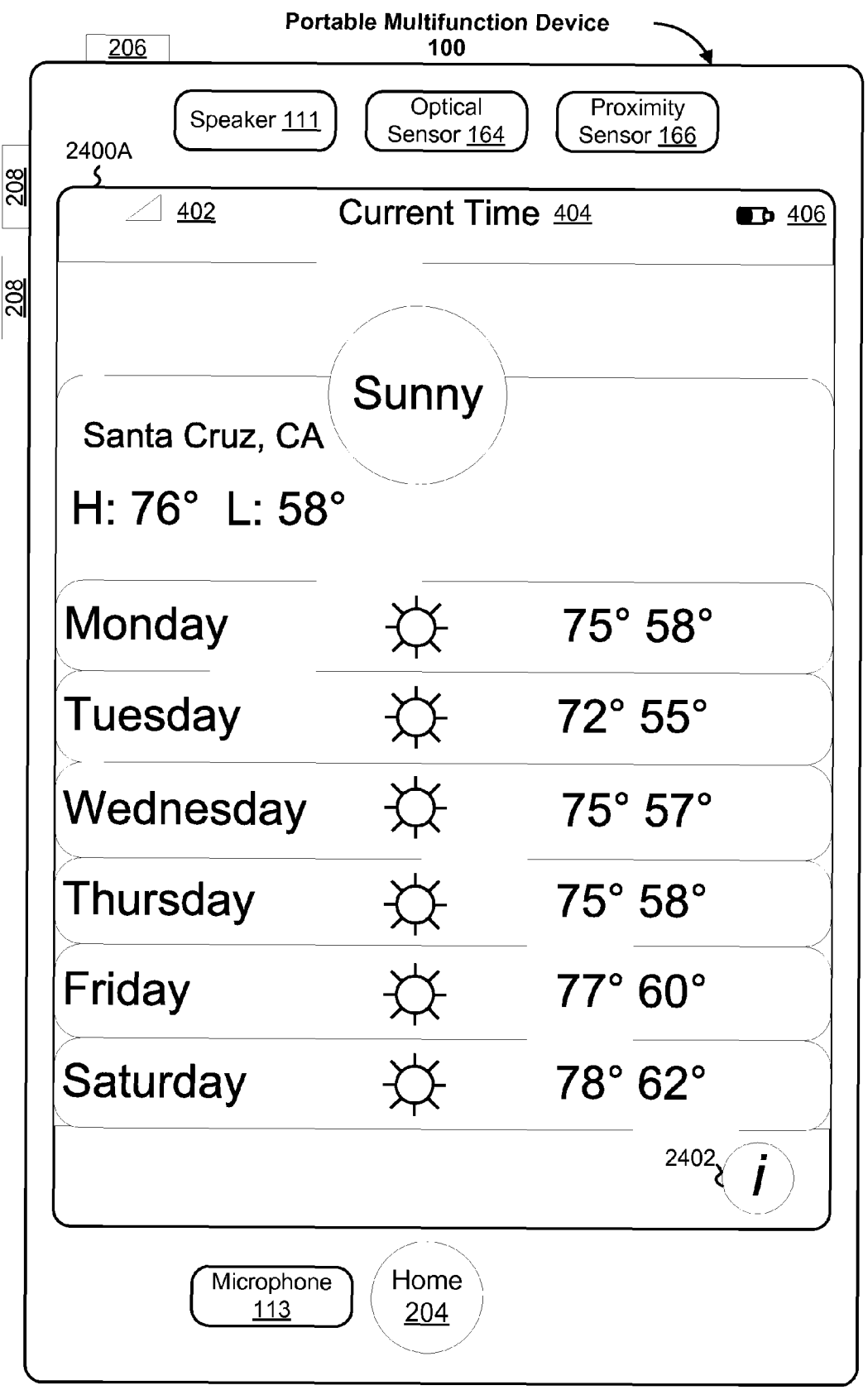
FIGS. 11A-11C illustrate an exemplary user interface for displaying and managing a weather widget in accordance with some embodiments.
Figure 11B:
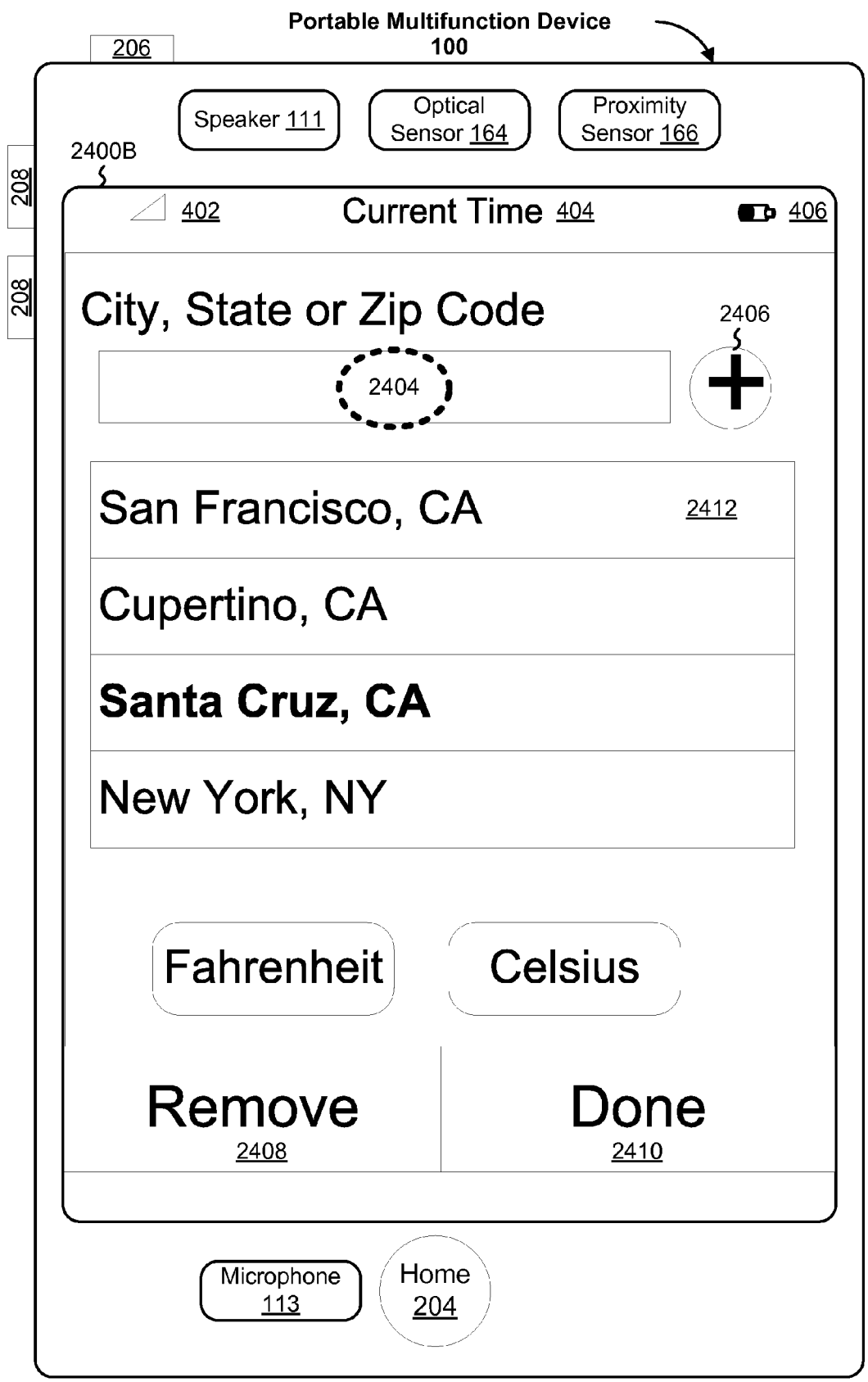
Figure 11C:
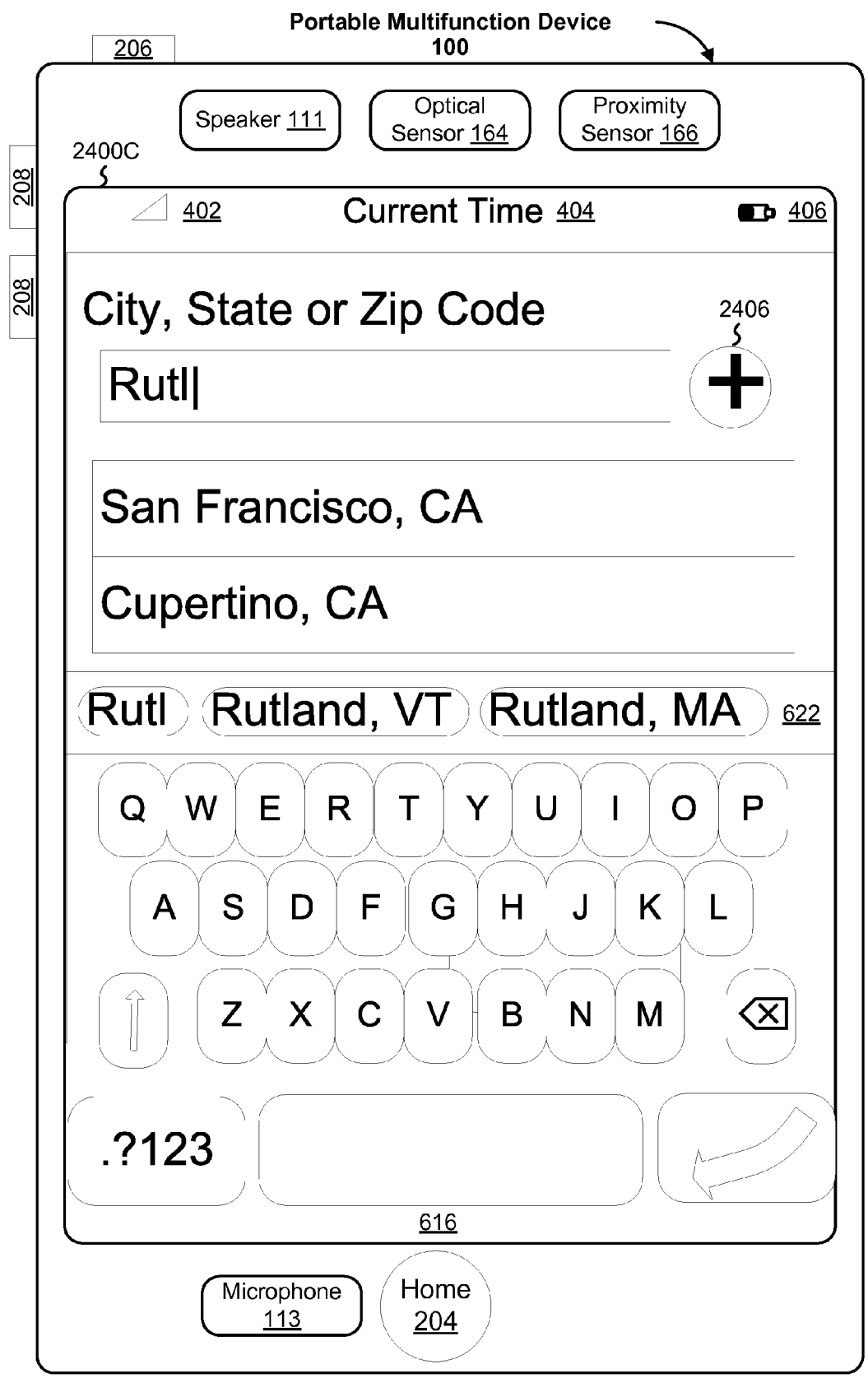

FIGS. 11A-11C illustrate an exemplary user interface for displaying and managing a weather widget in accordance with some embodiments.

In some embodiments, weather widget 149-1 displays the weather for a particular location (e.g., Santa Cruz, Calif. in UI 2400A, FIG. 11A). In response to the user activating settings icon 2402 (e.g., by a finger tap on the icon), the settings UI for the weather widget is displayed (e.g., UI 2400B, FIG. 11B). In some embodiments, the user can select the particular location for display with a gesture (e.g., by touching the particular location in a list 2412 of locations, which may highlight the selected location).

In some embodiments, in response to the user's finger contacting 2404 a text entry box, a keyboard (e.g., 616) is displayed (UI 2400C, FIG. 11C). In some embodiments, a word suggestion area 622 is also displayed. In response to the user entering the new location and activating the add location icon 2406, the new location is added to the list of locations.

In some embodiments, the highlighted location in the list of locations is removed if the user activates the remove icon 2408 (e.g., by a finger tap on the icon). In some embodiments, in response to the user activating the done icon 2410, the device displays the weather for the selected location (e.g., UI 2400A, FIG. 11A).

FIGS. 12A-12D illustrate an exemplary user interface for displaying and managing a stocks widget in accordance with some embodiments.

Figure 12A:
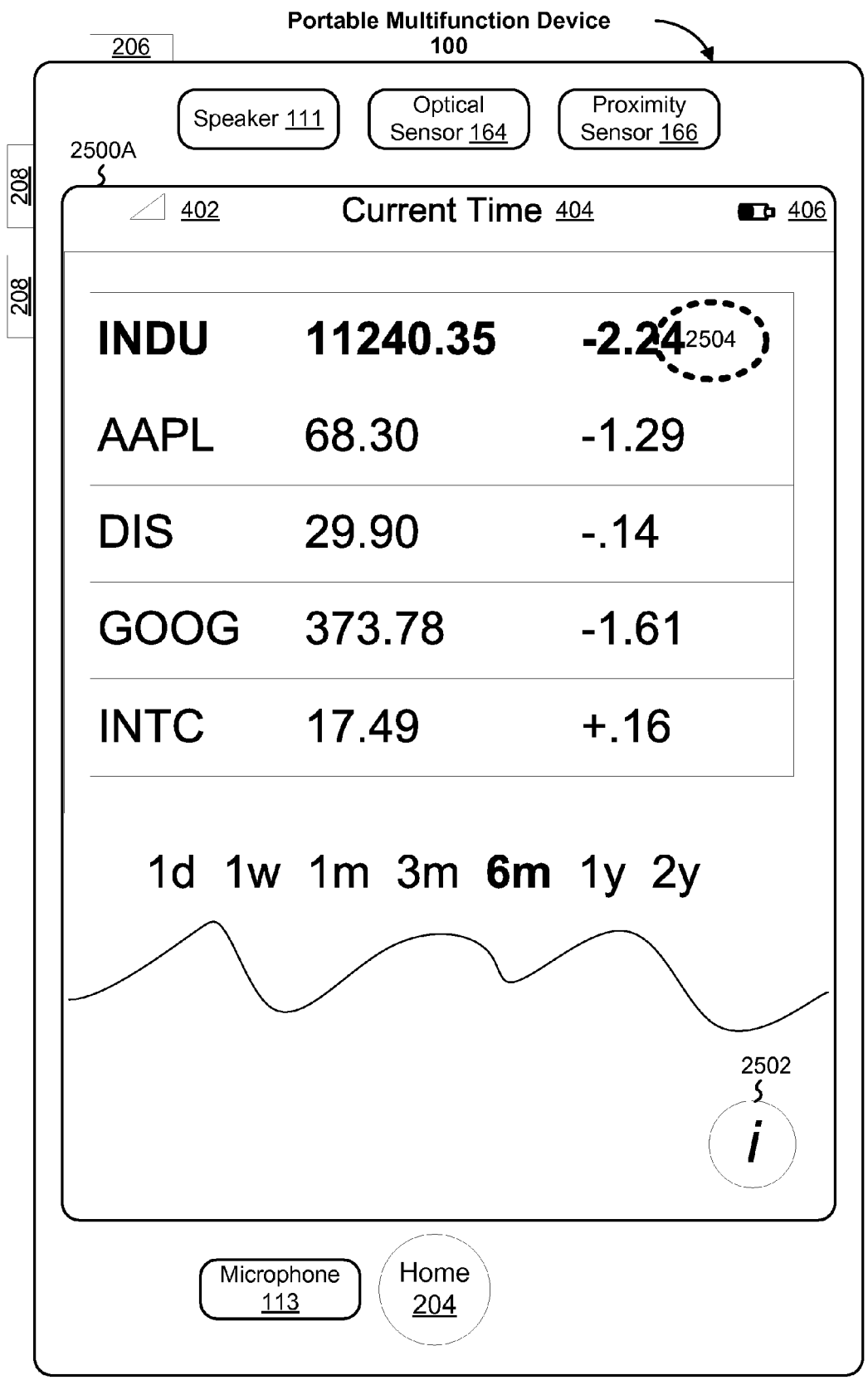
FIGS. 12A-12D illustrate an exemplary user interface for displaying and managing a stocks widget in accordance with some embodiments.
Figure 12B:
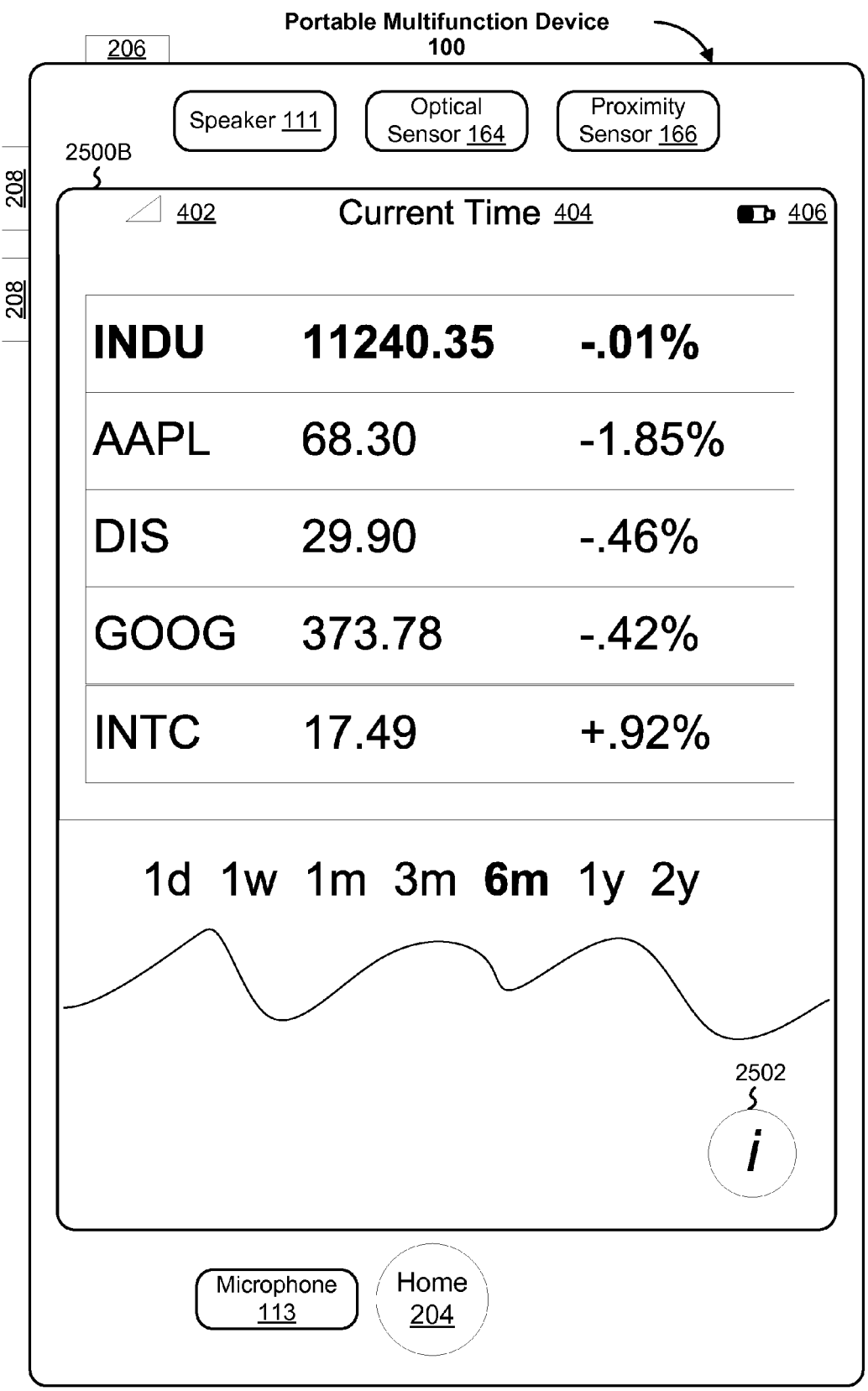

In some embodiments, stocks widget 149-2 displays information for a number of user-selected stocks (e.g., UI 2500A, FIG. 12A). In some embodiments, in response to a user gesture, the information displayed is changed. For example, in response to the user touching 2504 the column with absolute gains and losses (UI 2500A, FIG. 12A), the percentage gains and losses may be displayed instead (UI 2500B, FIG. 12B). For example, in response to the user touching "1 w", the one-week chart for the highlighted stock (INDU) may be displayed (not shown) instead of the six-month chart ("6 m").

Figure 12C:
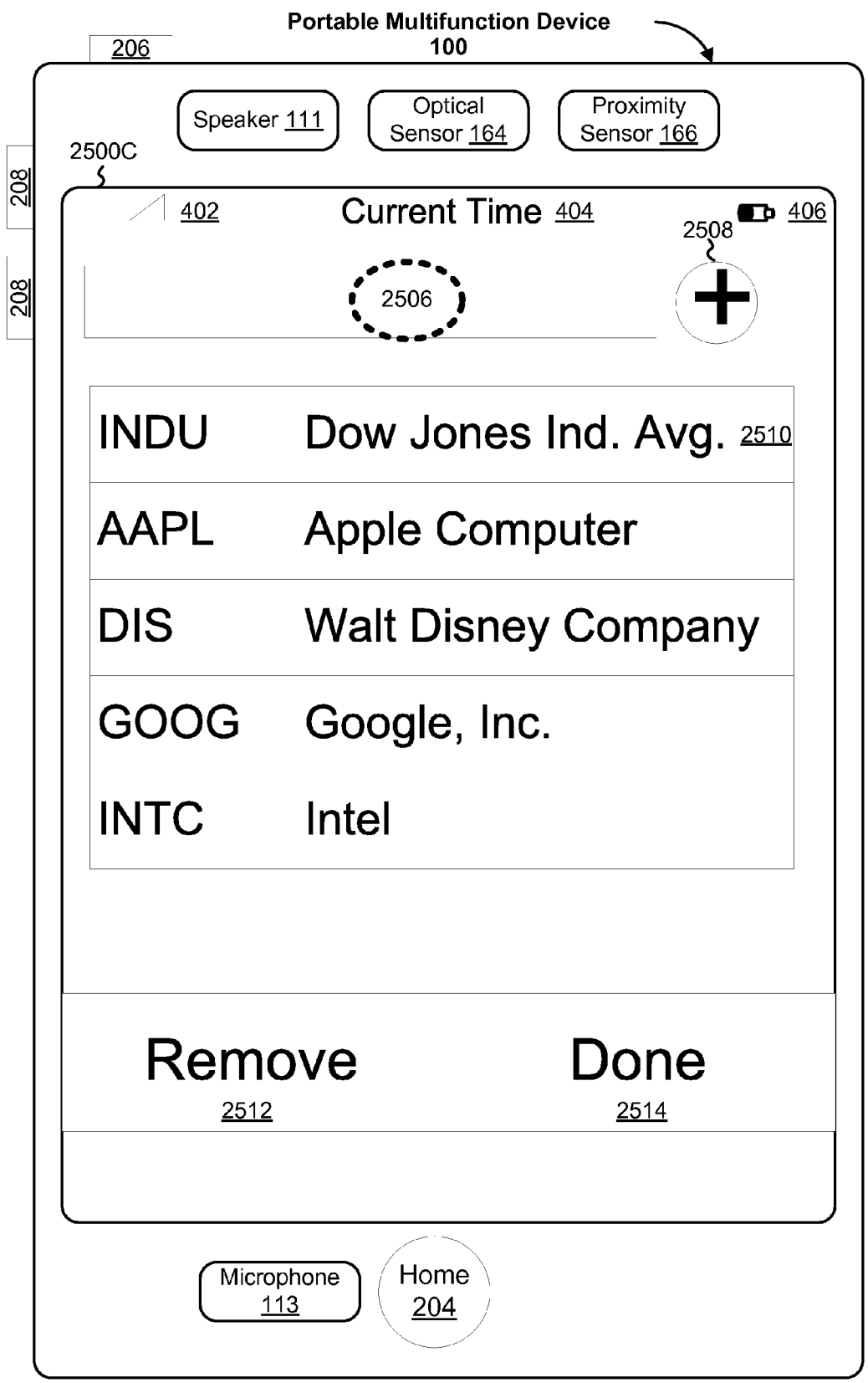

In response to the user activating settings icon 2502 (e.g., by a finger tap on the icon), the settings UI for the stocks widget is displayed (e.g., UI 2500C, FIG. 12C).

Figure 12D:
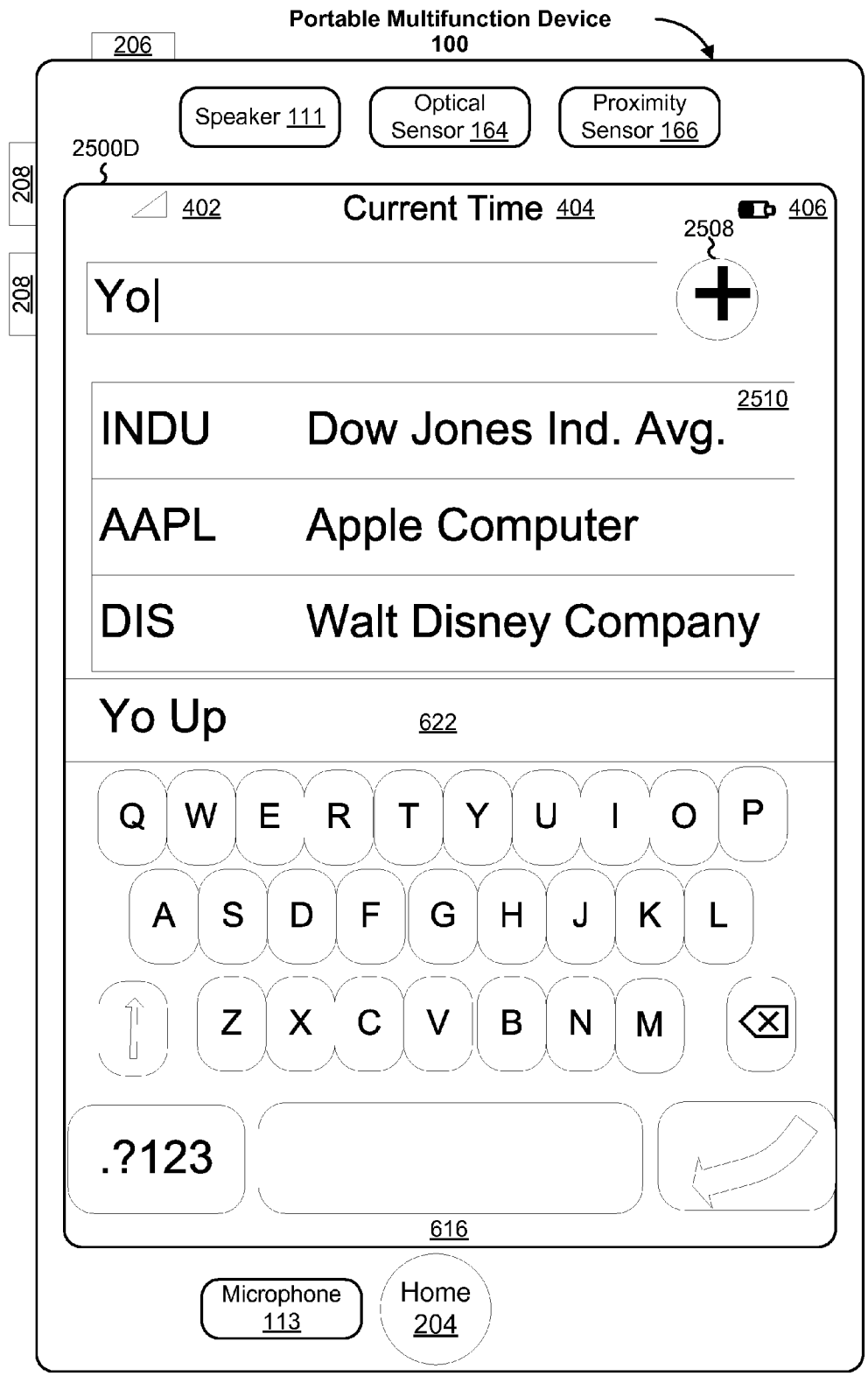

In some embodiments, in response to the user's finger contacting 2506 a text entry box, a keyboard (e.g., 616) is displayed (UI 2500D, FIG. 12D). In some embodiments, a word suggestion area 622 is also displayed. In response to the user entering the symbol or name of the new stock and activating the add location icon 2508, the new stock is added to the list of stocks.

In some embodiments, the highlighted stock in the list of stocks 2510 is removed if the user activates the remove icon 2512 (e.g., by a finger tap on the icon). In some embodiments, in response to the user activating the done icon 2514, the device displays the stock information for the selected stocks (e.g., UI 2500A, FIG. 12A).

FIGS. 13A-13J illustrate an exemplary user interface for displaying and managing contacts in accordance with some embodiments.

Figure 13A:
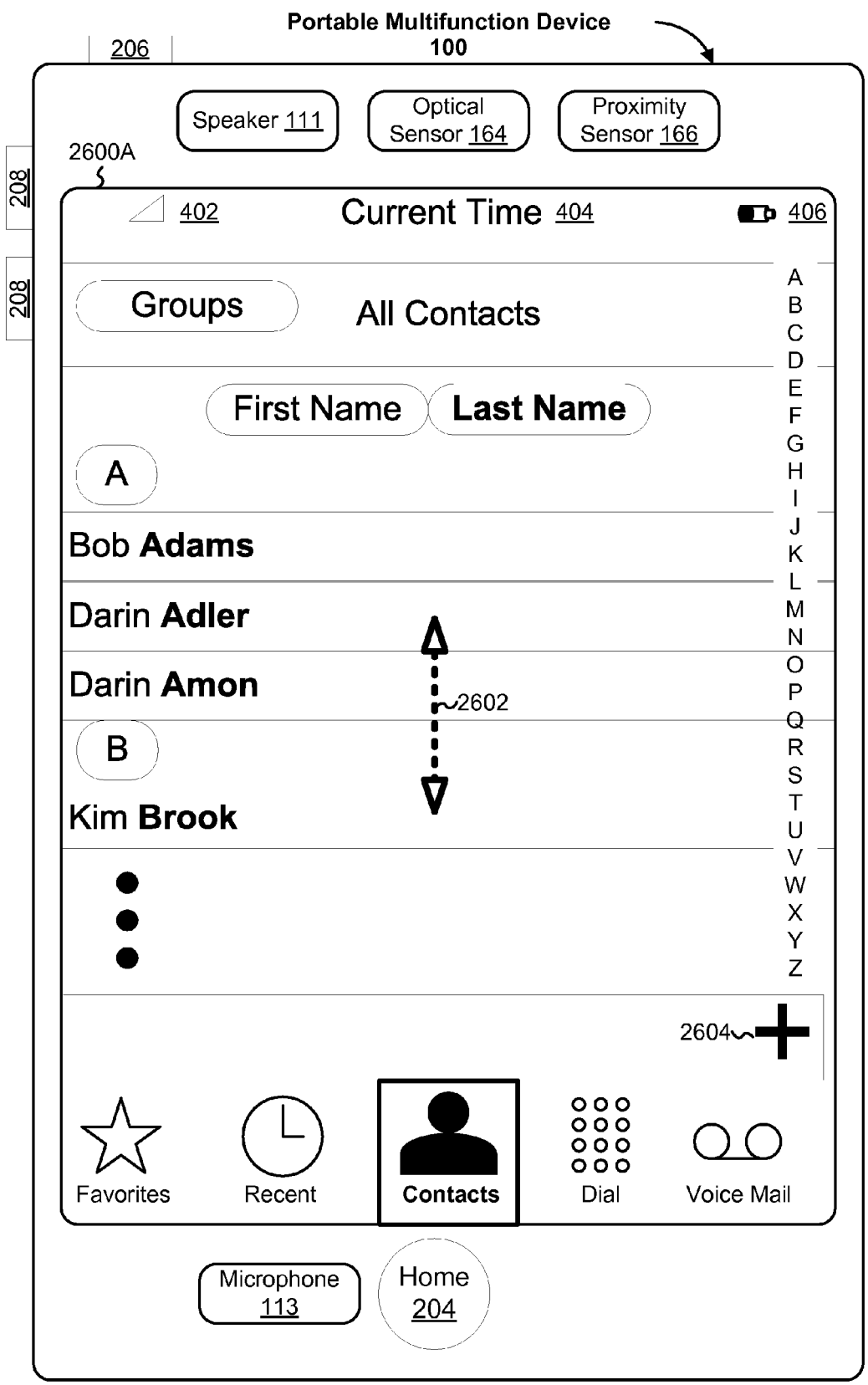
FIGS. 13A-13J illustrate an exemplary user interface for displaying and managing contacts in accordance with some embodiments.

In some embodiments, in response to the user activating phone icon 138 in UI 400 (FIG. 4) (e.g., by a finger tap on the icon), the user's contact list is displayed (e.g., UI 2600A, FIG. 13A).

As described in U.S. patent application Ser. No. 11/322, 547, "Scrolling List with Floating Adjacent Index Symbols," filed Dec. 23, 2005, which is hereby incorporated by reference, the user may scroll through the contact list using vertically upward and/or vertically downward gestures 2602 on the touch screen.

Figure 13B:
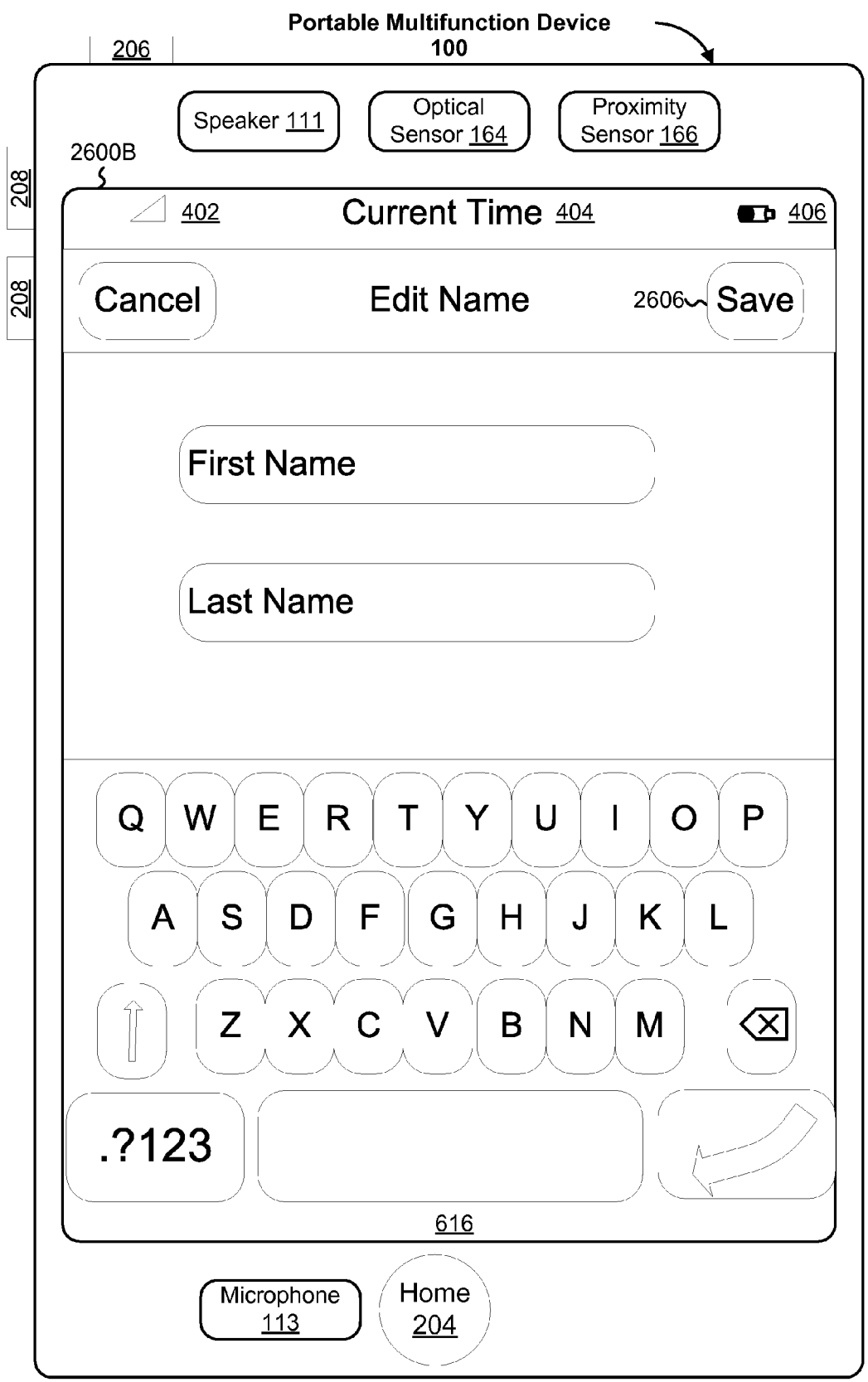
Figure 13C:
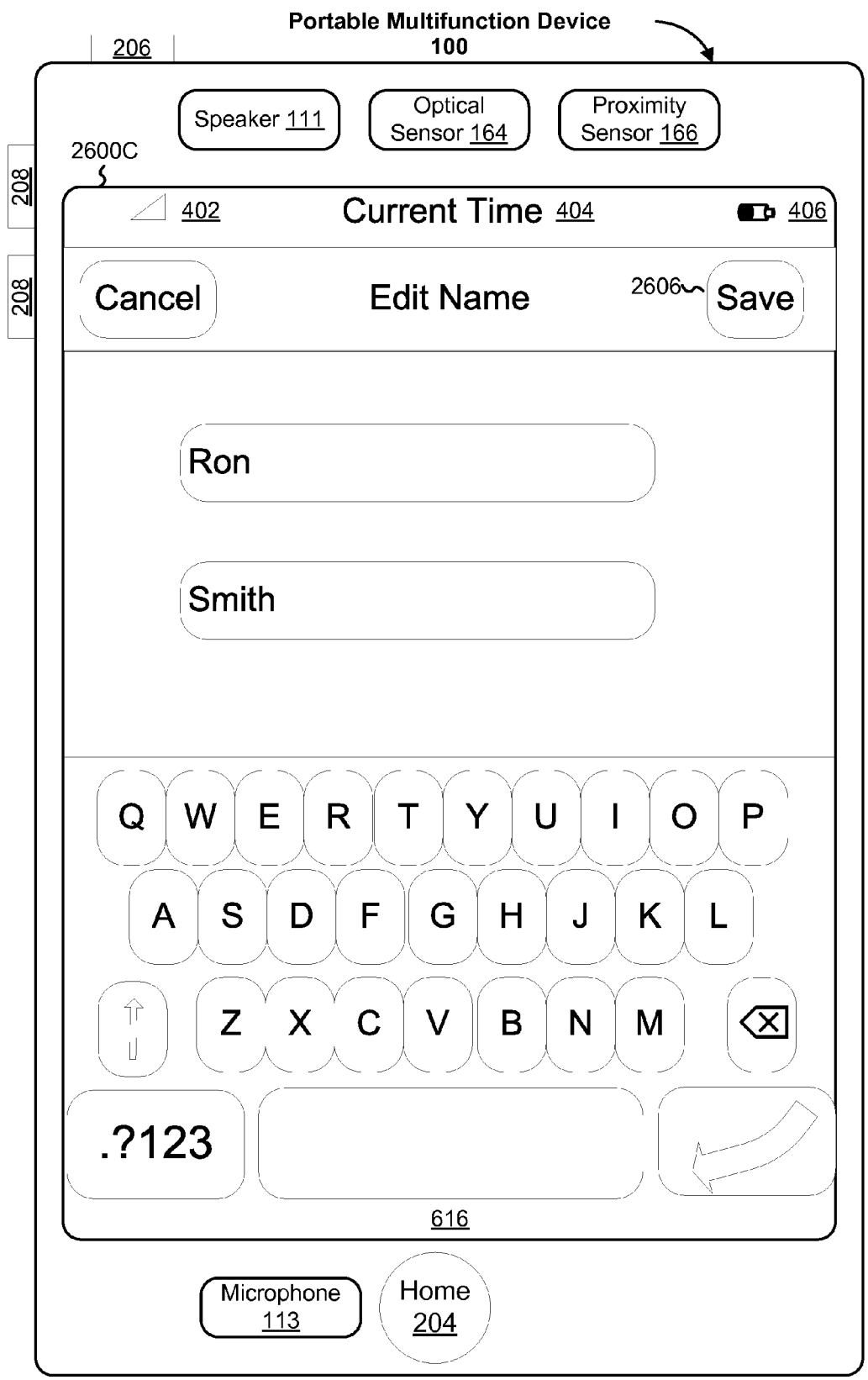

In some embodiments, in response to the user activating add new contact icon 2604 (e.g., by a finger tap on the icon), the touch screen displays a user interface for editing the name of the contact (e.g., UI 2600B, FIG. 13B).

Figure 13D:
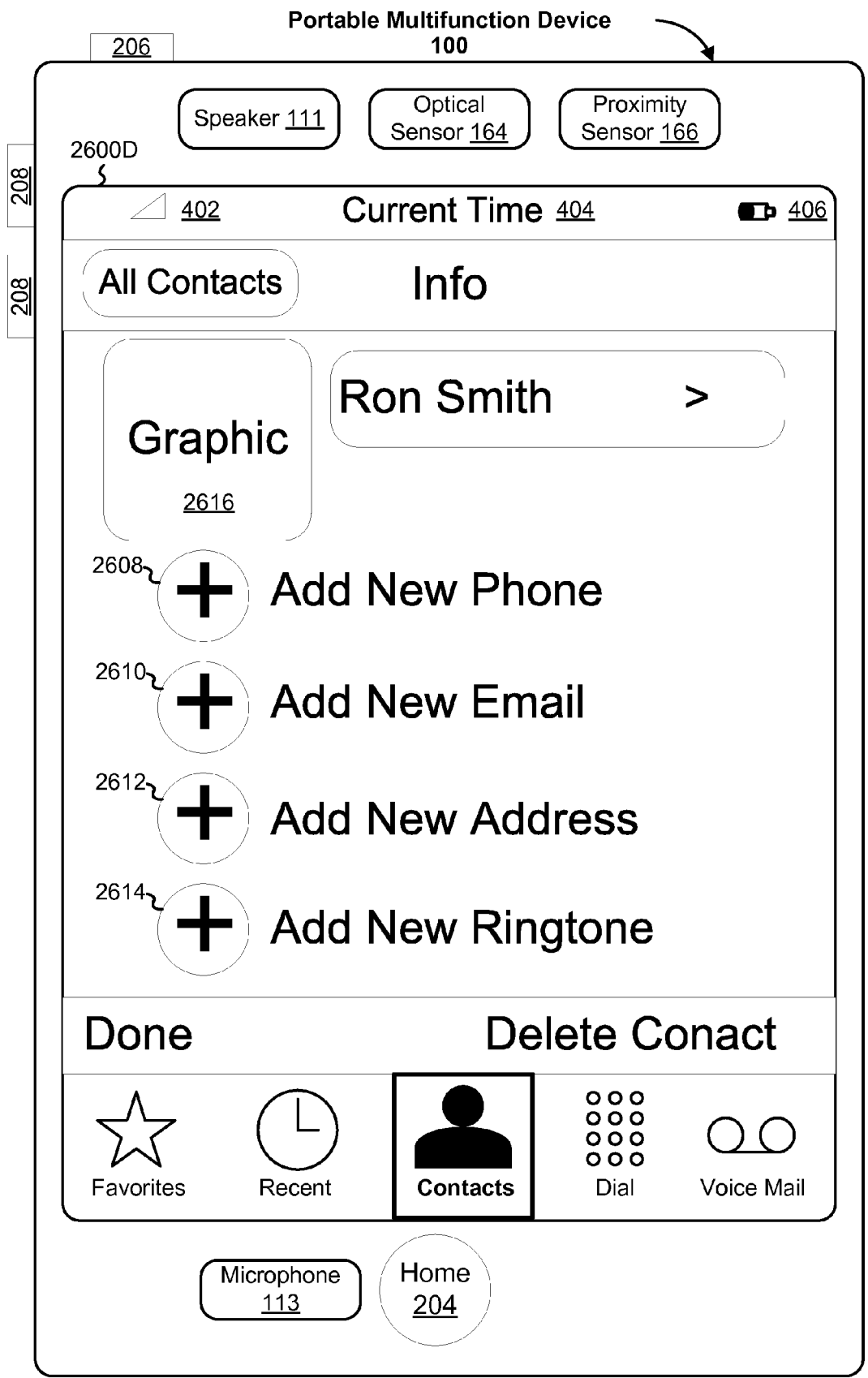

In some embodiments, in response to the user entering the contact name (e.g., entering "Ron Smith" via keyboard 616 in UI 2600C, FIG. 13C) and activating the save icon 2606 (e.g., by a finger tap on the icon), the contacts module creates and displays a new entry for the contact (e.g., UI 2600D, FIG. 13D).

Figure 13E:

In some embodiments, in response to the user activating add new phone icon 2608 (e.g., by a finger tap on the icon or on the row containing the icon), the touch screen displays a user interface for editing the phone number(s) of the contact (e.g., UI 2600E, FIG. 13E).

In some embodiments, in response to the user entering the phone number (e.g., via keyboard 624 in UI 2600E, FIG. 13E); specifying the type of phone number (e.g., by a tap or other predefined gesture on mobile icon 2618, home icon 2620, or work icon 2622); and activating the save icon 2626 (e.g., by a finger tap on the icon), the contacts module creates a phone number for the corresponding contact.

In some embodiments, the user can select additional phone number types. For example, in response to the user activating selection icon 2624 (e.g., by a finger tap on the icon), the touch screen displays a phone label UI (e.g., UI 2600F, FIG. 13F). In some embodiments, in response to the user activating a label in UI 2600F, the chosen label is displayed in place of work icon 2622 in UI 2600E. In some embodiments, the chosen label is also highlighted in UI 2600E to indicate to the user that the phone number being entered will be given the chosen label.

In some embodiments, the user can add custom phone labels to UI 2600F by activating the add labels icon 2628 and entering the label via a soft keyboard (e.g., 616, not shown).

In some embodiments, the user can delete one or more of the labels in UI 2600F. In some embodiments, only the user's custom labels may be deleted. For example, in response to the user activating the edit icon 2630 (e.g., by a finger tap on the icon), the touch screen displays a delete icon 2632 next to the labels that may be deleted (e.g., UI 2600G, FIG. 13G). If a user activates a delete icon (e.g., by tapping it with a finger), the icon may rotate 90 degrees (e.g., 2634, FIG. 13H) or otherwise change its appearance and/or a second icon may appear (e.g., remove icon 2636, FIG. 13H). If the user activates the second icon, the contact module deletes the corresponding label. A deletion process that requires multiple gestures by the user on different parts of the touch screen (e.g., delete icon 2632 and remove icon 2636 are on opposite sides of the touch screen in UI 2600H, FIG. 13H) greatly reduces the chance that a user will accidentally delete a label or other similar item. The user activates the done icon 2638 (e.g., by tapping on it with a finger) when the user has finished deleting labels and the device returns to UI 2600F (FIG. 13F).

Figure 13F:
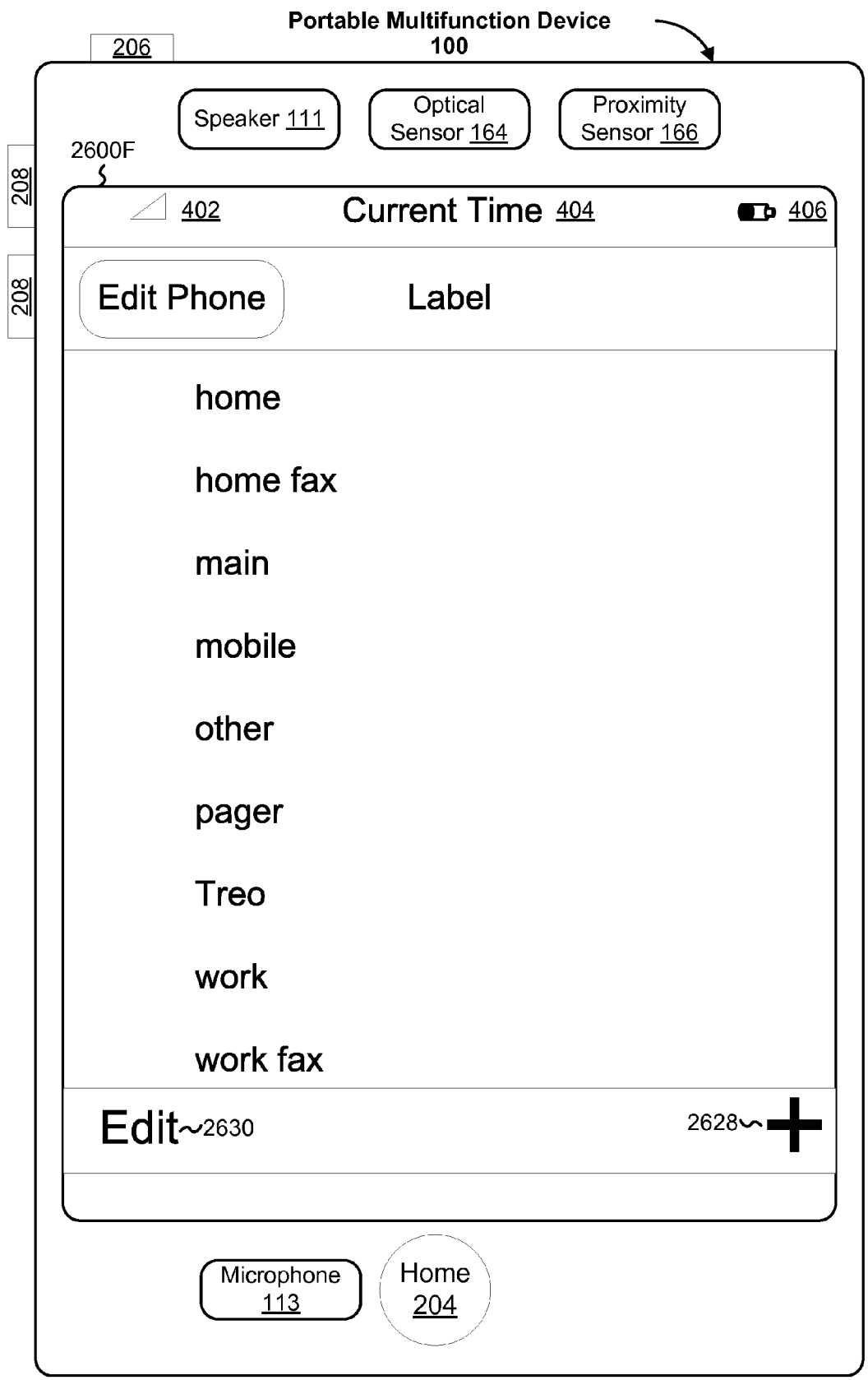
Figure 13G:
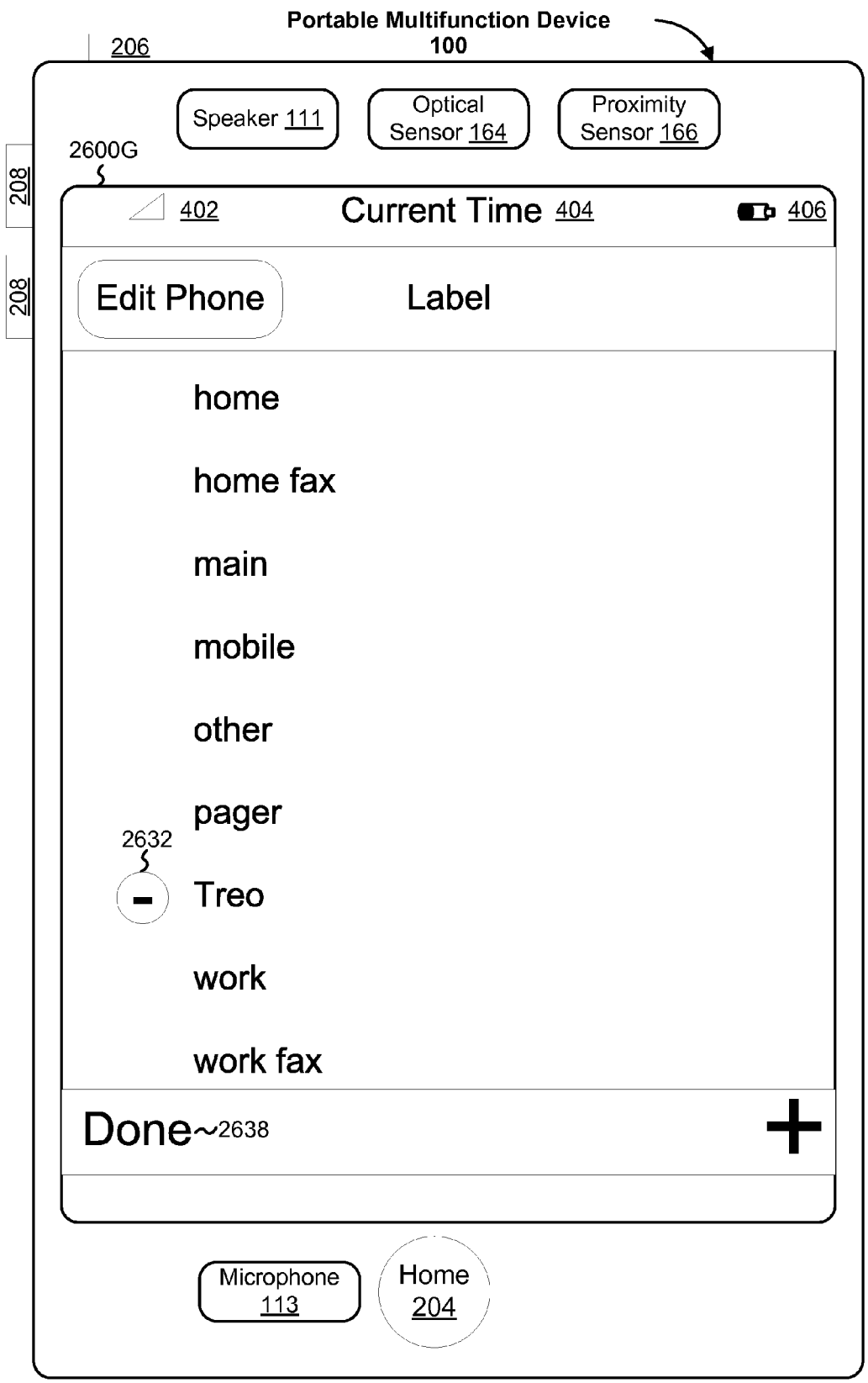
Figure 13H:
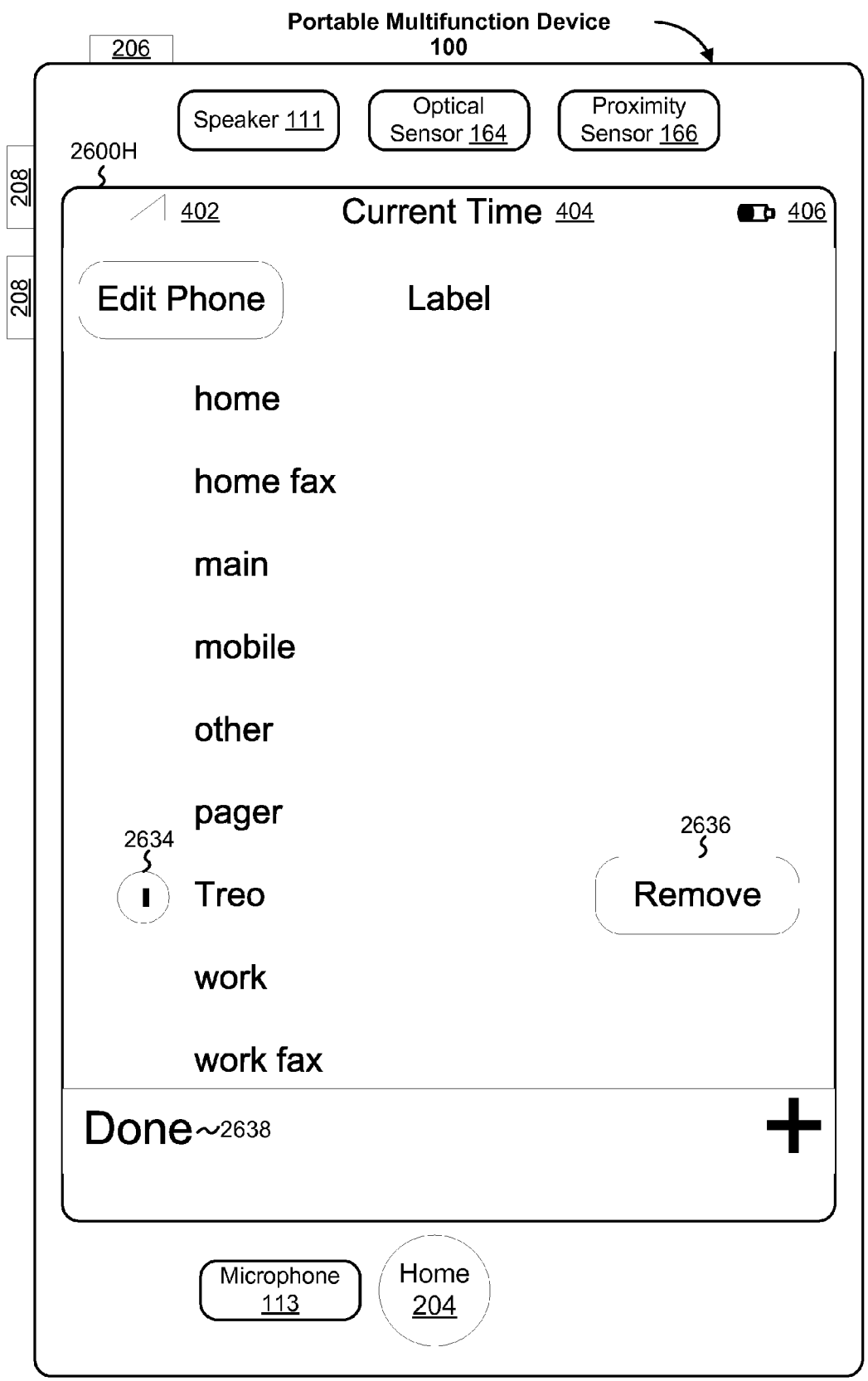
Figure 13I:
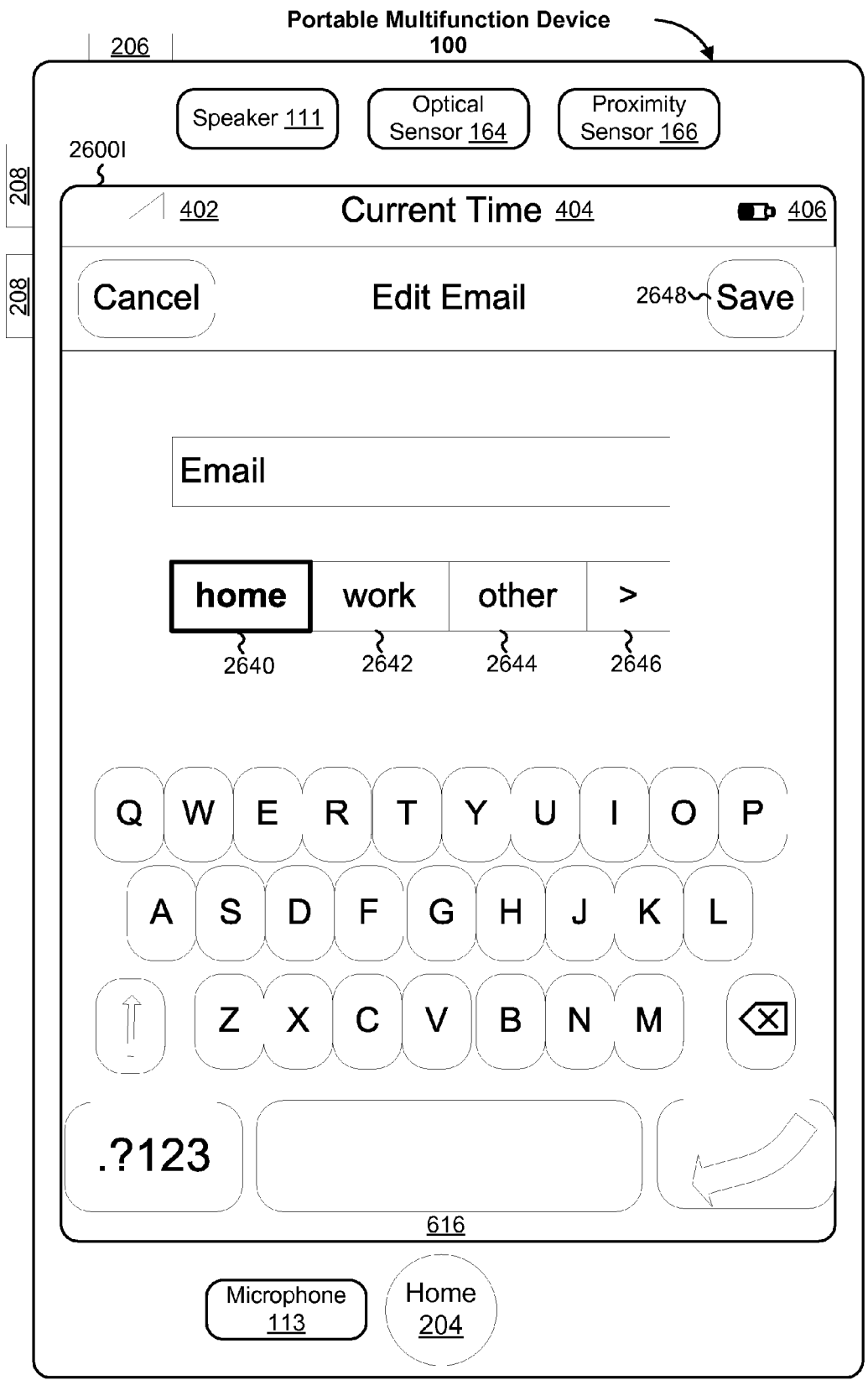

In some embodiments, in response to the user activating add new email icon 2610 (FIG. 13D) (e.g., by a finger tap on the icon or on the row containing the icon), the touch screen displays a user interface for editing the email address(es) of the contact (e.g., UI 26001, FIG. 13I).

In some embodiments, in response to the user entering the email address (e.g., via keyboard 616 in UI 26001, FIG. 13I); specifying the type of email address (e.g., by a tap or other predefined gesture on home icon 2640, work icon 2642, or other icon 2644); and activating the save icon 2648 (e.g., by a finger tap on the icon), the contacts module creates an email address for the corresponding contact.

In some embodiments, the user can select additional email address types by activating selection icon 2646; add custom email address types, and/or delete email address types using processes and UIs analogous to those described for phone number types (FIGS. 13F-13H).

Figure 13J:
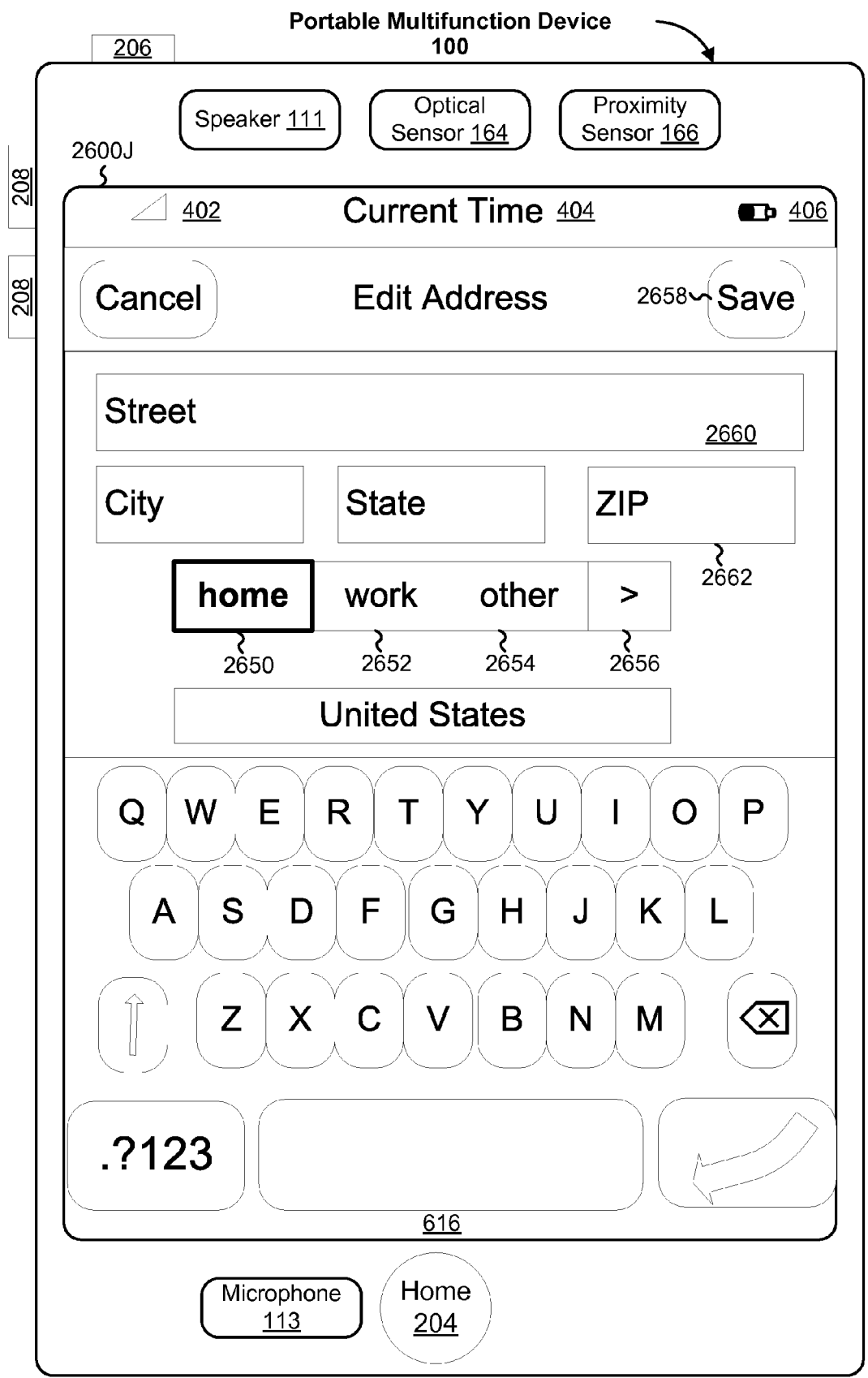

In some embodiments, in response to the user activating add new address icon 2612 (FIG. 13D) (e.g., by a finger tap on the icon or on the row containing the icon), the touch screen displays a user interface for editing the physical address(es) of the contact (e.g., UI 2600J, FIG. 13J).

In some embodiments, in response to the user entering the address 2660 (e.g., via keyboard 616 in UI 2600J, FIG. 13J); specifying the type of address (e.g., by a tap or other predefined gesture on home icon 2650, work icon 2652, or other icon 2654); and activating the save icon 2658 (e.g., by a finger tap on the icon), the contacts module creates an address for the corresponding contact.

In some embodiments, the keyboard displayed depends on the type of data expected. For example, activating ZIP input box 2662 (FIG. 13J) (e.g., by a finger tap on the input box) would cause numeric keyboard 624 to be displayed (not shown). Subsequently activating the city or state input box (FIG. 13J) (e.g., by a finger tap on the city or state input box) would cause letter keyboard 616 to be displayed.

In some embodiments, the user can select additional address types by activating selection icon 2656; add custom address types, and/or delete address types using processes and UIs analogous to those described for phone number types (FIGS. 13F-13H).

In some embodiments, in response to the user activating add new ringtone icon 2614 (e.g., by a finger tap on the icon or on the row containing the icon), the touch screen displays a user interface for selecting ringtones.

In some embodiments, in response to the user selecting a ringtone (e.g., by tap or other predefined gesture on the ringtone or the row containing the ringtone) and activating a save icon (e.g., by a finger tap on the icon), the contacts module assigns a ringtone to the corresponding contact.

Figure 14A:
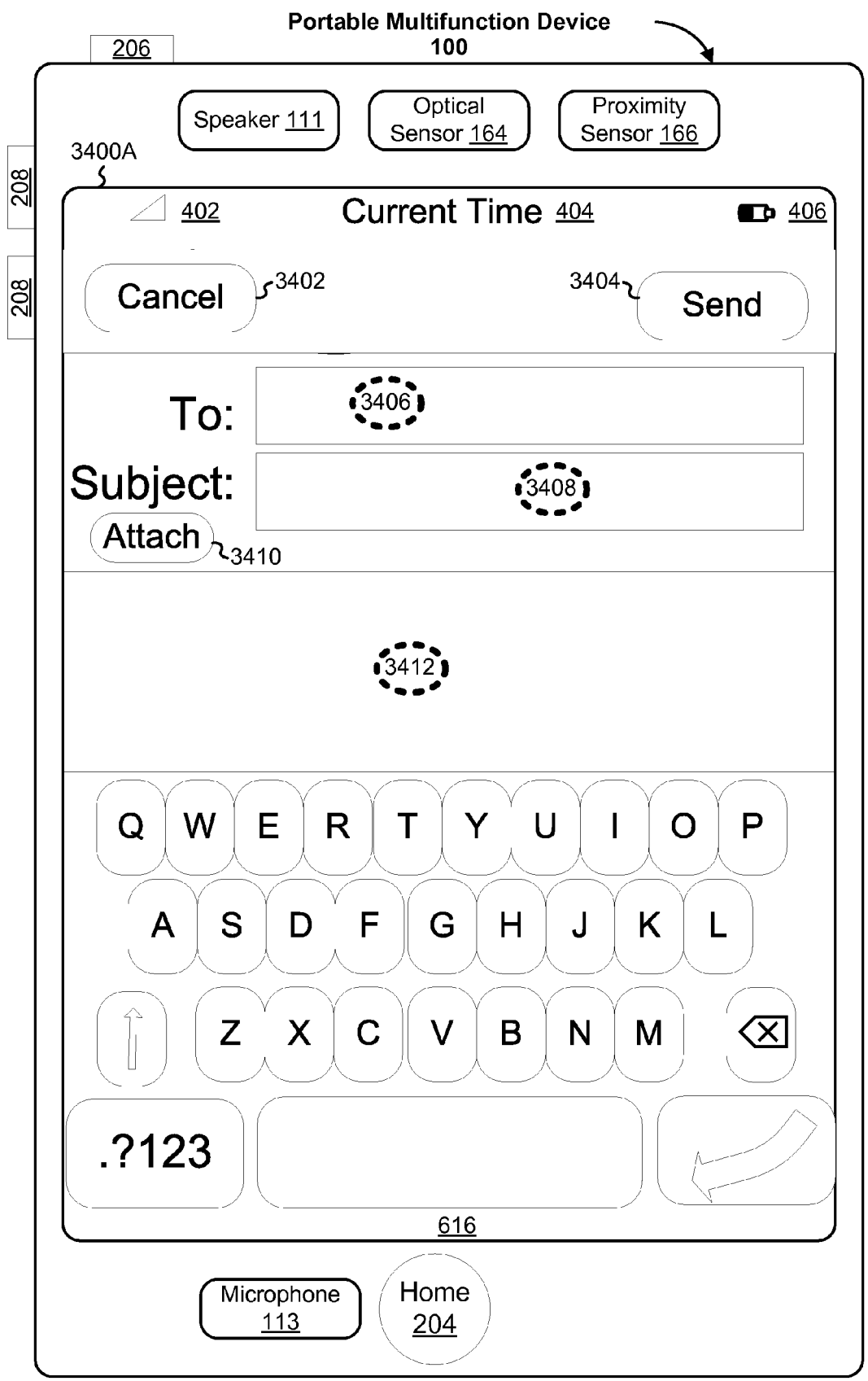
FIGS. 14A and 14B illustrate an exemplary user interface for creating emails in accordance with some embodiments.
Figure 14B:
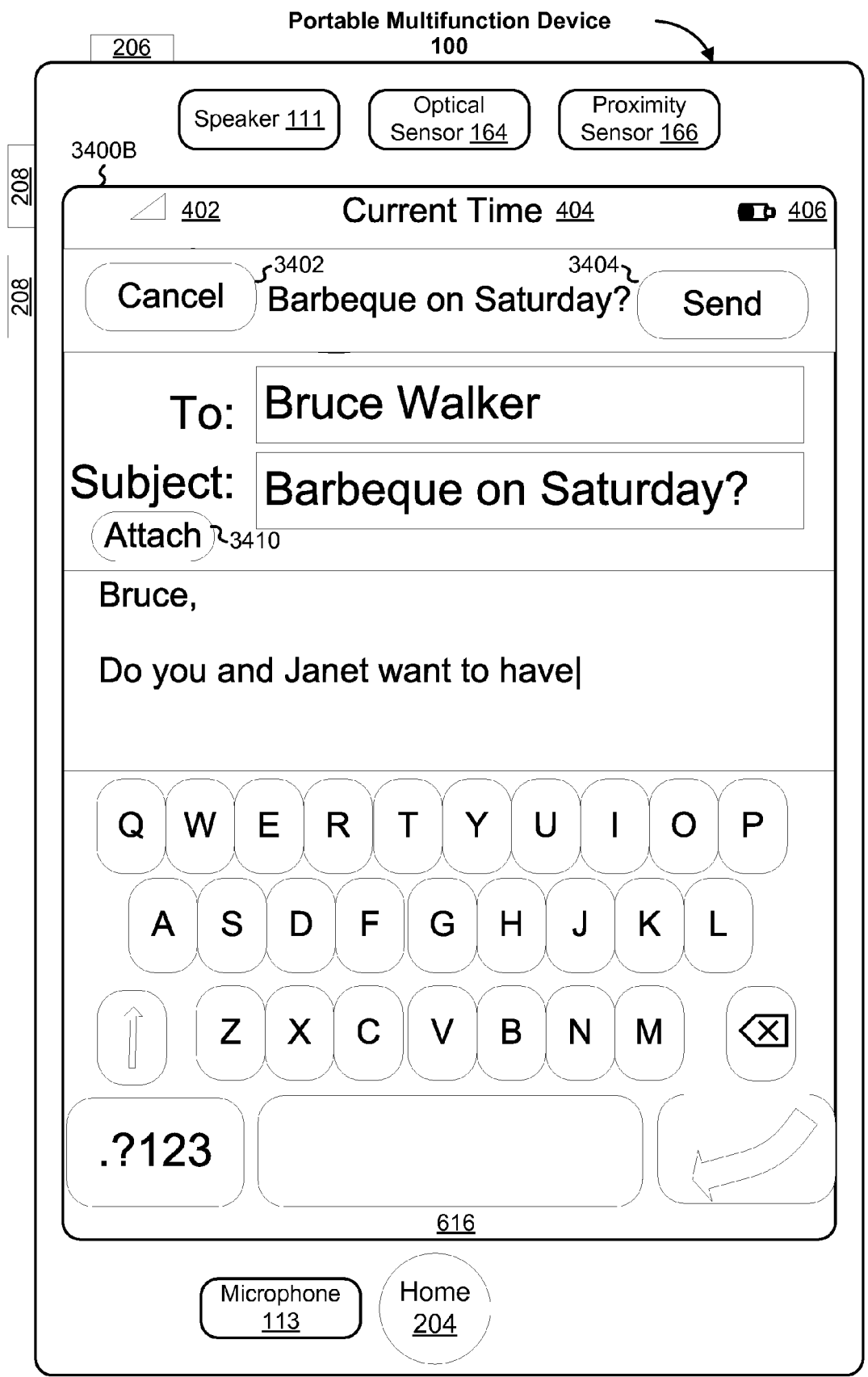

FIGS. 14A and 14B illustrate an exemplary user interface for creating emails in accordance with some embodiments.

In some embodiments, if the user makes a tap or other predefined gesture on the subject line 3408 or in the body of the email 3412 (FIG. 14A), a letter keyboard 616 appears and the user may input the subject and/or body text (FIG. 14B). In some embodiments, to enter the email address, the user makes a tap or other predefined gesture on the To: line 3406 of the email; the user's contact list appears (e.g., FIG. 10G); the user makes a tap or other predefined gesture on the desired recipient/contact; and the device places the corresponding email address in the email message (FIG. 14B). In some embodiments, the user may also enter the email address using one or more keyboards (e.g., 616 and 624, not shown). The device sends the email message in response to the user activating the send icon 3404 (FIG. 14B) (e.g., by a finger tap on the icon). Alternatively, if the user activates the cancel icon 3402, the device may display a save draft icon (e.g., 1810, FIG. 10F) and a don't save icon (e.g., 1812, FIG. 10F). The device saves the draft if the user activates the save draft icon 1810, e.g., in a drafts folder (not shown) in email client 140. The device deletes the draft if the user activates the don't save icon 1812.

In some embodiments, in response to the user activating the attach icon 3410 (e.g., by a finger tap on the icon), the touch screen displays a UI for adding attachments (not shown).

Figure 15A:
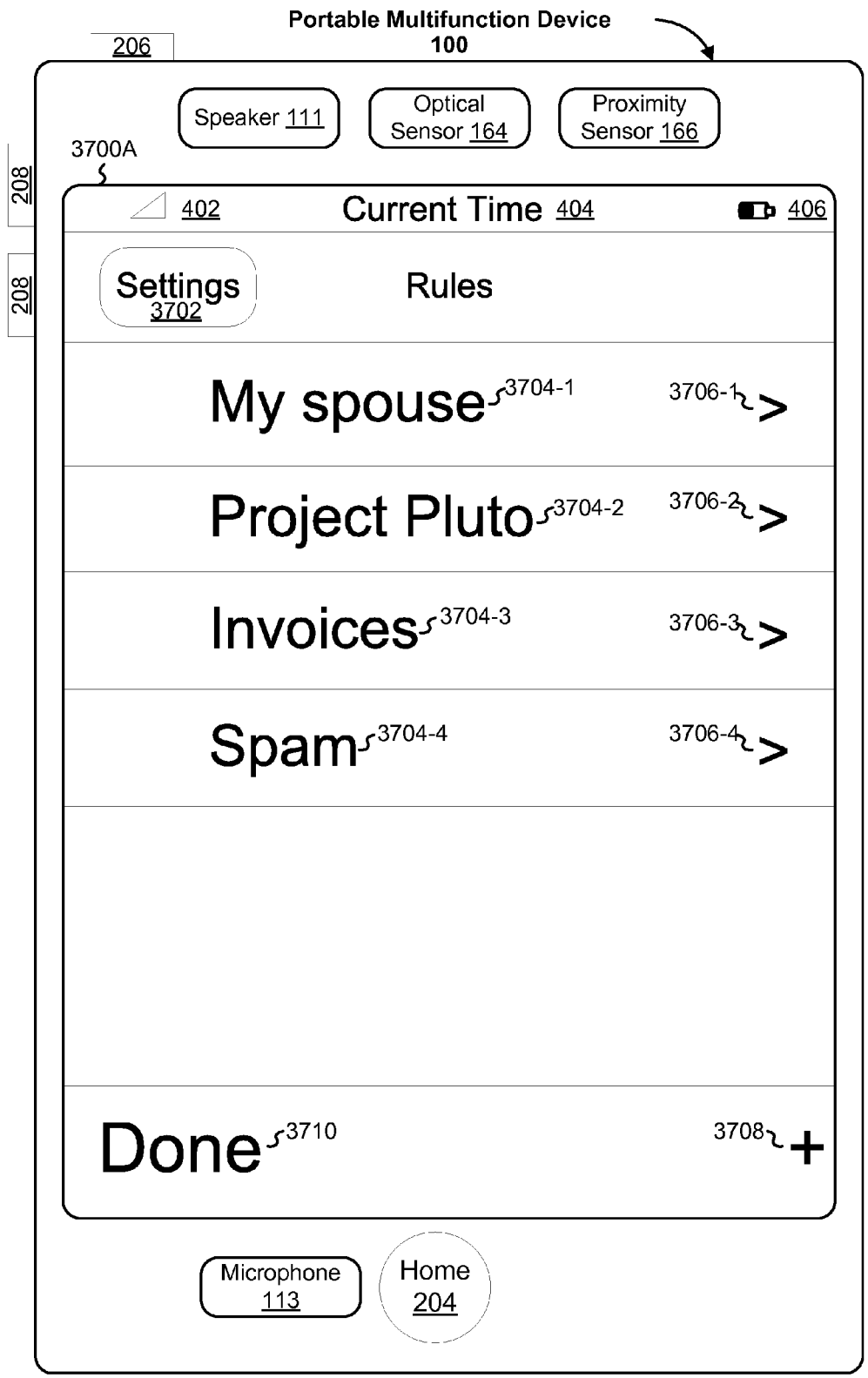
FIGS. 15A and 15B illustrate an exemplary user interface for creating and managing email rules in accordance with some embodiments.
Figure 15B:
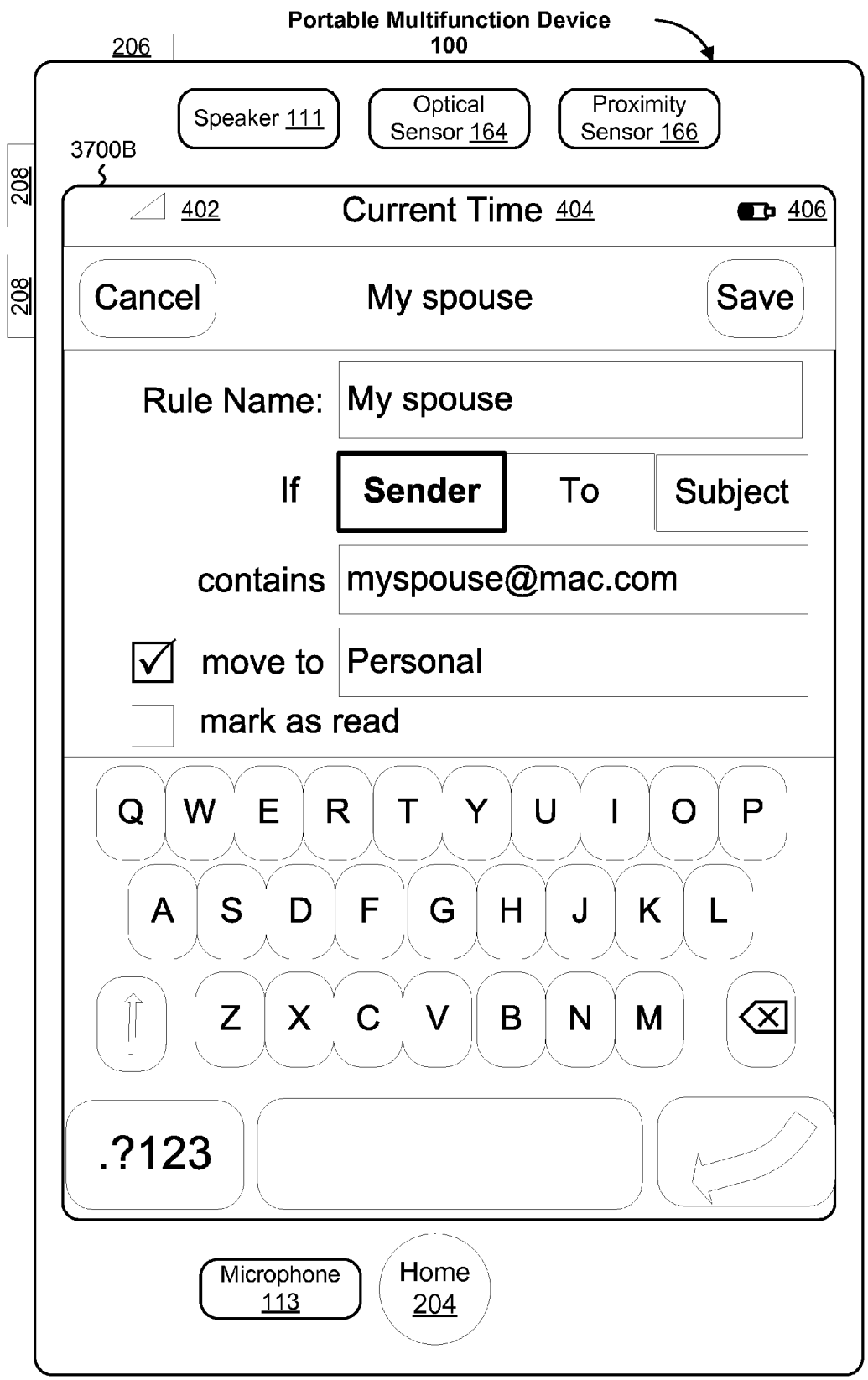

FIGS. 15A and 15B illustrate an exemplary user interface for creating and managing email rules in accordance with some embodiments. In some embodiments, user interface 3700A includes the following elements, or a subset or superset thereof:

- 402, 404, and 406, as described above;
- Settings icon 3702 that when activated (e.g., by a finger tap on the icon) returns the device to a settings UI (not shown);
- Rules 3704;
- Selection icons 3706 that when activated (e.g., by a finger tap on the icon) show choices for the corresponding rules.
- Add icon 3708 that when activated (e.g., by a finger tap on the icon) displays a UI for creating a new rule (e.g., UI 3700B, FIG. 15B);
- Done icon 3710 that when activated (e.g., by a finger tap on the icon) returns the device to the settings UI (not shown).

Figure 16A:
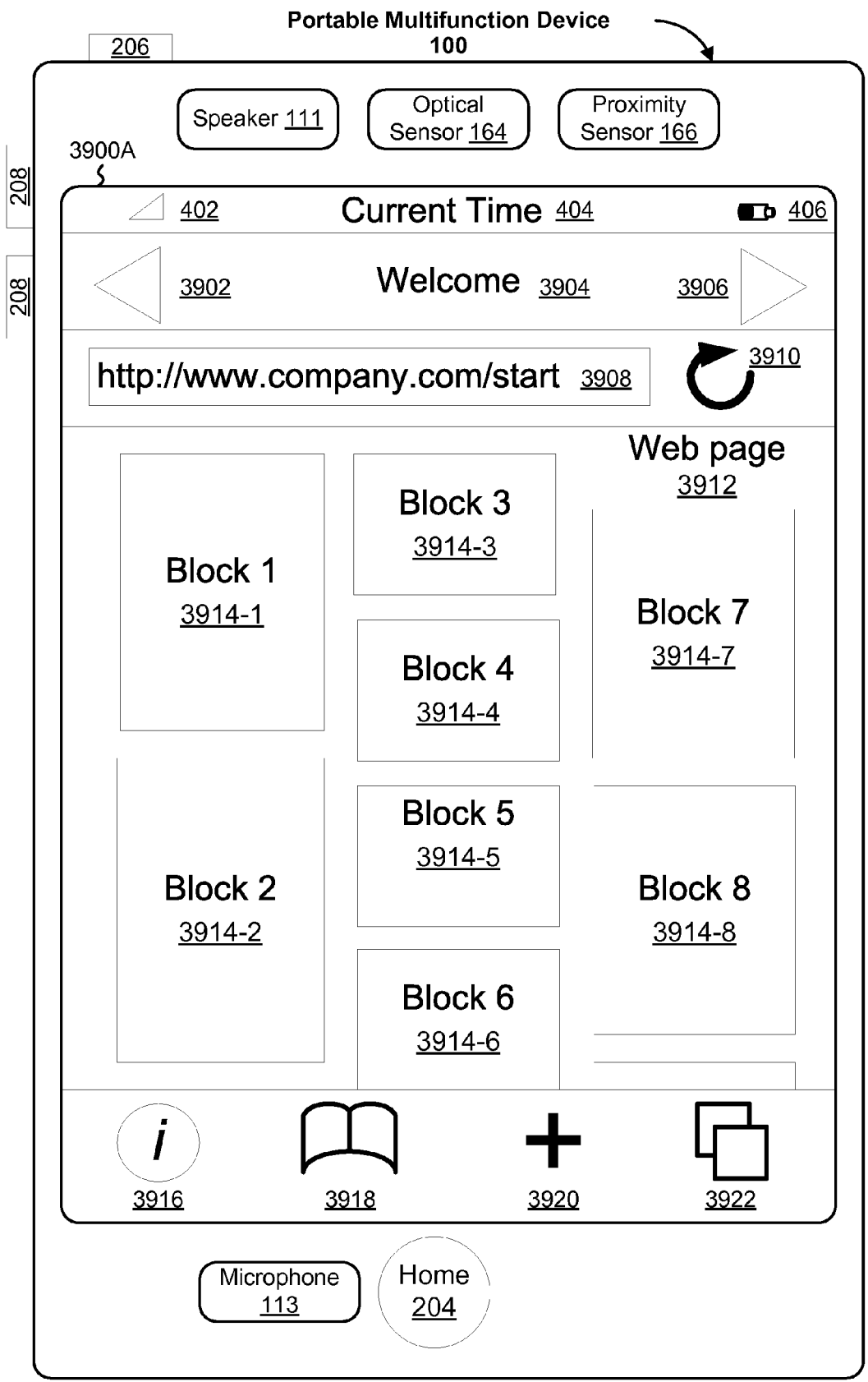
FIGS. 16A-16C illustrate an exemplary user interface for a browser in accordance with some embodiments.
Figure 16B:
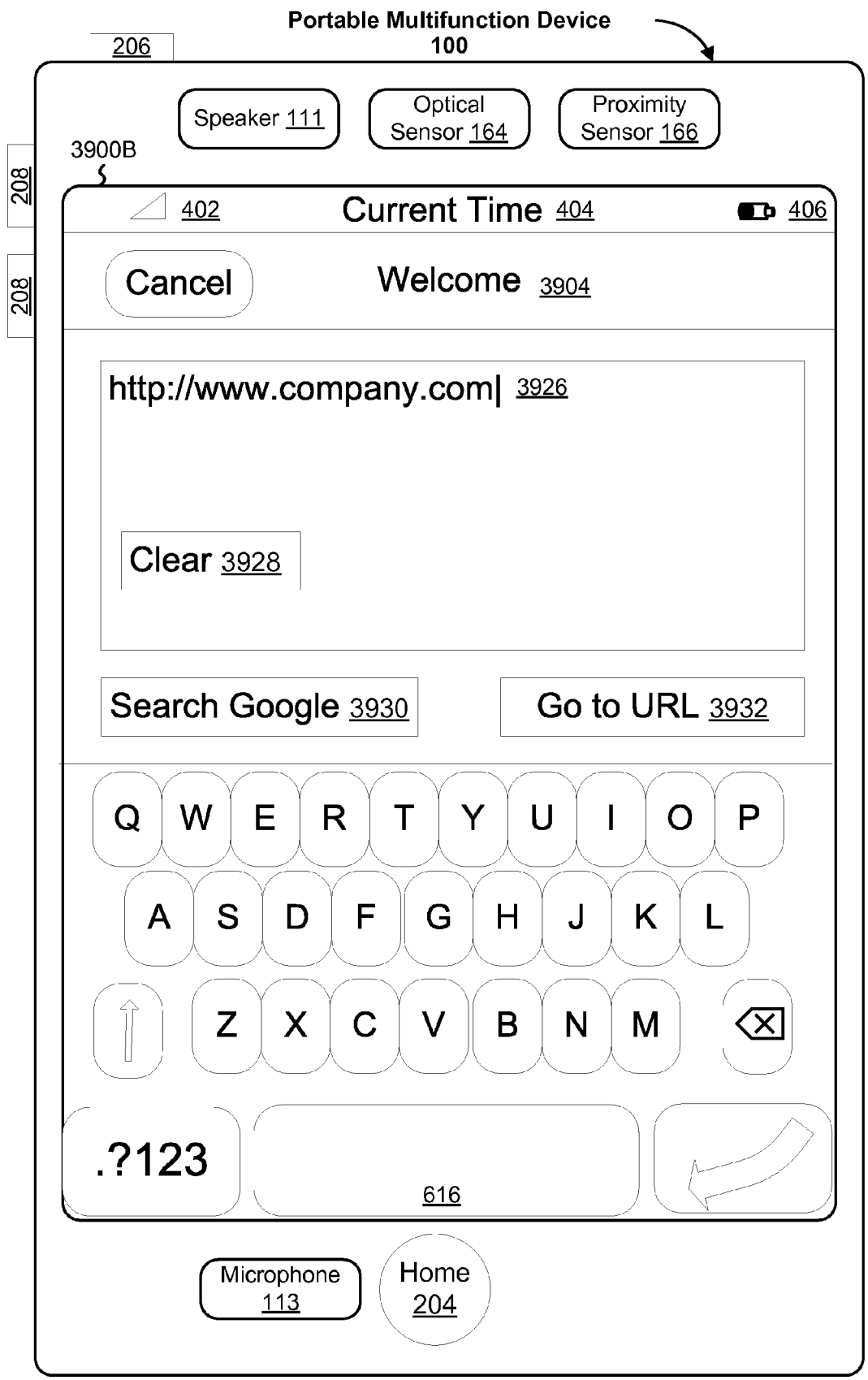
Figure 16C:
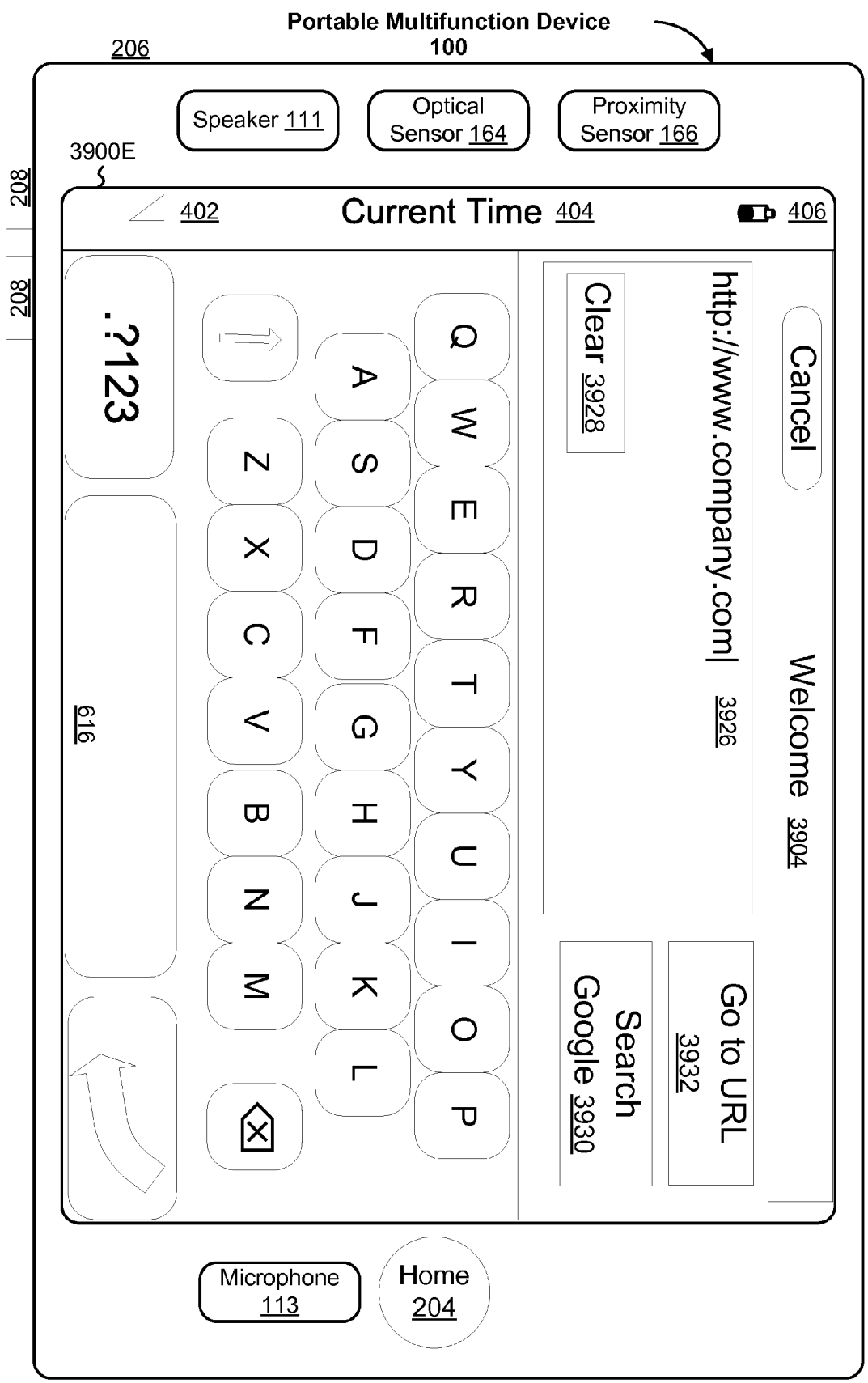

FIGS. 16A, 16B, and 16C illustrate an exemplary user interface for a browser in accordance with some embodiments.

In some embodiments, user interface 3900A includes the following elements, or a subset or superset thereof:

- 402, 404, and 406, as described above;
- Previous page icon 3902 that when activated (e.g., by a finger tap on the icon) initiates display of the previous web page;
- Web page name 3904;
- Next page icon 3906 that when activated (e.g., by a finger tap on the icon) initiates display of the next web page;
- URL (Uniform Resource Locator) entry box 3908 for inputting URLs of web pages;
- Refresh icon 3910 that when activated (e.g., by a finger tap on the icon) initiates a refresh of the web page;
- Web page 3912 or other structured document, which is made of blocks 3914 of text content and other graphics (e.g., images);
- Settings icon 3916 that when activated (e.g., by a finger tap on the icon) initiates display of a settings menu for the browser;
- Bookmarks icon 3918 that when activated (e.g., by a finger tap on the icon) initiates display of a bookmarks list or menu for the browser;
- Add bookmark icon 3920 that when activated (e.g., by a finger tap on the icon) initiates display of a UI for adding bookmarks (not shown); and
- New window icon 3922 that when activated (e.g., by a finger tap on the icon) initiates display of a UI for adding new windows to the browser (not shown).

In some embodiments, in response to a tap or other predefined user gesture on URL entry box 3908, the touch screen displays an enlarged entry box 3926 and a keyboard 616 (e.g., UI 3900B, FIG. 16B in portrait view and UI 3900E, FIG. 16C in landscape view). In some embodiments, the touch screen also displays:

- Contextual clear icon 3928 that when activated (e.g., by a finger tap on the icon) initiates deletion of all text in entry box 3926;
- a search icon 3930 that when activated (e.g., by a finger tap on the icon) initiates an Internet search using the search terms input in box 3926; and
- Go to URL icon 3932 that when activated (e.g., by a finger tap on the icon) initiates acquisition of the web page with the URL input in box 3926;

Thus, the same entry box 3926 may be used for inputting both search terms and URLs. In some embodiments, whether or not clear icon 3928 is displayed depends on the context.

Figure 17A:
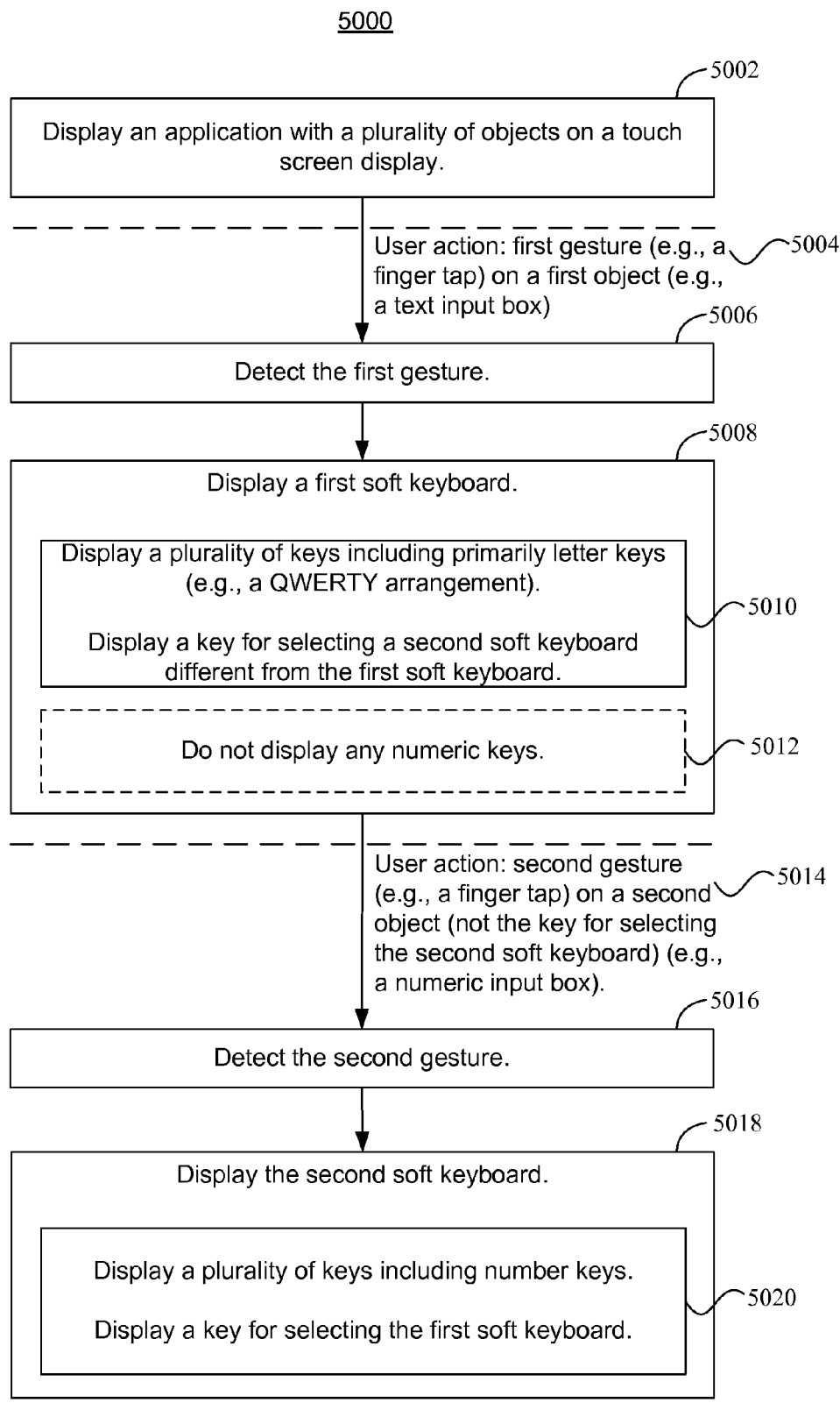
FIGS. 17A and 17B are flow diagrams illustrating a process for displaying soft keyboards in accordance with some embodiments.

FIG. 17A is a flow diagram illustrating a process 5000 for displaying soft keyboards in accordance with some embodiments. While the soft keyboard display process 5000 described below includes a number of operations that appear to occur in a specific order, it should be apparent that the process 5000 can include more or fewer operations, which can be executed serially or in parallel (e.g., using parallel processors or a multi-threading environment), an order of two or more operations may be changed and/or two or more operations may be combined into a single operation.

At a portable electronic device with a touch screen display, an application with a plurality of objects is displayed on the touch screen display (5002). A user may perform a first gesture 5004 on a first object. In some embodiments, the first gesture is a finger tap. In some embodiments, the first object comprises an icon prompting input comprised primarily of letters, such as add new email icon 2610 (FIG. 13D). In some embodiments, the first object comprises a text input box, such as subject line 1804 (FIG. 10D).

The device detects the first gesture (5006) and displays a first soft keyboard (5008). The first soft keyboard contains a plurality of keys, including primarily letter keys and including a key (e.g., 618) for selecting a second soft keyboard different from the first soft keyboard (5010). In some embodiments, the first soft keyboard includes a QWERTY arrangement of letter keys. In some embodiments, the first soft keyboard does not contain any numeric keys (5012). For example, in an application that manages user contacts, QWERTY keyboard 616 is displayed in response to a gesture on add new email icon 2610 (FIG. 13D), as shown in FIG. 13I.

The user may perform a second gesture 5014 on a second object, the second object being other than the key (e.g., 618) for selecting the second soft keyboard. In some embodiments, the second gesture is a finger tap. In some embodiments, the second object comprises an icon prompting input comprised primarily of numbers, such as add new phone icon 2608 (FIG. 13D). In some embodiments, the second object comprises a numeric input box, such as ZIP input box 2662 (FIG. 13J). In some embodiments, the second object comprises a telephone number input box. The device detects the second gesture (5016) and displays the second soft keyboard (5018). The second soft keyboard contains a plurality of keys, including number keys and including a key (e.g., 626) for selecting the first soft keyboard (5020). For example, in an application that manages user contacts, numeric keyboard 624 is displayed in response to a gesture on add new phone icon 2608 (FIG. 13D), as shown in FIG. 13E.

Thus, this process automatically displays the correct soft keyboard based on the application context, without requiring the user to explicitly select a keyboard. For example, the UI displays a soft keyboard with numbers (e.g., 624) when numeric input is needed or expected. The UI displays a soft keyboard with letters (e.g., 616) when letter input is needed or expected. In addition, having multiple soft keyboards permits the size of individual keys in each keyboard to be larger, thereby making it easier for users to select the correct keys on the touch screen display.

Figure 17B:
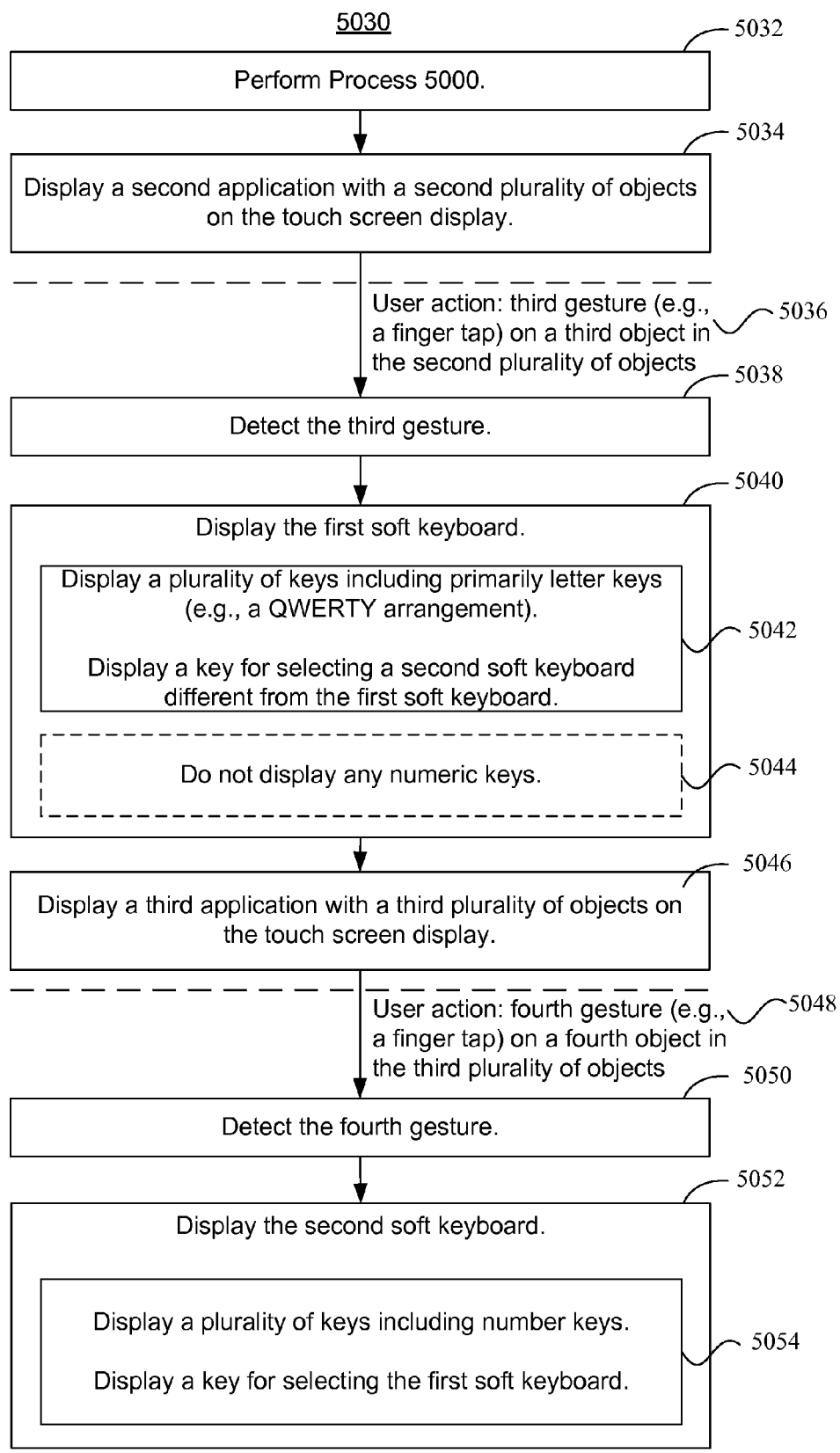

FIG. 17B is a flow diagram illustrating a process 5030 for displaying soft keyboards in accordance with some embodiments. While the soft keyboard display process 5030 described below includes a number of operations that appear to occur in a specific order, it should be apparent that the process 5030 can include more or fewer operations, which can be executed serially or in parallel (e.g., using parallel processors or a multi-threading environment), an order of two or more operations may be changed and/or two or more operations may be combined into a single operation.

The steps of process 5000 are performed as described above with regards to FIG. 17A (5032). A second application with a second plurality of objects is displayed on the touch screen display (5034). While the second application is displayed, the user may perform a third gesture 5036 on a third object in the second plurality of objects. In some embodiments, the third gesture is a finger tap. In some embodiments, the third gesture is substantially the same as the first gesture. The device detects the third gesture (5038) and displays the first soft keyboard (5040). As noted above, the first soft keyboard contains a plurality of keys, including primarily letter keys and including a key (e.g., 618) for selecting a second soft keyboard different from the first soft keyboard (5042). In some embodiments, the first soft keyboard includes a QWERTY arrangement of letter keys. In some embodiments, the first soft keyboard does not contain any numeric keys (5044). For example, in the IM application 141, QWERTY keyboard 616 is displayed in response to a gesture on selection icon 510 (FIG. 5), as shown in FIG. 6A. As another example, in the photo application 144, QWERTY keyboard 616 is displayed in response to a gesture on email photo icon 1708 (FIG. 9), as shown in FIG. 10E. As another example, in the weather widget application 149-1, QWERTY keyboard 616 is displayed in response to a gesture 2404 on a text entry box (FIG. 11B), as shown in FIG. 11C. As another example, in the stock widget application 149-2, QWERTY keyboard 616 is displayed in response to a gesture 2506 on a text entry box (FIG. 12C), as shown in FIG. 12D. As another example, in the email application 140, QWERTY keyboard 616 is displayed in response to a gesture 3408 on the subject line or to a gesture 3412 in the body of the email (FIG. 14A), as shown in FIG. 14B. As another example, in the browser application 147, QWERTY keyboard 616 is displayed in response to a gesture on entry box 3908 (FIG. 16A), as shown in FIG. 16B.

In some embodiments, a third application with a third plurality of objects is displayed on the touch screen display (5046). While the third application is displayed, the user may perform a fourth gesture 5048 on a fourth object in the third plurality of objects. In some embodiments, the fourth gesture is a finger tap. In some embodiments, the fourth gesture is substantially the same as the second gesture. The device detects the fourth gesture (5050) and displays the second soft keyboard (5052). The second soft keyboard contains a plurality of keys, including number keys and including a key (e.g., 626) for selecting the first soft keyboard (5054). For example, in the IM application 141, numeric keyboard 624 is displayed in response to a gesture on other number icon 812 (FIG. 7B), as shown in FIG. 8.

Thus, this process automatically displays the correct soft keyboard across multiple applications based on each application context. For example, in a respective application, the UI displays a soft keyboard with numbers (e.g., 624) when numeric input is needed or expected. In a respective application, the UI displays a soft keyboard with letters (e.g., 616) when letter input is needed or expected. Using the same set of context-dependent keyboards across multiple applications simplifies and unifies the text input process for the user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a portable electronic device with a touch screen display:
detecting a first gesture on the touch screen display;
responding to the first gesture by displaying a first soft keyboard, the first soft keyboard containing a plurality of keys, the plurality of keys in the first soft keyboard including primarily letter keys, the plurality of keys in the first soft keyboard including a first keyboard selector key for selecting a second soft keyboard different from the first soft keyboard;
detecting a second gesture on the touch screen display;
responding to the second gesture by displaying the second soft keyboard, the second soft keyboard containing a plurality of keys, the plurality of keys in the second soft keyboard including: number keys, a set of frequently used punctuation keys, and a second keyboard selector key for selecting the first soft keyboard;
detecting a third gesture on the touch screen display; and
responding to the third gesture by displaying a third soft keyboard that is different from the first soft keyboard and the second soft keyboard, wherein:
the third soft keyboard is made up primarily of punctuation keys and symbols and includes the set of frequently used punctuation keys;
the first soft keyboard includes a key that, when activated, capitalizes the next letter chosen;
the second soft keyboard includes a key that, when activated, initiates display of the third soft keyboard; and
when the second soft keyboard is displayed, the key that, when activated, initiates display of the third soft keyboard is displayed at a location on the touch screen display that was previously occupied by the key in the first soft keyboard that, when activated, capitalizes the next letter chosen.

2. The method of claim 1, wherein the first gesture is a gesture on an icon prompting input comprised primarily of letters.

3. The method of claim 1, wherein the first gesture is a gesture on a text input box.

4. The method of claim 1, wherein the second gesture is a gesture on an icon prompting input comprised primarily of numbers.

5. The method of claim 1, wherein the second gesture is a gesture on a numeric input box.

6. A graphical user interface on a portable electronic device with a touch screen display, a memory, and one or more processors to execute one or more programs stored in the memory, the graphical user interface comprising:
a first soft keyboard containing a plurality of keys, the plurality of keys in the first soft keyboard including primarily letter keys, the plurality of keys in the first soft keyboard including a first keyboard selector key for selecting a second soft keyboard different from the first soft keyboard;

the second soft keyboard, the second soft keyboard containing a plurality of keys, the plurality of keys in the second soft keyboard including: number keys, a set of frequently used punctuation keys, and a second keyboard selector key for selecting the first soft keyboard; and a third soft keyboard that is different from the first soft keyboard and the second soft keyboard, wherein the third soft keyboard is made up primarily of punctuation keys and symbols and includes the set of frequently used punctuation keys;

wherein:
in response to detecting a first gesture on the touch screen display, the first soft keyboard is displayed;
in response to detecting a second gesture on the touch screen display, the second soft keyboard is displayed;
in response to detecting a third gesture on the touch screen display, the third keyboard is displayed;
the first soft keyboard includes a key that, when activated, capitalizes the next letter chosen;
the second soft keyboard includes a key that, when activated, initiates display of the third soft keyboard; and
when the second soft keyboard is displayed, the key that, when activated, initiates display of the third soft keyboard is displayed at a location on the touch screen display that was previously occupied by the key in the first soft keyboard that, when activated, capitalizes the next letter chosen.

7. A portable electronic device, comprising:
a touch screen display;
one or more processors;
memory; and
one or more programs, wherein the one or more programs are stored in the memory and configured to be executed by the one or more processors, the one or more programs including instructions for:
detecting a first gesture on the touch screen display;
responding to the first gesture by displaying a first soft keyboard, the first soft keyboard containing a plurality of keys, the plurality of keys in the first soft keyboard including primarily letter keys, the plurality of keys in the first soft keyboard including a first keyboard selector key for selecting a second soft keyboard different from the first soft keyboard;
detecting a second gesture on the touch screen display;
responding to the second gesture by displaying the second soft keyboard, the second soft keyboard containing a plurality of keys, the plurality of keys in the second soft keyboard including number keys, a set of frequently used punctuation keys, and a second keyboard selector key for selecting the first soft keyboard;
detecting a third gesture on the touch screen display; and
responding to the third gesture by displaying a third soft keyboard that is different from the first soft keyboard and the second soft keyboard, wherein:

the third soft keyboard is made up primarily of punctuation keys and symbols and includes the set of frequently used punctuation keys;
the first soft keyboard includes a key that, when activated, capitalizes the next letter chosen;
the second soft keyboard includes a key that, when activated, initiates display of the third soft keyboard; and
when the second soft keyboard is displayed, the key that, when activated, initiates display of the third soft keyboard is displayed at a location on the touch screen display that was previously occupied by the key in the first soft keyboard that, when activated, capitalizes the next letter chosen.

8. A non-transitory computer readable storage medium storing one or more programs, the one or more programs comprising instructions, which when executed by an electronic device with a touch screen display, cause the device to:
detect a first gesture on the touch screen display;
respond to the first gesture by displaying a first soft keyboard, the first soft keyboard containing a plurality of keys, the plurality of keys in the first soft keyboard including primarily letter keys, the plurality of keys in the first soft keyboard including a first keyboard selector key for selecting a second soft keyboard different from the first soft keyboard;
detect a second gesture on the touch sensitive display;
respond to the second gesture by displaying the second soft keyboard, the second soft keyboard containing a plurality of keys, the plurality of keys in the second soft keyboard including number keys, a set of frequently used punctuation keys, and a second keyboard selector key for selecting the first soft keyboard;
detect a third gesture on the touch screen display; and
respond to the third gesture by displaying a third soft keyboard that is different from the first soft keyboard and the second soft keyboard, wherein:
the third soft keyboard is made up primarily of punctuation keys and symbols and includes the set of frequently used punctuation keys;
the first soft keyboard includes a key that, when activated, capitalizes the next letter chosen;
the second soft keyboard includes a key that, when activated, initiates display of the third soft keyboard; and
when the second soft keyboard is displayed, the key that, when activated, initiates display of the third soft keyboard is displayed at a location on the touch screen display that was previously occupied by the key in the first soft keyboard that, when activated, capitalizes the next letter chosen.

9. The device of claim 7, wherein the first gesture is a gesture on a text input box and the second gesture is a gesture on a numeric input box.

10. The computer readable storage medium of claim 8, wherein the first gesture is a gesture on a text input box and the second gesture is a gesture on a numeric input box.

* * * * *

UNITED STATES PATENT AND TRADEMARK OFFICE
CERTIFICATE OF CORRECTION

PATENT NO.         : 7,941,760 B2
APPLICATION NO.    : 11/850641
DATED              : May 10, 2011
INVENTOR(S)        : Kenneth Kocienda et al.

It is certified that error appears in the above-identified patent and that said Letters Patent is hereby corrected as shown below:

In column 15, line 14, delete "("UT")" and insert -- ("UI") --, therefor.

In column 23, line 21, delete "rules." and insert -- rules; --, therefor.

In column 24, line 6, delete "3926;" and insert -- 3926. --, therefor.

Signed and Sealed this
Sixth Day of December, 2011

David J. Kappos
*Director of the United States Patent and Trademark Office*